US012784397B2

United States Patent

Yarlagadda et al.

(12) United States Patent
(10) Patent No.: US 12,784,397 B2
(45) Date of Patent: Nov. 3, 2026

(54) VISUAL ANALYTICS SYSTEM AND METHOD

(71) Applicant: RadiusAI, Inc., Tempe, AZ (US)

(72) Inventors: Abhinav Yarlagadda, Woodinville, WA (US); Aykut Dengi, Tempe, AZ (US); Sai Krishna Bashetty, Bellevue, WA (US); Sharan Raja, Cambridge, MA (US); Nathan Kelly, Phoenix, AZ (US); Rahul Santhosh Kumar Varma, Tempe, AZ (US); Daniel King, Seattle, WA (US); Kamalesh Kalirathinam, Tempe, AZ (US); Sri Priyanka Madduluri, Arlington, VA (US); Thomas Strich, Tempe, AZ (US)

(73) Assignee: Everseen Limited, Cork (IE)

( * ) Notice: Subject to any disclaimer, the term of this patent is extended or adjusted under 35 U.S.C. 154(b) by 0 days.

(21) Appl. No.: 18/414,229

(22) Filed: Jan. 16, 2024

(65) Prior Publication Data

US 2024/0242505 A1 Jul. 18, 2024

Related U.S. Application Data

(60) Provisional application No. 63/587,874, filed on Oct. 4, 2023, provisional application No. 63/439,149, filed (Continued)

(51) Int. Cl.

*G06V 10/48* (2022.01)
*G06Q 20/20* (2012.01)

(Continued)

(52) U.S. Cl.

CPC ........... *G06V 10/48* (2022.01); *G06Q 20/208* (2013.01); *G06V 10/12* (2022.01); *G06V 10/40* (2022.01);

(Continued)

(58) Field of Classification Search

CPC ........ G06V 20/52; G06V 10/16; G06V 20/40; G06V 10/82; G06V 2201/10;

(Continued)

(56) References Cited

U.S. PATENT DOCUMENTS

| | | |
|---|---|---|
| 8,009,863 B1 | 8/2011 | Sharma et al. |
| 8,098,888 B1 | 1/2012 | Mummareddy et al. |

(Continued)

FOREIGN PATENT DOCUMENTS

WO 2021119601 A1 6/2021

OTHER PUBLICATIONS

International Search Report; International Searching Authority; International Application No. PCT/US2024/011638; Mar. 25, 2024; 3 pages.

(Continued)

*Primary Examiner* — Kenny A Cese

(74) *Attorney, Agent, or Firm* — Taft Stettinius & Hollister LLP

(57) ABSTRACT

Visual analytics systems can use video data from cameras placed throughout a location (e.g., a store or a hospital) to determine poses, gestures, tracks, journeys, and actions, and thereby to provide broader analytics useful in realizing efficiencies and improving human behaviors. Data from visual analytics systems can be used to generate alerts, make useful predictions, and run simulations to test hypotheses.

18 Claims, 23 Drawing Sheets

1600

Related U.S. Application Data on Jan. 15, 2023, provisional application No. 63/439,113, filed on Jan. 14, 2023.

(51) Int. Cl.

| | |
|---|---|
| ***G06V 10/12*** | (2022.01) |
| ***G06V 10/40*** | (2022.01) |
| ***G06V 10/70*** | (2022.01) |
| ***G06V 10/82*** | (2022.01) |
| ***G06V 10/94*** | (2022.01) |
| ***G06V 20/40*** | (2022.01) |
| ***G06V 20/52*** | (2022.01) |
| ***G06V 40/10*** | (2022.01) |
| ***G07G 1/00*** | (2006.01) |
| ***G07G 1/12*** | (2006.01) |

(52) U.S. Cl.

CPC .............. *G06V 10/70* (2022.01); *G06V 10/82* (2022.01); *G06V 10/95* (2022.01); *G06V 20/41* (2022.01); *G06V 20/52* (2022.01); *G06V 40/10* (2022.01); *G07G 1/0009* (2013.01); *G07G 1/0018* (2013.01); *G07G 1/12* (2013.01); *G06V 2201/10* (2022.01)

(58) Field of Classification Search

CPC .... G06V 40/172; G06V 40/173; G06V 10/12; G06V 10/40; G06V 10/48; G06V 10/70; G06V 10/95; G06V 20/41; G06V 40/10; G06T 2207/30241; G06T 7/292; G06T 2207/10016; G06T 2207/30232; G06T 2207/20084; G06T 2207/30196; G07G 1/0018

See application file for complete search history.

(56) References Cited

U.S. PATENT DOCUMENTS

| | | | | |
|---|---|---|---|---|
| 8,295,597 | B1 | 10/2012 | Sharma et al. | |
| 9,041,786 | B2 | 5/2015 | Hamabashiri et al. | |
| 9,134,399 | B2 | 9/2015 | Brown et al. | |
| 9,336,433 | B1 | 5/2016 | Ortiz et al. | |
| 9,532,012 | B1 | 12/2016 | Chen et al. | |
| 9,948,902 | B1 * | 4/2018 | Trundle | G06V 20/52 |
| 10,152,517 | B2 | 12/2018 | Slaney et al. | |
| 11,024,043 | B1 * | 6/2021 | Othman | G06V 10/82 |
| 11,381,743 | B1 * | 7/2022 | Mahbub | H04N 23/65 |
| 2004/0120581 | A1 | 6/2004 | Ozer et al. | |
| 2006/0010028 | A1 | 1/2006 | Sorensen | |
| 2006/0053342 | A1 | 3/2006 | Bazakos et al. | |
| 2009/0034791 | A1 * | 2/2009 | Doretto | G06V 10/446 382/103 |
| 2016/0092736 | A1 | 3/2016 | Mai et al. | |
| 2016/0109281 | A1 | 4/2016 | Herring et al. | |
| 2016/0225121 | A1 * | 8/2016 | Gupta | G06T 3/00 |
| 2016/0320951 | A1 * | 11/2016 | Ernst | G06T 5/00 |
| 2017/0068945 | A1 | 3/2017 | Tsuchimochi et al. | |
| 2017/0237357 | A1 | 8/2017 | Chen et al. | |
| 2017/0323704 | A1 | 11/2017 | Ovalle | |
| 2017/0364751 | A9 | 12/2017 | Saitwal et al. | |
| 2018/0349707 | A1 | 12/2018 | Bataller et al. | |
| 2019/0034897 | A1 | 1/2019 | Gao et al. | |
| 2020/0225673 | A1 | 7/2020 | Afrouzi et al. | |
| 2020/0279084 | A1 | 9/2020 | Davis et al. | |
| 2020/0302161 | A1 | 9/2020 | Sriram et al. | |
| 2021/0065217 | A1 | 3/2021 | Glaser et al. | |
| 2021/0117948 | A1 | 4/2021 | Voss | |
| 2021/0295057 | A1 | 9/2021 | Kundu et al. | |
| 2021/0304421 | A1 | 9/2021 | Othman et al. | |
| 2021/0343136 | A1 | 11/2021 | Souloglou | |
| 2021/0374373 | A1 | 12/2021 | Astvatsaturov et al. | |
| 2021/0406737 | A1 | 12/2021 | Zingaretti et al. | |
| 2022/0114868 | A1 * | 4/2022 | Bronicki | G06V 20/52 |
| 2022/0122157 | A1 * | 4/2022 | Ross | G06Q 30/0643 |
| 2022/0207969 | A1 | 6/2022 | Howard et al. | |
| 2022/0230216 | A1 * | 7/2022 | Buibas | G06V 10/454 |
| 2022/0383384 | A1 | 12/2022 | Bronicki | |
| 2022/0405321 | A1 | 12/2022 | Morate et al. | |
| 2022/0414373 | A1 | 12/2022 | Krishnamurthy et al. | |
| 2022/0414398 | A1 | 12/2022 | Krishnamurthy et al. | |
| 2023/0088414 | A1 * | 3/2023 | Toni | G06N 20/00 382/103 |
| 2023/0206014 | A1 | 6/2023 | Howard et al. | |
| 2023/0316786 | A1 | 10/2023 | Habib | |
| 2024/0212027 | A1 * | 6/2024 | Woollard | G06V 20/52 |
| 2024/0220999 | A1 | 7/2024 | Gao et al. | |
| 2025/0218237 | A1 | 7/2025 | Coelho Pinto et al. | |

OTHER PUBLICATIONS

Written Opinion of the International Searching Authority; International Searching Authority; International Application No. PCT/US2024/011638; Mar. 25, 2024; 18 pages.

Shidik et al. "A systematic review of intelligence video surveillance: Trends, techniques, frameworks, and datasets." IEEE Access 7 (2019): 170457-170473. Retrieved on Mar. 18, 2024 (Mar. 18, 2024) from <https://ieeexplore.ieee.org/stamp/stamp.jsp?arnumber=8911368>.

International Search Report; International Searching Authority; International Application No. PCT/US2024/011690; Apr. 17, 2024; 2 pages.

Written Opinion of the International Searching Authority; International Searching Authority; International Application No. PCT/US2024/011690; Apr. 17, 2024; 8 pages.

International Search Report; International Searching Authority; International Application No. PCT/US2024/011691; Apr. 30, 2024; 2 pages.

Written Opinion of the International Searching Authority; International Searching Authority; International Application No. PCT/US2024/011691; Apr. 30, 2024; 7 pages.

International Search Report and Written Opinion for International Application No. PCT/US2024/050030; Feb. 7, 2025; 15 pages.

International Search Report and Written Opinion; International Searching Authority; International Application No. PCT/US2024/049964; Dec. 26, 2024; 8 pages.

International Preliminary Report on Patentability; The International Bureau of WIPO; International Application No. PCT/US2024/049964; Apr. 16, 2026; 7 pages.

International Preliminary Report on Patentability; The International Bureau of WIPO; International Application No. PCT/US2024/050030; Apr. 16, 2026; 12 pages.

Office Action; Canadian Intellectual Property Office; Canadian Application No. 3,279,976; Jul. 29, 2026; 4 pages.

Office Action; Canadian Intellectual Property Office; Canadian Application No. 3,279,979; Aug. 3, 2026; 7 pages.

Office Action; Canadian Intellectual Property Office; Canadian Application No. 3,279,963; Aug. 21, 2026; 3 pages.

Non-Final Office Action; United States Patent and Trademark Office; U.S. Appl. No. 18/906,556; Jul. 27, 2026; 33 pages.

* cited by examiner

FIG.16A
CAM 1
NR6_customer
NR7_customer
00:00:05:04
Sales Floor -- 2022-10-06 17:01:56

1600

1700

VISUAL ANALYTICS SYSTEM AND METHOD

CROSS REFERENCE TO RELATED APPLICATIONS

This application claims the benefit of U.S. Provisional Application No. 63/439,113, filed Jan. 14, 2023, U.S. Provisional Application No. 63/439,149, filed Jan. 15, 2023, and U.S. Provisional Application No. 63/587,874, filed Oct. 4, 2023, the disclosures of which are hereby incorporated herein by reference in their entireties.

TECHNICAL FIELD

This disclosure relates generally to computer vision systems, and specifically to visual analytics for tracking and identifying persons and objects within a location.

BACKGROUND

Cognitive environments which allow personalized services to be offered to customers in a frictionless manner are highly appealing to businesses, as frictionless environments are capable of operating and delivering services without requiring the customers to actively and consciously perform special actions to make use of those services. Cognitive environments utilize contextual information along with information regarding customer emotions in order to identify customer needs. Furthermore, frictionless systems can be configured to operate in a privacy-protecting manner without intruding on the privacy of the customers through aggressive locational tracking and facial recognition, which require the use of customers' real identities.

Conventional surveillance and tracking technologies pose a significant barrier to effective implementation of frictionless, privacy-protecting cognitive environments. Current vision-based systems identify persons using high resolution close-up images of faces which commonly available surveillance cameras cannot produce. In addition to identifying persons using facial recognition, existing vision-based tracking systems require prior knowledge of the placement of each camera within a map of the environment in order to monitor the movements of each person. Tracking systems that do not rely on vision rely instead on beacons which monitor customer's portable devices, such as smartphones. Such systems are imprecise, and intrude on privacy by linking the customer's activity to the customer's real identity.

SUMMARY

Various embodiments are directed to one or more unique systems apparatuses, devices, hardware, methods, and combinations thereof for tracking and identifying people and objects within a monitored location.

According to an embodiment, a system for tracking and identifying people and objects within a monitored location may include a first camera positioned at a monitored location, the first camera is configured to capture a first video stream of a first area of interest of the monitored location. The system may also include a second camera positioned at the monitored location, the second camera is configured to capture a second video stream of a second area of interest of the monitored location, wherein the second area of interest overlaps at least a portion of the first area of interest. The system further includes an edge server positioned at the monitored location and communicatively coupled to each of the first camera and the second camera over an internal communications network at the monitored location, the edge server having a processor executing a plurality of instructions stored in memory, wherein the plurality of instructions cause the processor of the edge server to receive the first video stream from the first camera and the second video stream from the second camera, extract a first plurality of images from the first video stream, analyze each image of the first plurality of images with one or more artificial intelligence models to detect a presence of a person within the first area of interest, and generate, in response to detection of the presence of the person within the first area of interest, first metadata indicative of the presence of the person within the first area of interest. The plurality of instructions may also cause the processor of the edge server to extract a second plurality of images from the second video stream, analyze each image of the second plurality of images with the one or more artificial intelligence models to detect the presence of the person within the second area of interest, and generate, in response to detection of the presence of the person within the second area of interest, second metadata indicative of the presence of the person within the second area of interest. Additionally, the plurality of instructions may cause the processor of the edge server to infer that the person moved from the first area of interest to the second area of interest as a function of the first metadata and the second metadata, and transmit the first metadata and the second metadata to a remote processing server using an external communications network.

In some embodiments, to infer that the person moved from the first area of interest to the second area of interest as a function of the first and second metadata may include to analyze the first metadata and the second metadata with the one or more artificial intelligence models.

In some embodiments, the one or more artificial intelligence models include a machine learning model.

In some embodiments, the machine learning model is a neural network.

In some embodiment, the plurality of instructions further cause the processor of the edge server to analyze each image of the first plurality of images with the one or more artificial intelligence models to detect the presence of an object within the first area of interest, generate, in response to detection of the presence of the object within the first area of interest, third metadata indicative of the presence of the object within the first area of interest, and transmit the third metadata to the remote processing server using the external communications network.

In some embodiment, the plurality of instructions further cause the processor of the edge server to analyze the first metadata and the third metadata with the one of more artificial intelligence models to determine whether the person detected in the first area of interest is interacting with the object detected in the first area of interest.

In some embodiments, the remote processing server may include a processor executing a plurality of instructions stored in memory, wherein the plurality of instructions cause the processor of the remote processing server to receive the first metadata and the second metadata from the edge server, analyze the first metadata and the second metadata with the one or more artificial intelligence models to predict a future event at the monitored location, and generate an alert indicative of the predicted future the event at the monitored location.

In some embodiments, the plurality of instructions further cause the processor of the edge server to adaptively increase or decrease a number of the first plurality of images extracted from the first video stream as a function of the analysis of the each image of the first plurality of images with the one or more artificial intelligence models.

In some embodiments, the first plurality of images extracted from the first video stream is less than a total number of images making up the first video stream.

In some embodiments, the plurality of instructions further cause the processor of the edge server to store the first video stream in a data storage device of the edge server, determine, based on the analysis of each image of the first plurality of images, that additional images are required to detect the presence of the person within the first area of interest, retrieve a portion of the first video stream from the data storage device, the portion of the first video stream is associated with the first plurality of images, extract a third plurality of images from the retrieved portion of the first video stream, wherein the third plurality of images extracted from the portion of the first video stream includes more extracted images than the first plurality of images, and analyze each image of the third plurality of images with the one or more artificial intelligence models to detect the presence of the person within the first area of interest.

In some embodiments, the visual analytics system further includes a global configuration server communicatively coupled to the edge server with the external network and remotely positioned from the monitored location, wherein the global configuration server includes a processor executing a plurality of instructions stored in memory, wherein the plurality of instructions cause the processor of the global configuration server to transmit the one or more artificial intelligence models to the edge server.

According to another embodiment a method for tracking and identifying people and objects within a monitored location may include capturing, by a first camera positioned at a monitored location, a first video stream of a first area of interest of the monitored location, and capturing, by a second camera positioned at the monitored location, a second video stream of a second area of interest of the monitored location, wherein the second area of interest overlaps at least a portion of the first area of interest. In such embodiment, the method may further include receiving, by an edge server positioned at the monitored location and communicatively coupled to each of the first camera and the second camera over an internal communications network, the first video stream from the first camera and the second video stream from the second camera, extracting, by the edge server, a first plurality of images from the first video stream, analyzing, by the edge server, each image of the first plurality of images with one or more artificial intelligence models to detect a presence of a person within the first area of interest, and generating, by the edge server and in response to detecting the presence of the person within the first area of interest, first metadata indicative of the presence of the person within the first area of interest. Such method may also include extracting, by the edge server, a second plurality of images from the second video stream, analyzing, by the edge server, each image of the second plurality of images with the one or more artificial intelligence models to detect the presence of the person within the second area of interest, generating, by the edge server and in response to detecting the presence of the person within the second area of interest, second metadata indicative of the presence of the person within the second area of interest, inferring, by the edge server, that the person moved from the first area of interest to the second area of interest as a function of the first metadata and the second metadata, and transmitting, by the edge server, the first metadata and the second metadata to a remote processing server using an external communications network.

In some embodiments, inferring that the person moved from the first area of interest to the second area of interest as a function of the first and second metadata may include analyzing the first metadata and the second metadata with the one or more artificial intelligence models.

In some embodiments, the one or more artificial intelligence models include a machine learning model.

In some embodiments, the machine learning model is a neural network.

In some embodiments, the method may further include analyzing, by the edge server, each image of the first plurality of images with the one or more artificial intelligence models to detect the presence of an object within the first area of interest, generating, by the edge server and in response to detecting the presence of the object within the first area of interest, third metadata indicative of the presence of the object within the first area of interest, and transmitting, by the edge server, the third metadata to the remote processing server using the external communications network.

In some embodiments, the method may further include analyzing, by the edge server, the first metadata and the third metadata with the one of more artificial intelligence models to determine whether the person detected in the first area of interest is interacting with the object detected in the first area of interest.

In some embodiments, the method may further include receiving, by the remote processing server, the first metadata and the second metadata from the edge server, analyzing, by the remote processing server, the first metadata and the second metadata with the one or more artificial intelligence models to predict a future event at the monitored location, and generating, by the remote processing server, an alert indicative of the predicted future the event at the monitored location.

In some embodiments, the method may further include adaptively increasing or decreasing, by the edge server, a number of the first plurality of images extracted from the first video stream as a function of analyzing each image of the first plurality of images with the one or more artificial intelligence models.

In some embodiments, the first plurality of images extracted from the first video stream is less than a total number of images making up the first video stream.

In some embodiments, the method may further include storing, by the edge server, the first video stream in a data storage device of the edge server, determining, by the edge server and based on the analysis of each image of the first plurality of images, that additional images are required to detect the presence of the person within the first area of interest, and retrieving, by the edge server, a portion of the first video stream from the data storage device, the portion of the first video stream is associated with the first plurality of images. In such embodiments, the method may further include extracting, by the edge server, a third plurality of images from the retrieved portion of the first video stream, wherein the third plurality of images extracted from the portion of the first video stream includes more extracted images than the first plurality of images, and analyzing, by the edge server, each image of the third plurality of images with the one or more artificial intelligence models to detect the presence of the person within the first area of interest.

In some embodiments, the method may further include transmitting, by a global configuration server, the one or more artificial intelligence models to the edge server, wherein the global configuration server is communicatively coupled to the edge server with the external network and remotely positioned from the monitored location.

BRIEF DESCRIPTION OF THE DRAWINGS

Various embodiments will become better understood with regard to the following description, appended claims and accompanying drawings wherein:

DETAILED DESCRIPTION

Figure 1:
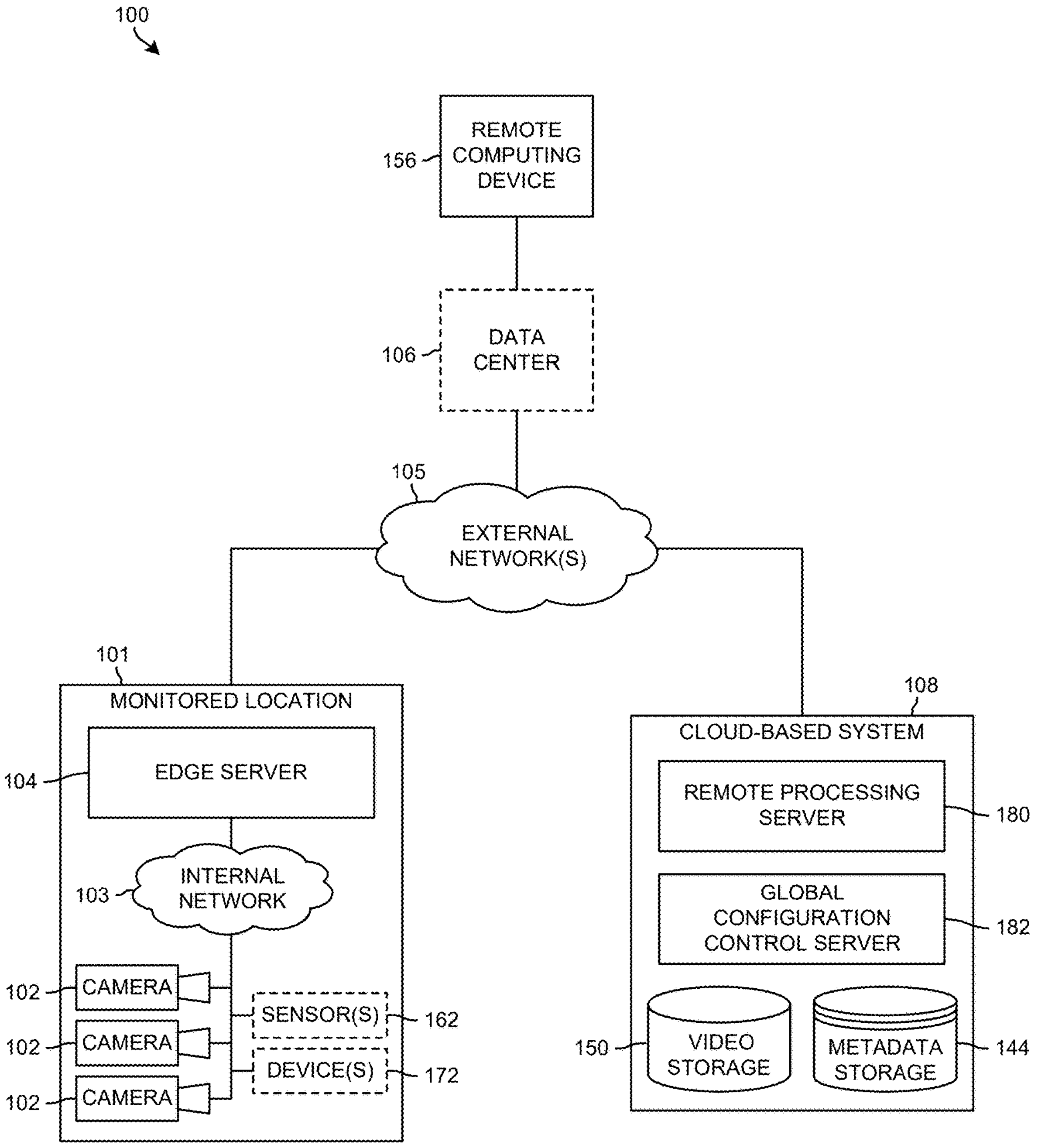
FIG. 1 is a simplified block diagram of at least one embodiment of a visual analytics system.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings, wherein like numbers indicate the same or corresponding elements throughout the views. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, it should be understood that unless otherwise specified or required by context, any explicit or implicit ordering of steps performed in the execution of a method does not imply that those steps must be performed in the order presented but instead may be performed in a different order or in parallel.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Referring now to FIG. 1, a simplified block diagram of at least one embodiment of a visual analytics system 100, which may be used in conjunction with one or more of the embodiments described herein, is shown. The visual analytics system 100 may be embodied as any system capable of identifying and tracking persons or objects within a monitored location 101 using existing or additional infrastructure.

The illustrative visual analytics system 100 includes a location to be monitored (a monitored location 101), a cloud-based system 108 (or a logical or physical collection of remote computing devices), a remote computing device 156, and one or more external networks 105. As illustratively shown in FIG. 1, one or more devices of the monitored location 101, the cloud-based system 108, and the cloud-based system 108 are communicatively coupled via the external network(s) 105. In some embodiments, the remote computing device 156 can be configured to communicate with one or more devices of the monitored location 101 and/or the cloud-based system 108 through a data center 106, which can be configured to provide security services (e.g., authentication services, authorization services, secure communication services, etc.).

It should further be understood that, unless otherwise specifically limited, any of the computing elements of the present invention may be implemented in cloud-based or cloud computing environments. As used herein and further described below in reference to the cloud-based system 108, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

It should be understood that any of the computer-implemented components, modules, or servers described in relation to FIG. 1 may be implemented via one or more types of computing devices, such as, for example, the computing device 2000 of FIG. 20. Further, in some embodiments, one or more of the components described herein may be excluded from the system 100, one or more of the components described as being independent may form a portion of another component, and/or one or more of the component described as forming a portion of another component may be independent.

As disclosed herein, the illustrative visual analytics system 100 is capable of identifying and tracking persons or objects within or around a monitored location 101 using existing or additional infrastructure. The monitored location 101 can be, for example, a retail store or shopping mall, a healthcare facility (e.g., hospital), an amusement park, a warehouse, a distribution center, a factory or plant, an office complex, a military installation, a gas station, a parking facility or parking lot, an apartment building or other residential space, or any other place where there is interest in monitoring and analyzing movement and activity of people, items, or vehicles within, throughout, and/or around a space. It should be appreciated that although only one monitored location 101 is illustratively depicted in FIG. 1, the visual analytics system 100 can include any number of monitored locations 101.

As illustratively shown in FIG. 1, the monitored location 101 includes one more video cameras 102 or image sensors placed throughout the location (e.g., cameras 102 placed inside or outside of a building or structure, in an open area, or placed in any suitable area of the monitored location 101). Each of the cameras 102 can be positioned to capture video or generate images covering a different areas of the monitored location 101. In some embodiments, two or more cameras 102 can be positioned such that their respective fields of view at least partially overlap. The cameras 102 of the visual analytics system 100 can include already-existing cameras 102, newly installed or mounted cameras 102, or a combination thereof. It should be appreciated that by utilizing cameras 102 already in place at the monitored location 101 for security or loss prevention purposes, the visual analytics system 100 can leverage existing video surveillance infrastructure without substantial additional investment cost in camera and data network equipment.

In some embodiments, one or more of the cameras 102 are high-resolution cameras, e.g., having high definition (HD) resolution or better. The cameras 102 can be indoor or outdoor cameras. The cameras 102 can also be black and white, color, passive infrared, active infrared, or sensitive to other spectral wavelengths. In some embodiments, the cameras 102 are three-channel color and provide RGB (red-green-blue) video data. The cameras 102 can be configured, for example, to deliver video as digital data streams using, e.g., H.264 or H.265 video encoding. The video streams can be delivered to other computing devices using, for example, Internet Protocol (IP). Additionally, in some embodiments, the Real-Time Streaming Protocol (RTSP) can be used to deliver the video streams generated by the cameras 102 to one or more other computing devices of the monitored location 101. In some examples, the cameras 102 are configured for wireless video data transmission, and use, for example, WiFi to deliver their video streams.

The monitored location 101 can include an internal communications network 103, which can be a local area network (LAN) or any other type of network interconnecting computing devices of the monitored location 101. The internal communications network 103 can include one or more switches, routers, access points, or any other suitable equipment or infrastructure configured to enable wired or wireless communications between devices of the monitored location 101.

In some embodiments, the monitored location 101 can include additional sensors 162 or devices 172 configured to generate information for tracking and identifying people and objects within or around the monitored location 101. For example, the monitored location 101 can include one or more Radio Frequency Identification (RFID) devices, Near Field Communication (NFC) devices, temperature sensors, humidity sensors, light sensors, weight sensors, or sound sensors. In such embodiments, the information generated from the additional sensors 162 or devices 172 can be used by the edge server 104 or devices of the cloud-based system 108 to identify and track people and objects within or around the monitored location 101.

The monitored location 101 also includes an edge server 104, which is configured to identify and track persons and objects within or around the monitored location 101. The edge server 104 is a computer system having one or more AI acceleration units, such as graphics processing units (GPUs) or tensor processing units (TPUs), to provide AI processing capabilities. As illustratively shown in FIG. 1, the edge server 104 is communicatively coupled to the cameras 102 via the internal network 103. In some embodiments, the edge server 104 may be behind one or more security firewalls and/or network address translation (NAT) firewalls.

It should be appreciated that while only one edge server 104 is illustratively depicted in FIG. 1, the monitored location 101 can include any number of edge servers 104.

Figure 2:
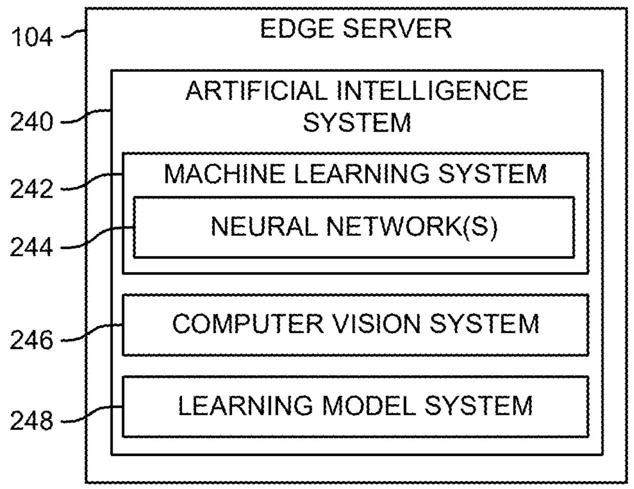
FIG. 2 is a simplified block diagram of at least one embodiment of the edge server of FIG. 1.

As discussed herein, each camera 102 of the monitored location 101 is configured to capture or generate a video stream (i.e., a sequence of individual image frames) of an area within or around the monitored location 101. The video stream generated by each of the cameras 102 is streamed or transmitted to the edge server 104 via the internal network 103, which in some embodiments may occur in real-time or near real-time. The edge server 104 is configured to analyze the video streams generated by the cameras 102. To do so, the edge server 104 extracts individual image frames from each of the video streams generated by the cameras 102, and then analyzes the extracted image frames using one or more artificial intelligence (AI) methodologies or models to, for example, identify and track any number of in-frame people or objects (e.g., items, vehicles, etc.) present within or around the monitored location 101. To do so, in some embodiments, the edge server 104 is configured to analyze the extracted image frames using one or more machine learning models (e.g., neural networks, deep learning neural networks, convolutional neural networks, etc.). Additionally, the edge server 104 can also use AI models that are configured or otherwise trained to not only identify the presence of a person or an object, but also to determine or infer poses, gazes, gestures, behaviors, movement, and/or actions of the detected people or objects. As illustratively shown in FIG. 2, the edge server 104 of some embodiments may include an artificial intelligence system 240, which can be configured to analyze the video streams generated by the cameras 102, analyze data generated the edge server 104, and/or analyze data provided by any sensors 162 and other devices 172 of the monitored location 101. In such embodiments, the artificial intelligence system 240 may include a machine learning system 242, a computer vision system 246, and/or a learning model system 248. In embodiments in which the edge server 104 includes a machine learning system 242, the machine learning system 242 can be configured to utilize one or more neural networks 244.

In some embodiments, the edge server 104 is configured to generate metadata based at least in part on, or otherwise as a function of, the output of the AI models. The generated metadata can be used by the edge server 104 to make inferences as to the presence of a person or object at the monitored location 101 as well as the behavior or actions of the detected person or objects at the monitored location 101. In some embodiments, the generated metadata can also be used as an input to other AI models for generating subsequent inferences or for further training of the utilized AI models. For example, the generated metadata can be used by the edge server 104 to determine or infer the location of a person or an object within or around the monitored location 101, determine or infer an action of a detected person in connection with a detected object (e.g., a detected person picked up a disposable cup, walked to a beverage station, and filled the cup with ice), determine or infer physical characteristics of a detected person or object (e.g., the person's height, etc.), or determine or infer any other relevant information.

As disclosed herein, the edge server 104 is configured to extract individual image frames from each of the video streams generated by the cameras 102, and analyze those image frames using one or more AI models. In some embodiments, the edge server 104 is configured to extract and analyze only a subset of the image frames making up a video stream. For example, the cameras 102 may be configured to generate video streams each containing 24 or 30 (or more) frames per second. In such cases, the edge server 104 can be configured to extract and analyze only three frames per second, thereby conserving computing resources (e.g., CPU, GPU, memory, bandwidth, etc.) of the edge server 104 or the internal network 103. Additionally or alternatively, the edge server 104 can be configured to down sample or otherwise reduce the resolution of the extracted image frames. In some embodiments, the edge server 104 may determine that it needs to extract and analyze more than three frames per second. For example, the edge server 104 may detect a quick movement made by a person or object. In such cases, the edge server 104 can retrieve the corresponding portion of the video stream containing the detected quick movement from a video archive (e.g., a storage device or memory), extract a larger number of individual image frames from the video stream, and re-analyze the larger number of image frames with the one or more AI models. It should be appreciated that the video streams generated by the cameras 102 can include any number of frames per second at any resolution. Further, the edge server 104 can be configured to extract and analyze any number of frames per second, and then adaptively adjust the number of frames extracted and analyzed based on any suitable determination.

The cloud-based system 108 (or cloud computing service 108) can be a collection of one or more physical or virtual computing devices positioned remotely from the monitored location 101. In some embodiments, such as the one shown in FIG. 1, the cloud-based system 108 includes a remote processing server 180, a global configuration control server 182, a video storage device 150, and a metadata storage system 144. The remote processing server 180 can be configured to provide additional processing of metadata or data generated by the edge server 104 and other devices of the monitored location 101 (e.g., the edge server 104, the cameras 102, etc.). In some embodiments, the remote processing server 180 is configured receive the metadata generated by the edge server 104 via the external network(s) 105, and analyze the received metadata using one or more AI models, which may be the same or different AI models utilized by the edge server 104.

The remote processing server 180 can be configured to make inferences based at least in part on, or otherwise as a function of, the analyzed metadata. For example, the remote processing server 108 can be configured to analyze the metadata generated and provided by the edge server 104 and predict the future occurrence of an event at the monitored location 101. In such examples, the remote processing server 108 can be configured to generate an alert or message, which can be displayed to a user of the visual analytics system 100 via the remote computing device 156. Additionally or alternatively, the remote processing server 108 can use the metadata received from the edge server 104 for further training or adjustment of the one or more AI models.

Figure 3:
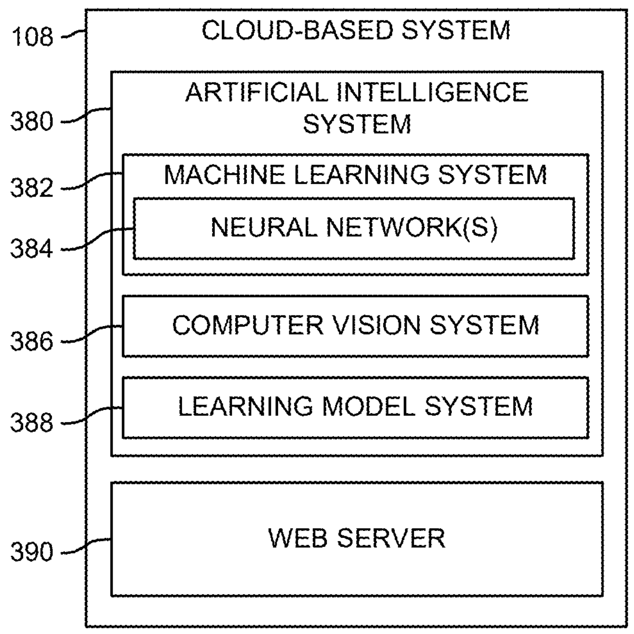
FIG. 3 is a simplified block diagram of at least one embodiment of the remote processing server of FIG. 1.

As illustratively shown in FIG. 3, the cloud-based system 108 of some embodiments may include an artificial intelligence system 380, which can be configured to analyze the metadata generated and provided by the edge server 104. In such embodiments, the artificial intelligence system 380 may include a machine learning system 382, a computer vision system 386, and/or a learning model system 388. In embodiments in which the cloud-based system 108 includes a machine learning system 382, the machine learning system 382 (of any other component of the cloud-based system 108) can be configured to utilize one or more neural networks 384.

Additionally, the cloud-based system 108 can include a web server 390, which can be accessed by the remote computing device 156 or any other computing device of the visual analytics system 100. In some embodiments, the web server 390 can provide information or alerts concerning the metadata provided by the edge server 104. The web server 390 can also be configured to facilitate the configuration, control, and maintenance of devices of the monitored location 101. It should be appreciated that any of the systems and services making up the cloud-based system 108 (e.g., the remote processing server 180, the global configuration control server 182, etc.) can include the artificial intelligence system 380, machine learning system 382, computer vision system 386, learning model system 388, and/or web server 390.

Referring back to FIG. 1, the video storage device 150 can be configured to store full or partial video streams generated by the cameras 102, images extracted from the video streams by the edge server 104, and/or other data associated with the video streams. The metadata storage system 144 can be configured to store metadata generated by the edge server 104 and/or the remote processing server 180.

Figure 4:
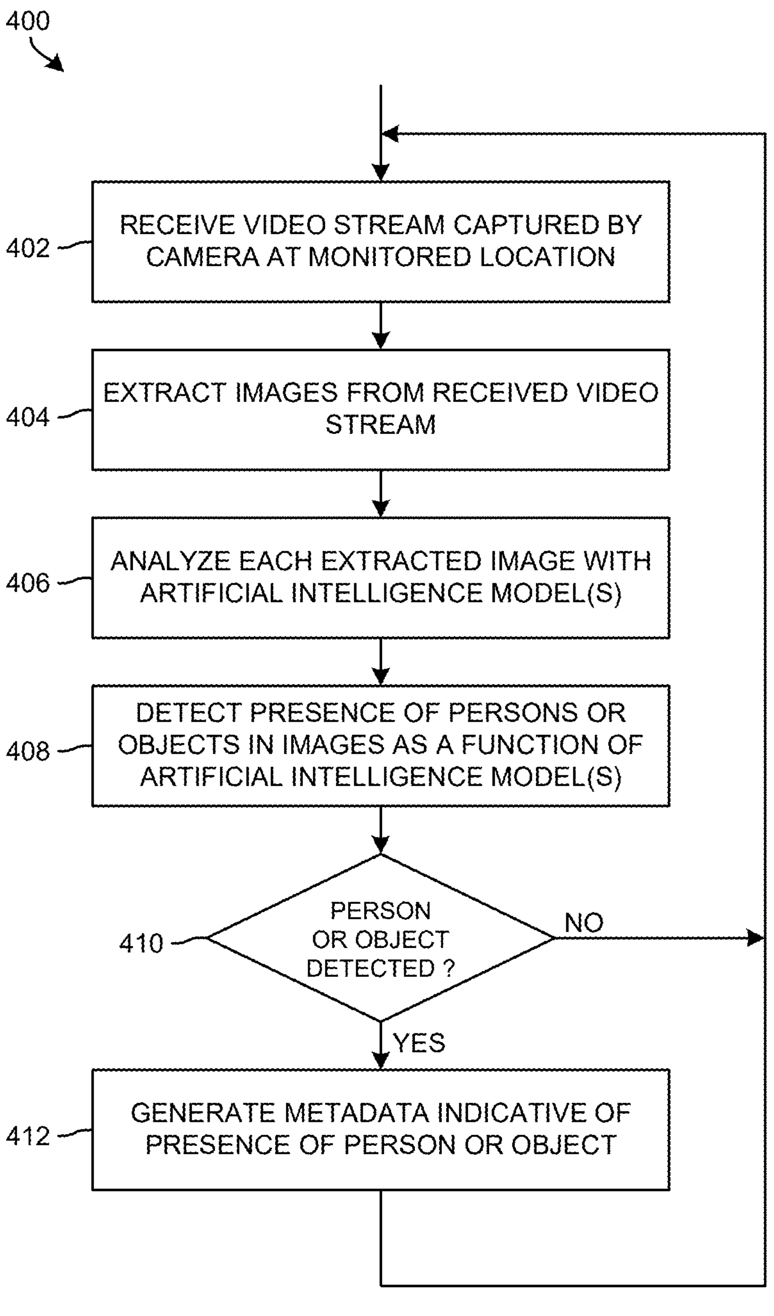
FIG. 4 is a simplified flow diagram of at least one embodiment of a method for tracking and identifying people and objects within a monitored location.

Referring now to FIG. 4, in use, the edge server 104 (or another computing system of the visual analytics system 100) may execute a method 400 for tracking and identifying people and objects within a monitored location 101. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 400 in which the edge server 104 receives a video stream captured by a camera 102 at a monitored location 101. In block 404, the edge server 104 extracts individual images from the received video stream. In some embodiments, the edge server 104 may extract a subset of the total number of individual image frames that make up the video stream captured by the camera 102. In block 406, the edge server 104 analyzes each image extracted from the received video stream using one or more artificial intelligence models. In block 408, the edge server 104 detects whether a person or an object is present within the images extracted from the video stream as a function of the one or more artificial intelligence models. If, in block 410, the edge server 103 determines that a person or an object is not present within the images, the method 400 starts over. If, however, the edge server 104 determines in block 410 that a person or an object is present within the one or more images, the method advances to block 412. In block 412, the edge server generates metadata indicative of the presence of the person or object within the extracted images. In some embodiments of the method 400, the edge server 104 receives a second video stream captured by a second camera 102 at the monitored location 101. In such embodiments, the edge server 104 extracts individual image frames from the second video steam, and analyzes each of the extracted images from the second video stream using the one or more artificial intelligence models. The edge server 104 then detects whether a person or an object is present within the images extracted from the second video stream as a function of the one or more artificial intelligence models. If the edge server 103 determines that a person or an object is detected in the second video stream, the edge server 104 utilizes the one or more artificial intelligence models to infer whether the person or object detected in the second video stream is the same as the person or object detected in the first video stream.

Overview of Visual Analytics

As discussed herein, visual analytics can be derived, using computer vision and machine learning (ML) techniques or other artificial (AI) techniques, from video camera data streams sourced from video cameras 102 placed throughout a location (e.g., a monitored location 101). The location 101 can be, as examples, a retail store or shopping mall, a healthcare facility (e.g., hospital), an amusement park, a warehouse, a distribution center, a factory or plant, an office complex, a military installation, a gas station, a parking facility or parking lot, an apartment building or other residential space, or any other place where there is interest in monitoring and analyzing movement and activity of people, items, or vehicles within, throughout, and/or around a space. The goals of visual analytics generally relate to quantifying flow patterns, activities, and behaviors, on both the individual level and in the aggregate, to improve economies and efficiencies, to generate and test hypotheses, and to timely and meaningfully address threats, annoyances, and aggravations that can singly or cumulatively impact-depending on the context-business goals, quality of service, quality of care, or quality of life. Advantageously, the visual analytics disclosed herein can be derived from cameras 102 already in place for security or loss prevention purposes, meaning that the visual analytics system 100 can leverage existing video surveillance infrastructure without substantial additional investment cost in camera and data network equipment.

As discussed herein and referring back to FIG. 1, video streams can be processed, for example, at an edge server 104 (or other local computing device) installed on-site at a monitored location 101 and configured to receive video streams from the cameras 102, e.g., through a local area network (LAN) such as the network 103, either by wired or wireless connections. In some examples, the edge server 104 can also be coupled via an external network 105 (e.g., the Internet) to one or more remote computing resources, e.g., the cloud-based system 108, through which the edge server 104 and other edge servers, e.g., edge servers 104 at other locations (not shown), can be remotely configured, monitored, and maintained. In some examples, the edge server 104 can be configured to run a Linux operating system. In some embodiments, the Docker container platform and the Kubernetes container orchestration system can be used to automate software deployment, scaling, and management of edge servers 104.

The edge server 104 can process the video streams using deep neural networks as well as other artificial intelligence (AI) methodologies. In some examples, still image frames are extracted from streams from multiple cameras 102, and machine learning (ML) models detect and/or identify in-frame people, items, vehicles, and so forth. Some of the ML models can be trained, for example, to detect people, the objects that the people interact with, and/or vehicles, with the overall goal of trying to understand what people and/or vehicles shown in the video streams are doing, and to quantify their actions and behaviors both on the individual level and in the aggregate. Others of the ML models can be trained to perform functions other than detection, such as determining poses, gazes, gestures, and/or actions of the detected people. Different time steps and camera views can be merged to form a three-dimensional view of a scene and to obtain tracks representing the spatiotemporal motions of people, without using facial recognition or personally identifiable information (PII) about the people in the scene.

Privacy regulations in many legal jurisdictions require that individuals not be identified with PII. Therefore, in some examples, appearance may be used as but one factor in tracking people in scenes across multiple different camera views. Foveal techniques can be used to ascertain details that resolve ambiguities. Derived metadata indicative of paths, actions, gestures, and behaviors can be analyzed for anomalies and signatures. Alerts, reports, recommendations, and orders can be generated based on the analysis of the metadata. Metadata can be accumulated, stored, and subsequently used in simulated testing to address hypotheses related to the uses of the spaces. A large host of questions and problems can thereby be addressed with quantifiable certainty not possible, or not practicable within budget and time constraints, in the absence of the visual analytics.

Location Setup

A location 101 can be initially setup for the visual analytics system 100 with (1) the installation of cameras 102 and other location devices (e.g., sensors 162 of various types, RFID readers, electronic locks or other access controls, lighting, and environmental controls, or any other device 172 configured to generate data indicative of object or persons within or around the monitored location 101), (2) installation of an edge server 104 on the location premises, (3) connection of the cameras 102 and other location devices to the edge server 104 (e.g., over a local area network (LAN) 103, either wired or wirelessly), (4) software provisioning and configuration of the edge server 104, cameras 102, and other location devices, which can be done remotely by the cloud-bases system 108 using a web-based interface of a configuration control platform (e.g., the global configuration control center 182), (5) calibration and registration of the cameras 102, (6) designation of areas of interest, and/or (7) definitions of actions. In some embodiments, the cameras 102 are optimally positioned to ensure adequate visual coverage within or around the monitored location 101. Additionally or alternatively, the cameras 102 can be positioned at the monitored location 101 according to a template or floor plan.

Cameras

As discussed herein, in some examples, the cameras 102 are high-resolution cameras 102, e.g., having high definition (HD) resolution or better. The cameras 102 can be indoor or outdoor cameras. The cameras 102 can be black and white, color, passive infrared, active infrared, or sensitive to other spectral wavelengths. In some examples, the cameras 102 are three-channel color and provide RGB (red-green-blue) video data. The cameras 102 are configured, for example, to deliver video as digital data streams using, e.g., H.264 or H.265 video encoding. The video streams can be delivered using, for example, internet protocol (IP). In some examples, the cameras 102 are configured for wireless video data transmission, and use, for example, WiFi to deliver their video streams. In some examples, cameras 102 and other sensors 162, some of which have IP communication capability, will have already been installed at the location 101, and can be incorporated into the visual analytics system 100. In some such examples, it will be desirable to supplement existing surveillance infrastructure with additional cameras 102 and/or other sensors 162 or devices 172. Installed cameras 102 can have their positions, orientations, fields of view, and focuses adjusted and tuned to provide information needed for the visual analytics system 100. A floor plan of a location 101 (e.g., a retail store) or, in some examples, a 2.5D or 3D model of the location 101, can serve as a guide for planning camera installation locations, including camera 102 angles and fields of view.

Edge Server

In examples, the edge server 104 is a computer system having one or more AI acceleration units, such as graphics processing units (GPUs) or tensor processing units (TPUs), to provide AI processing capabilities. The edge server 104 may be behind one or more security firewalls and/or network address translation (NAT) firewalls. The cameras 102 and other sensors 162 and devices 172, if any, can be configured to connect to the edge server 104 to provide data to the edge server 104, including, in the case of the cameras 102, video streams depicting various views of the location 101 provided by the cameras 102. In some examples, a location 101 is equipped with a single edge server 104. In other examples, a location 101 is equipped with multiple edge servers 104.

Camera Calibration

In embodiments, each camera 102 of the visual analytics system 100 is calibrated. Camera calibration involves mapping the correspondences between the cameras 102 of different views and can be performed, in some examples, using structural features found in the location 101, or in other examples, from people or objects in a scene. All cameras 102 in a location 101 can be calibrated automatically, manually, or a combination of automatically and manually. To compute the calibrations for the cameras 102 automatically, the geometrical properties of the scene, e.g., floor tile patterns, floor tile sizes, known heights of objects, or intersections of the walls, can be relied upon by the edge server 104 (or other computing devices of the visual analytics system 100). For example, grout lines between floor tiles in view of each camera 102 can be detected and intersections of tile lines can provide reference points that can be used to determine the intrinsics and the extrinsics of each camera 102. In one method of camera calibration, the structure that is found in between the tiles on a floor—e.g., a grid of lines—can be used. A hypothetical grid of lines can be drawn in a model of the space. The hypothetical grid can then be fitted to the detected edges in between the tiles on the floor. As a result of this fitting, the 3D locations of the cameras 102 become known. Intersections at corners of walls can also be used, instead of floor tile points.

Because some locations 101 do not have floor tiles, calibration methods that rely on floor tile detection are not reliable in all cases. Accordingly, in another method of camera calibration, people or objects can be used as calibration targets. Such a calibration method can look for key points on the human body. There are, for example, 17 important joint locations, any one or more or which can be detected during the calibration process. Once people are detected in the scene, the people can be re-identified in different views. Pose estimation can be performed in each view to find the joint locations on the people, and then the joint locations can be used as calibration targets. For different camera views, the joint locations can be made the same at 3D points in physical space, giving accurate camera calibration.

As disclosed herein, the visual analytics system 100 may be used across multiple locations 101 (e.g., stores) with identical or highly similar layouts. In some examples, a full calibration can be performed for a first location 101, and then the relationships can be transferred to cameras 102 of a second location 101 of similar or identical layout using an image matching technique.

Calibration of a single camera 102 (based, for example, on grout lines) provides information about how that camera 102 sits in a local coordinate system. To relate all the local coordinate systems to each other, corresponding points are identified in different camera views. These points can also be related to a floor plan (e.g., CAD model, etc.) of the location 101, which provides an additional correspondence. For example, also identifying a same wall corner in the floor plan, the 3D camera coordinate system can be related to a 2D floor plan coordinate system.

Camera layouts may be similar, but not exactly the same, from location 101 to location 101 (e.g., from store to store). Using just the camera image from the first location 101, an image matching technique can be used to identify the image-to-image relationships of camera images from the first location 101 and camera images from the second location (not shown). The image-to-image relationships permit matching the tile grids to each other. Operating under the assumption that the first and second locations 101 are built to the same architectural plan can obviate the need to do cross-camera relating of correspondence points in the second location 101.

In some embodiments, the edge server 104 and/or a device of the cloud-based system 108 (e.g., the global configuration control server 182 or the remote processing server 180) can be configured to enable a system installer to view, e.g., via a personal computing device, a live view of the camera 102 being installed with a semi-transparent template image superimposed thereon. The semi-transparent template image may include an image captured by a camera 102 previously installed at another location 101 having the same or a substantially similar floor plan. The system installer can use the live view of the camera 102 being installed and the superimposed image to adjust the position of the camera 102 so that it matches the previously-installed camera 102. Additionally or alternatively, the edge server 104 and/or a device of the cloud-based system 108 can provide an installer a live view of the camera 102 being installed and superimpose directional arrows instructing the installer where to move the camera 102 being installed. A template image depicting the correct positioning of a camera 102 can also be used for maintenance and security operations. For example, the edge server 104 and/or a device of the cloud-based system 108 can run a difference comparison model or any other suitable AI model that compares the current view of the camera 102 to the template view of the camera 102. If the edge server 104 and/or device of the cloud-based system 108 detect a difference between the current view of the camera 102 and the template view, an alert to maintenance or security personnel can be generated. Such functionality can be used by the analytics system 100 to determine, for example, whether the camera 102 was knocked out of its optimal position, whether the images being captured by the camera 102 are blurry, or whether the view of the camera 102 is obstructed (e.g., due to spray painting, covering, or other forms of vandalism).

Figure 15:
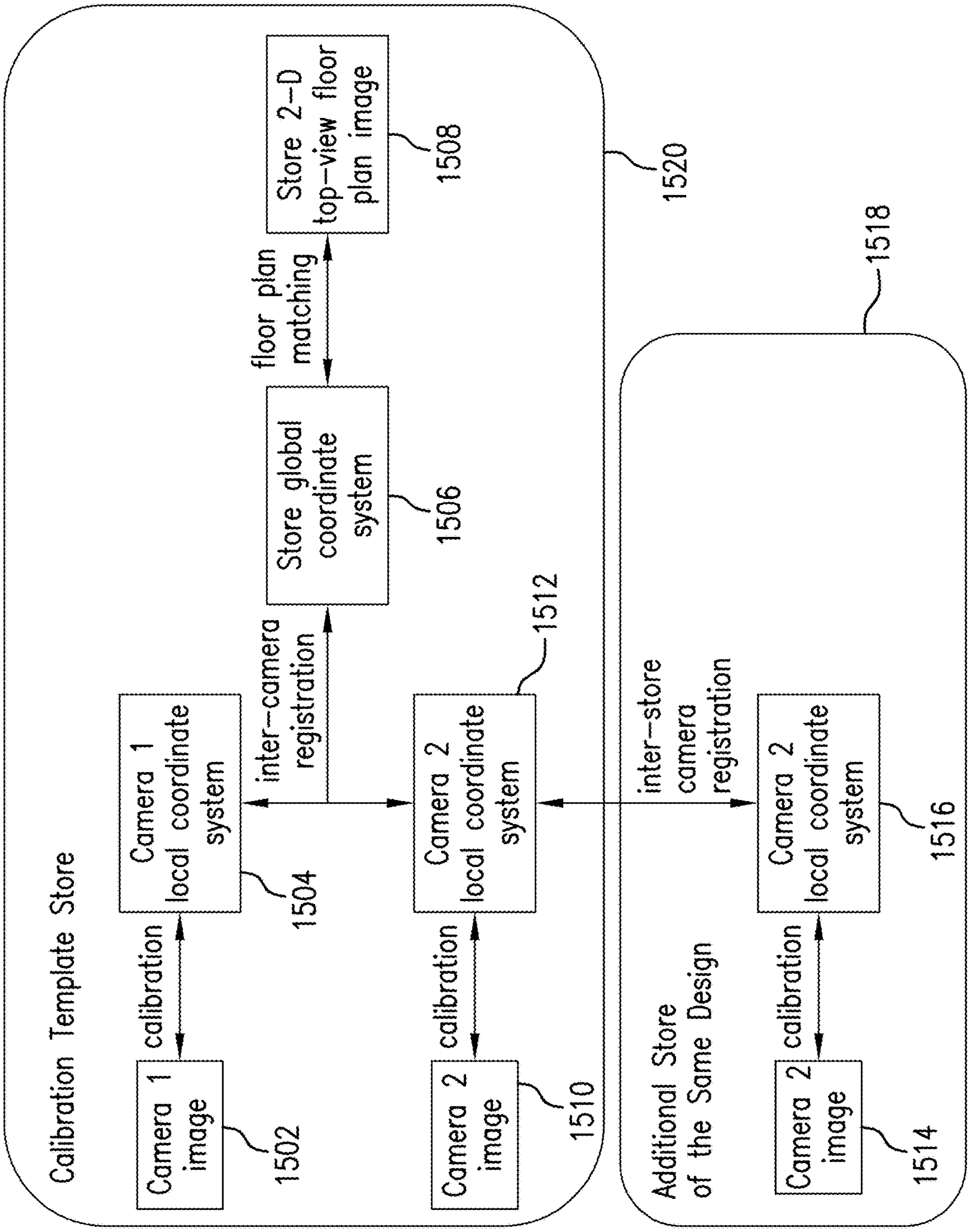
FIG. 15 is a flow diagram of an example method of camera calibration.

As illustratively shown in FIG. 15, another method of camera calibration can find the correspondences among (a) a point on the floor in a camera image 1504; (b) the same point in a globally-consistent 3D coordinate system for the location 1506; and (c) the same point on a top-down 2D floor plan of the location 1508. Given any one of those, the other two can be computed. The calibration process can determine the relationship between camera image floor points 1502, 1510 and a camera-local coordinate system 1504, 1512. The process can be semi-automatic, so it is feasible to do it for every camera 102 in every location 101, 1518, 1520 (e.g., store). Next, inter-camera registration is performed, which determines the relationships between the camera-local coordinate systems and the global coordinate system 1506. This process is based on labeling points that are visible to multiple cameras 102. Identifying those point correspondences is a difficult manual task, which may not be feasible to perform for every location 101 in a large number of locations 101. Next, floor plan matching relates the floor plan to the global coordinate system 1508. This process is based on labeling floor points in camera images that can also be located on the floor plan image. Architectural features such as wall corners and doorway edges make good candidates for these correspondences. This is a manual process that also may not be feasible to perform for every location 101, if the number of locations 101 is large.

To avoid the need to repeat steps 1506 and 1508 at every location 101, these steps can be performed once for a template location 1520, and then the results can be reused at other locations 1518 of the same architectural design, which can be referred to as query locations 1518. At a query location 1518, the cameras 102 are installed according to the same plan as at the template location 1520. There may be small differences in the placement and orientation of the cameras 102 between locations 101, 1518, 1520. These differences can be compensated for using the following process. For each pair of corresponding cameras 102: (a) points are matched across the images using a dense image feature matching algorithm (e.g., LoFTR), which is a robust process due to the differences between the two images being minor; and (b) an arbitrary floor point is mapped from one image to the other by interpolating among the nearby feature matches from step (a). By relating a small number of floor points across the images, the relationship between the two camera-local coordinate systems 1512, 1516 can be determined. Thus, the camera image at the query location 1518 is transitively connected to all of the coordinate systems of the template location 1520.

In some embodiments of camera calibration, the edge server 104 (or another component of the visual analytics system 100) analyzes high resolution images captured from one or more of the cameras 102 positioned at the monitored location 101 and being calibrated. For example, the edge server 104 can extract, from the high resolution images, one or more edges or geometric characteristics of an object (e.g., tile edges, a grid of tiles, a shelf, a door, curvature, dimensions, or any other feature or object). The edge server 104 can then compare the extracted geometric features or edges to expected dimensions, edges, or curvature. In some embodiments, the edge server 104 can utilize one or more AI models. Additionally, in some embodiments, parameters of the camera 102 being calibrated can be analyzed as part of the calibration process. For example, the Cartesian coordinates (e.g., X, Y, Z position), spherical coordinates (e.g., phi angle, theta angle, etc.), and other positional or directional information relating to the camera 102 being calibrated can be analyzed.

Camera Registration

Camera registration is the process of matching the local floor coordinate systems of individual calibrated cameras 102 in a location 101. The process yields a global 3D model of the location that contains a global floor plane and the registered cameras. Any two cameras 102 with overlapping views can be registered by picking a single tile corner (or point on the floor) mutually visible to them. After cameras 102 are activated, camera registration may be established by identifying and corresponding location features in a scene where two or more cameras 102 have views of the scene (the same physical space) from different angles. From these correspondences, positions and angles in three-dimensional space may be identified. Proper camera registration is useful in later determining that a detected first person in a first camera view is identical to a detected second person in a second camera view—i.e., that the first person and the second person are the same person. By establishing that the first person in the first camera view is occupying roughly the same three-dimensional space seen by both the first and second camera views, a degree of confidence can be assigned that the first person and the second person are the same, and tracks for the first and second person can be merged. Other computer vision techniques can also be used to understand where detected persons are in three-dimensional space and to equate people detected in different camera views as being one and the same person.

Monocular and Multiocular Depth

As described in greater detail below with regard to the image processing pipelines, a deep neural network can derive a depth map for pixels in a two-dimensional image derived from a single camera. Depth information about a scene can also, in some examples, be derived from two or more camera views.

Non-Camera-Derived Information

Information other than from video streams can be provided to the visual analytics system 100. As one example, a CAD layout of the location 101 (e.g., store) can be provided. The CAD layout can include a 2D floor plan, or can be a 2.5D (2D plus elevations layers) or 3D model of the location 101. In connection with the floor plan or other location model, a planogram can be provided. The planogram provides data on how items are placed in the store. A 2D planogram can be mapped to a 3D location in the store. A list of items sellable in the store can be provided, e.g., as a database. The list can include definition, stock keeping unit (SKU) code, Uniform Product Code (UPC) barcode, and/or other information. The item list can also include items without barcodes, like certain fountain drinks or prepared foods. Certain items may be customer-assembled, like drinks in cups that may or may not have barcodes, or hot dogs with condiments. These may be priced as one item or a combination of items. There may be some logic for how combinations are priced. Each of the floor plan, planogram, and item list may be dynamically updatable. In some examples, signals sensors 162 other than cameras 102 can be provided to an edge server 104. For example, RFID sensors can provide information about access to secure areas having RFID-based door locks. Temperature, humidity, light, weight, and sound sensors can also be provided to the visual analytics system 100 to provide additional information that can be processed to determine information about scenes and/or journeys throughout a location 101.

Areas of Interest—Manually Defined or Inferred

Once the cameras 102 are calibrated and registered, the visual analytics system 100 can go into operation. Areas of interest (AOIs) can be marked manually or can be inferred using ML models (or other AI mythologies) based on the movements of people and/or vehicles. Manual marking of AOIs can involve, for example, using a graphical user interface to draw an area or region (e.g., a polygonal area) on the floor of a scene, either in a camera view or in a 2D diagram or 3D model than can be derived from a floor plan or a 3D model of the location or scene. People entering the defined AOI can subsequently be flagged as having entered the AOI, and entry time, exit time, total time spent in the AOI, number of times exiting and re-entering the AOI, etc., can be noted as metrics relevant to the journey of the person in the location.

AOIs can also be automatically established by ML inference. For example, an AOI ML model can be trained using defined AOIs and tracks, and can thereby learn the meaning of an AOI with relation to the tracks of people as they move through the monitored location 101. Subsequently, the AOI ML model can observe the tracks of people derived from measured data and can automatically propose or designate certain areas in the location 101 to be AOIs. As examples, in the context of a store location 101, an AOI ML model may establish that certain areas in a store are a checkout station, a checkout queue, a coffee bar, a soda fountain, a restroom, a walk-in beverage cooler, a restricted “employees only” space or entrance thereto, and so forth, without these areas in the store needing to be manually defined by a human user in accordance with the manual AOI definition method described above.

Certain areas of a monitored location 101 may be restricted by role. For example, an area that is an employee door may be restricted to employee-only use. The visual analytics system 100 can determine whether certain people are in certain places inappropriately. The appropriateness of such use may be based on timing (e.g., an area appropriate to access during the day may be off-limits at night), dress or appearance (e.g., a uniformed employee or vendor may be allowed access to the back of a refrigerated case whereas a customer would not be) or presented identification (e.g., whether an RFID card reader has sensed a valid ID tag), among other factors. Information from non-camera sensors 162, like an RFID card reader, can be fused with metadata derived from cameras 102 to interpret the appropriateness of access events. In other examples, customers may be allowed access to certain areas, but may be prohibited from certain activities in those areas, and the visual analytics system 100 may be able to detect and notify about such prohibited behavior. For example, a customer may be allowed to serve himself coffee from a coffee maker, but may not be allowed to open a meat container and scoop out some meat, whereas an employee would be allowed to do so.

Accurate retail analytics may depend on an ability to localize a person in some predefined AOI. Such an ability can help provide information such as a time when the person reaches a cashier counter, how long a person has been in a checkout queue, or how long it takes a person to checkout. To accurately estimate this information, the 3D perception of the environment can be leveraged. As described in greater detail below, the edge server 104 can utilize a depth estimation ML model to provide dense depth estimates for locations in an image. Respective singular coordinates can be determined as representing spatial positions of each person in a scene or set of scenes. Since each person is made up of many points in a point cloud of the depth estimate, spatial sample clustering and averaging techniques can be used by the edge server 104 to predict the centroid of a person in the point cloud space. A 3D vector that is normal to the floor can be estimated using the point cloud. Using this 3D normal vector, the person's 3D centroid coordinate can be projected onto the same plane as the floor. This enables a “birds-eye view” representation of all the people in the monitored location 101. With this 2D projected floor coordinate information, any given person's position can be localized with respect to defined geofence polygons or AOIs.

Roles and Functions

The visual analytics system 100 can also be configured to distinguish people by their function, via dress, behaviors, or some combination of these or other factors. Functions can include employee, customer, security guard, or vendor, as examples. Roles can mutate over time, as when an employee or a security guard makes a purchase and temporarily assumes the role of customer. The visual analytics system 100 may be able to trigger an employee discount, in such a case. Roles and functions classifications can lead to actions and interpretations downstream in the processing of visual analytics information, as described in greater detail below.

Items

In some embodiments, the visual analytics system 100 can use ML models or other AI techniques to detect items as they move through a store or monitored location 101. An item picked up by a customer from a shelf or rack can be tracked through the store as it journeys with the customer in a hand, shopping basket, or shopping cart. In some examples, a planogram and/or item lists can be utilized to facilitate identifying or monitoring items that are picked up and carried. For example, if a customer is detected as "reaching" at a particular position and/or direction within a store 101 (see discussion of gestures, below), and the planogram for that store 101 indicates that a shelf at or near the particular position contains one or more of a particular item, then the visual analytics system 100 can identify the customer as having picked up the particular item, to within some degree of certainty. The certainty can be augmented or reduced, for example, by subsequent observations of the item in, or not in, the customer's hand, shopping cart, basket, etc. The visual analytics system 100 can also track objects that are brought into the store 101-*a* customer's own cup, wallet, keys, children, wig, etc. Customers may put personal items that do not belong to the store 101 in different places throughout the store, such that these items may become part of the environment and would be useful to track, for example, to ensure that customers are not charged for their own items that they brought into the store or to assist in locating lost or stolen personal items.

Detected or derived visual characteristics: poses, gestures, facial expressions, demographics, tracks, and journeys In some embodiments, an ML model can be used by the edge server 104 and/or the remote processing server 180 to draw a "skeleton" (a small number of connected lines) on a detected person (or object) in a single given frame, the skeleton indicative of the relative placement in space of the person's limbs, trunk, and head. In some examples, the skeleton is in 2D and can be extrapolated into 3D. The skeleton can define a particular pose of the person, which is a representation of the person's body state (e.g., the relation of limbs, trunk, and head with respect to each other) in three-dimensional space for a given instant in time. Particularly when used in conjunction with other information, such as a floor plan or a planogram (a 2D or 3D map defining locations of items), determined pose can be useful in determining where a person is, where the person is looking at, where the person's gaze is directed, etc. Pose information therefore allows a determination to be made, for example, that a person looked at a certain item on a shelf.

A gesture is a sequence of poses over a period of time, rather than at an instance of time. Gestures can include things like "reaching," "pointing," "sitting down," "standing up," "falling," "stretching," "swiping a credit card," "extending a hand to tender cash," and so forth. In some examples, the edge server 104 utilizes a trained ML model to determine gestures from image data from multiple successive captured frames. In other examples, the edge server 104 can utilize a trained ML model to determine gestures from poses determined from multiple successive captures fames.

Given a clear view of the face of a person, the edge server 104 can utilize a trained ML model that determines whether the person is, for example, smiling, frowning, has raised eyebrows, and so forth. Facial expressions can, in turn, be used, in some examples in conjunction with other indicators, to determine an emotional state of a person, such as "content," "annoyed," "delighted," "angry," and so forth. Facial expression determination can be done without performing facial recognition, that is, without determining information indicative of the person's personal identity.

Demographics of interest such as age and gender of detected people can also be determined by the edge server 104 using visual analytics (e.g., via various ML and/or AI models). In some embodiments, the edge server 104 is also configured to determine various demographics of interest relating to detected vehicles. Demographics of interest for vehicles can include make, model, year, and color. Tee ML models utilized by the edge server 104 can be trained to detect these demographics, and various other metrics can be derived from these demographics.

A track is a spatiotemporal representation of the position of a person over time. Tracks of the same person from multiple camera views can be merged to create tracks that span across different scenes in a location. The collection of tracks spanning between a person's entrance into and an exit out of a surveilled location (including, in some examples, outdoor areas around the location) can be termed a journey. In some examples, each person can be assigned a track ID, a unique identifier for a particular journey conducted by the person. A journey can be annotated with various actions taken during the journey, such as "got coffee," "stood in line," "paid for coffee," and "left the store," or with various AOIs entered and exited during the journey, along with timestamps for these various actions and AOI entrances and exits. In a retail store context, a journey serves as a record of a person throughout the person's travels into, around, and out of the store. A journey can thus be consulted to tell, for example, when a person enters a checkout queue and exits the queue, in order to determine how long the person spent in the queue, or when they enter a cashier area and exit a cashier area, in order to determine how long the person spent at checkout. Journeys can be consulted to access information on the individual person level, or in aggregate to determine, for example, how many people are in a queue at any given time, how many people are checking out at any given time, what the average check-out time is, what the average time is that a person or people were standing in a queue between 8:00 a.m. and 9:00 a.m., what the average length of a queue is, and so forth.

Frame-to-Frame and Camera-to-Camera Tracking of People and Vehicles (Person and Vehicle Re-Identification)

As described above with regard to camera registration, the visual analytics system 100 can recognize people or vehicles in different image frames or camera views as identical across the different image frames or camera views. In some examples, the edge server 104 can utilize an object detection model to work on a per-frame basis, meaning that no temporal information (i.e. previous detection coordinates) is utilized by the object detection model. For person and vehicle tracking, detections from previous frames can be matched in a re-identification process to detections in the current frame.

To perform person or vehicle re-identification, some visual features can be extracted from the detected person or vehicle from each view, some kind of similarity between those features can be computed by the edge server 104, and based on the computed similarity exceeding a threshold (e.g., an adaptive threshold), then the two people or the two vehicles in the different camera views can be declared to be the same person or vehicle. Otherwise, they can be declared by the edge server 104 to be different people or vehicles.

By embedding person images into features, distance comparisons between non-facial features from consecutive frames can be used by the edge server 104 in the re-identification process. Using the detection box coordinates from the person detection ML model, a cropped image containing a single person in each image can be generated by the edge server 104 for all person detections in a video frame. These cropped RGB images can then be used by the edge server 104 as inputs to a custom embedding convolutional neural network (CNN) inspired from OSNet architecture. The output of the CNN can be, for example, a 512-D feature vector representation of the input image. The edge server 104 can then generate a feature vector for all cropped-person images using the CNN, and can represent compressed visual features extracted from an image of a person. The edge sever 104 can aggregate these visual features with other local features extracted from a person to re-identify persons with similar features in consecutive frames. A re-identification (ReID) ML model can be trained using circle loss, gem pooling, and random grayscale transformation data augmentation functions. Such ReID can be trained and utilized by the edge server 104, devices of the cloud-based system 108, or any other device or computing system of the visual analytics system 100.

As another example, the edge server 104 can compute a physical attribute vector for each detected person or vehicle, which vector can include, for a person, information such as estimated height or other body dimensions, estimated gender, estimated age, or other metrics as determined by the visual analytics system, or for a vehicle, information such as estimated make, model, year, and color of the vehicle. The identity declaration by the edge server 104 can then be based on comparison of attribute vectors computed for detected people or vehicles in different frames or camera views.

As another example, for each detected person in a video camera view, the floor projections (the pixels where their feet touch the ground) can be determined by the edge server 104. These pixels are consequently mapped to the two-dimensional store map. This is done across all cameras 102 in the location 101 by the edge server 104. All people found to occupy the same physical space on the location floor can then be declared identical persons. Different methods for person re-identification, such as those described above, can be combined and weighted in various ways to improve re-identification confidence and accuracy.

Actions and Signatures

Actions can be derived from (defined based on) poses, gestures, facial expressions, tracks, AOIs, time markers, or other information. As with AOIs, actions can be defined manually or automatically. As an example of a manual definition, a "waiting in checkout queue" action can be defined based on a determination that a person has lingered in a checkout queue AOI for more than a defined amount of time (e.g., five seconds). As another example, a "getting coffee" action can be defined based on a determination that a person has entered a coffee station AOI and has made a gesture that corresponds to reaching for a coffee pot or coffee dispenser control. Action definitions can be entered using a GUI or programmatically. Subsequently, ML models can be used by the edge server 104 (or a computing device of the cloud-based system 108) to determine signatures of behavior, based on any of the underlying data types discussed above. For example, in combination with planogram information, gesture information can be used by the edge server 104 to determine, for example, the action that a person picked up an item from a shelf after looking at it, the action that a person did not pick up an item from a shelf after looking at it, or that a person picked up an item and then put it back.

An action ML model, having been trained on defined actions and other data, can also be used by the edge server 104 to define actions automatically, without the actions needing to have been defined manually. For example, the edge server 104 can utilize a ML model to recognize, based on video data, pose data, or other data, a signature of a person waiting in line, a signature of a person completing a purchase transaction, and so forth.

Certain actions that employees or vendors may be supposed to do in certain ways can be documented, e.g., in an employee playbook. The visual analytics system 100 can be configured to validate whether employee or vendor actions comport with reference policies or expectations. As an example, employees may have a task list (e.g., clean floors, put items on the shelves, help a customer do something or find something, go to the back room, as distinct from a shopping area, clean the clogged pipes of a soda dispenser, change the carbon dioxide tank, etc.). The visual analytics system 100 may determine whether employee tasks were performed, how well they were performed, and how much time it took to perform them. Similarly, in some embodiments, the visual analytics system 100 can be used to determine whether vendors acted in accordance with permissible activities or established routines. As an example, a vendor may be permitted or required to use a separate door to access a location, or to stock items in certain places. The visual analytics system 100 can be used to answer questions about whether activities or behaviors of a vendor were expected or unexpected, whether a vendor arrived on time, or whether a vendor did the vendor's job. Vendors may be expected to place items but not remove them, or vice versa. In some embodiments, the visual analytics system 100 can alert to vendor theft via the edge server 104 and/or a computing device of the cloud-based system 108. The visual analytics system 100 can also be configured to follow the flow of items associated with people of certain roles, and whether the items are carried in accordance with expectations or routines. In some examples, the visual analytics system 100 can compare observed item transits with an item list for validation.

Interpretations of Actions

The edge server 104 and/or computing devices of the cloud-based system 108 can interpret actions. For example, the edge server 104 and/or other computing devices of the visual analytics system 100 can make interpretations such as, "this person is in this spot" and "this item is in this spot." The edge server 104 and/or computing devices of the cloud-based system 108 can also be employed to determine whether items are the right place in the store, per the planogram, whether the items were stacked correctly, whether there are any misplaced items, whether there are any items out of stock. Another example action interpretation that could be made by the edge server 104 can be, "this person took an item from here and put it back in the wrong place." Additionally or alternatively, any action interpretations made by the edge server 104 and/or computing devices of the cloud-based system 108 can be location-based.

Foveal Processing of Streams

When processing video streams, it is not always necessary, and generally not desirable, for the edge server 104 to capture details at the highest resolution or frame rates. Such processing can be expensive both in terms of LAN network bandwidth and edge server 104 processing bandwidth. In embodiments in which the edge server 104 observes a location 101 in four-dimensional views including the three-dimensional space plus time, the edge server 104 can extract four-dimensional hypertubes of relevance from processed data, and those four-dimensional hypertubes can be zoomed in on in a foveal manner by the edge server 104. Thus, for example, initial processing to derive the hypertubes can be performed by the edge server 104 at a relatively sparse data rate of three frames of video data per second, and/or at less than full image resolution of the full HD resolution of the frames. At the reduced frame rate and/or image resolution, the determinations made by the edge server 104 about actions and their causality may not be initially made at high confidences. As an example, it may be determined from a first scene at a first time that a person had nothing in the person's hands, and it may be determined from a second scene at a second time subsequent to the first time that a person had a candy bar in the person's hands, but no action corresponding to picking up a candy bar may have been recorded for the person in the intervening time between the first time and the second time. Upon recognition of this causal gap, the edge server 104 can automatically re-consult and re-process stored video stream to examine previously unprocessed frames, and/or previously unprocessed pixels within frames, effectively "zooming in" in space and time, in an attempt to more clearly determine, with higher confidence, that the candy bar was picked up during the person's journey, and where it was picked up from, based on signatures determined from the previously unapprised video data. Such foveal processing can automatically and adaptively be performed by the edge server 104 using buffered video data that is re-consulted as necessary.

As another example, as a customer approaches a checkout queue, the hypertube of the customer can be reviewed by the edge server 104 to determine or estimate what items the customer picked up along their journey, and thus to probabilistically determine or estimate a checkout list ("basket") for the customer. The action of entering the checkout queue can thus serve as a trigger to the edge server 104 to review a substantial amount of video data spanning back in time minutes or hours to note where the customer stopped, what the customer looked at, what the customer reached for, what the customer picked up, what the customer put back, and so forth. The edge server 104 can assign a level of confidence to the determination or estimation of the checkout list. The checkout list can, in some examples, also be informed by information from stored point-of-sale (POS) records showing the purchase history of the customer. The edge server 104 can compare the determined or estimated checkout list against an actual checkout list, in some embodiments. Anomalies between the determined or estimated checkout list and the actual checkout list can form the basis of alerts, notifications, or reports, which can be generated by the edge server 104 and/or computing devices of the cloud-based system 108.

Situation Prediction

Collected data of the types described above can be used by the edge server 104 and/or computing devices of the cloud-based system 108 to train predictive models (e.g., ML or AI models) capable of predicting when certain situations will arise in the respective context of a particular location 101. For example, a ML or AI model can be trained to predict, based on tracks and behaviors of customers in a store, that a run on the checkout will occur within a certain time (e.g., within five minutes). Such a prediction can form the basis of an alert that can be generated by the edge server 104 and/or a computing device of the cloud-based system 108, and subsequently provided to a cashier to go and staff a checkout station in advance of the predicted run on the checkout.

Performance Reporting

Collected data of the types described above can also be used by the remote processing server 180 (or other devices of the cloud-based system 108) to generate reports that can provide a manager (e.g., a store manager, or a head nurse) views into business performance, such as a view of customer traffic, or a view of how one staffing shift is performing, e.g., relative to other shifts. In some embodiments, the remote processing server 180 can classify collected information according to certain metrics that are key performance indicators, e.g., customer conversions or queue time. In an example, a retailer may have as a business goal that they never want a person to wait more than a certain amount of time (e.g., 30 seconds) in queue. The remote processing server 180 can be configured to analyze stored data (e.g., metadata generated and transmitted by the edge server 104) be identify instances in which queue time for a customer exceeded this threshold, and to determine the reasons why it happened, e.g., whether the customer was busy on the customer's cell phone or, by contrast, whether the cashier failed to timely and attentively serve the customer. Reports can be generated by the remote processing server 180 that can link to individual video clips evidencing the determined behaviors. Such reports can be used for performance reviews or training. Training or teamwork exercises can be automatically suggested by the remote processing serve 180 based on the reports. The reports can be used as feedback to a team to improve its performance.

Conversion and Utilization

Reports can be generated by the remote processing server (or other computing devices of the cloud-based system 108) that provide insights as to different kinds of customer conversion rates and location space, facility, or equipment utilization rates. As an example, a first customer conversion can occur from the street to the parking lot of a store, a second customer conversion can occur from the parking lot to the store, and a number of other conversions can occur inside the store, such as a conversion from entering the store to collecting items to purchase, and a conversion from collecting the items to actually purchasing the items. Visual analytics can be used by the remote processing server 180 to compute conversion rates for various types of conversions, such as the example conversion types given above and others that may be desired, based on journey data. As an example, the fact that a person has entered a store does not mean that the person is going to buy an item in the store: the person may be in the store to pay for gas, use the restroom, stay cool on a hot day, or rob the store.

In some embodiments, the remote processing server 180 (or other computing devices of the cloud-based system 108) can compute and compare utilization from journeys of people and vehicles. Examples of utilization metrics can include how often a parking spot, or a range of parking spots, is utilized. The remote processing server 180 can use visual analytics to consider parking as an activity and can compute metrics on how frequently an unallowed space is used for parking. The remote processing server 180 can also compute metrics on how often cars are detected loitering in places that are not parking spots. Utilization per spot or area can be measured by the remote processing server 180. A location 101, such as a store or filling station, may be equipped with gas pumps. With regard to gas pumps, the fact that a car is detected at a gas pump may not by itself be a good indicator that the car is pumping gas, without a further indicator such as a detected gesture that a person has picked up a pump nozzle and inserted it into the car. Accordingly, the remote processing server 180 can use visual analytics to obtain much more accurate metrics regarding pump parking utilization, answering when pump parking is being used for gas pumping as opposed to when it is just being used for store parking or other purposes. For loss prevention purposes, the remote processing server 180 can use visual analytics to detect if an unauthorized device is used at a gas pump and can create alerts for theft.

Human Activity Performance Enhancement and System Learning

In some embodiments, the visual analytics system 100 can be used as a system to enhance the performance of a human activity. The activity can be any activity. The visual analytics can be applied to healthcare, e.g., in the context of nurses performing actions on patients. Every action a nurse performs on a patient may be coded and can generate a medical record, e.g., in EPIC. An action ML model can be trained on how various nursing care actions are performed. Once the visual analytics system 100 learns how an action is supposed to be, the system 100 can flag outlier actions that appear to show performances outside the norms of this action. Such outliers can be flagged for review. A head nurse, for example, can receive a report from the visual analytics system 100, including a link to a video of an action determined to be outside the norm, and the head nurse can evaluate whether the action represented care provided outside the norm. Where the head nurse provides feedback to the visual analytics system 100 (e.g., "the flagged action was normal"), the action ML model can be retrained, and the visual analytics system 100 can learn. Such analysis and processing can be performed by the edge server 104 and/or the remote processing server 180 (or any other computing devices of the cloud-based system 108).

Allocation of Resources—Notification Queuing

Additionally or alternatively, the visual analytics system 100 (e.g., via the edge server 104 and/or the remote processing server 180) can automate certain things, such as allocation of resources. For example, for a nurse making the rounds, the visual analytics system 100 can make a determination that a patient is awake, and can issue a recommendation that the nurse should go to the patient's room first, because later the patient may not be awake, and visiting the patient then would be a waste of nursing time. In another example, the visual analytics system 100 can also optimize the announcements to nurses. Interruption from announcements and notification communications poses a major problem in nursing. Nurses can receive hundreds of messages a day, often at times when they are doing something critical. Such interruptions can be distressing to nurses. Thus, if the visual analytics system 100 can accurately determine what kind of task the nurse in engaged in, the system 100 can hold off on delivery of a message until the nurse finishes performing a high-priority task. For instance, if a patient is in distress, a high-priority notification should issue, instructing the nurse to leave the patient that the nurse is changing the diaper of, and run to the next room to attend to the distressed patient. But if a notification is only regarding a patient who wants water, an alert to that effect can be held off until the nurse to whom the notification is directed finishes with a higher-priority task. Accordingly, the visual analytics system 100 can manage prioritization of actions according to the context in which humans are, giving them situational awareness.

Measurement, Compliance Checking, and Improvement of Operational Efficiency at a Retail Store.

As discussed herein, the visual analytics system 100 can track and quantify the behavior and motions of objects and people at a monitored location 101. In addition, the visual analytics system can be configured to utilize that capability to increase operational efficiency of a highly organized operation with well-defined workflows, e.g., at a retail store. There are numerous capabilities of the visual analytics system 100 available to define such workflows, track workflows using manually entered data, and help optimize the workflows. For example, the working hours of each worker can be entered by a supervisor and tracked when they check in and out of work. The workers' responsibilities can be listed and optionally scheduled for certain time periods. Workers and supervisors can then manually mark those tasks complete and may assess the duration and quality of the work. These inputs can be used by the visual analytics system 100 to understand how long it takes to perform a task and potentially train team members who are performing below a target efficiency. The visual analytics system 100 may also analyze indirect metrics that relate to and entire team of workers, such as, for example, the wait time for a customer, the cleanliness of a restroom, etc. In some embodiments, measurement of the various metric can be performed by "secret shoppers" in order to normalize scores across various locations 101 and avoid intentional or inadvertent measurement errors. It should be appreciated that store teams can be rewarded on the basis of their performance relative to a target and/or relative to each other.

In some embodiments, the edge server 104 at each monitored location 101 or the remote processing server 180 (or other computing devices of the visual analytics system 100) can be configured to automatically score worker performance as a function of data captured by on-premises cameras 102 that is analyzed using one or more artificial intelligence models (e.g., machine learning models, etc.). For example, the visual analytics system 100 can be used for compliance checking and measuring operational efficiencies in connection with food operations at a convenience store. Convenience stores compete with Quick Serve Restaurants (QSR) and serve prepared food items. Some of these food items are prepared to order, in which case the operation is very similar to a QSR. Most of the food items, however, is pre-cooked or pre-warmed to reduce the wait time and increase convenience. The preparation and maintenance of the food item is a complex workflow. The parameters of this workflow and the execution of the workflow determine the success, i.e., the revenue and profit at the store and the satisfaction of customers.

For example, a simplified workflow for a convenience store roller grill includes the following steps: (1) $N_{h1}$ hotdogs are placed at planogram location $A_h$ at time $T_1$; (2) $N_{t1}$ taquitos are placed at planogram location $A_t$ at time $T_1$; (3) remaining hotdogs on the roller grill are moved forward and $N_{h2}$ hotdogs are placed in the back of the grill at time $T_2$ (replenishment); (4) remaining taquitos on the roller grill are moved forward and $N_{t2}$ taquitos are placed in the back of the grill $T_2$ (replenishment); (5) hotdogs of the first batch remaining on the roller grill with age $t_{h,1}>t_{shelflife\text{-}h}$ (of count $S_{h3}$) at $T_3$ are thrown away by an employee; (6) taquitos of the first batch remaining on the roller grill with age $t_{t,i}>t_{shelflife\text{-}t}$ (of count $S_{h3}$) at $T_3$ are thrown away by an employee; and (7) repeat steps 1-6. In this workflow, $N_i$ and $T_j$ are critical parameters that are determined through an analysis of previous data. $S_k$ are measurements that are currently employee estimates. The age of hot dogs and taquitos $t_1$ are currently unknown. Even the current POS data on the number of hot dogs and taquitos sold is inaccurate today.

In some embodiments, the visual analytics system 100 (via the edge server 104 and/or a computing device of the cloud-based system 108) is configured to classify food items by their appearance and their placement in a planogram. In some embodiments, labels can be placed on the roller grill to override the default planogram, which allows for a "soft planogram." The visual analytics system 100 (e.g., the edge server 104, etc.) is configured to read those labels and update the planogram currently in effect. The visual analytics system 100 is also configured to track items as they are placed, moved and removed, which allows the age (t) attribute to be assigned to each item. The visual analytics system 100 (via the edge server 104 and/or a computing device of the cloud-based system 108) can visualize the data in the GUI to help employees. An expiration date can be set for each type of item, and the GUI can be configured to display the approximate age of each item through a color code (e.g., green for fresh, yellow for about the expire, red for expired).

The visual analytics system 100 (via the edge server 104 and/or a computing device of the cloud-based system 108) may also be configured to classify people who interact with the roller grill (e.g., customers, employees, maintenance workers, etc.). It should be appreciated that by classifying the people interacting with the roller grill, the visual analytics system 100 can more accurately classify their behavior. For example, when an employee removes an item from the roller grill, that item is marked by the visual analytics system 100 as disposed. When a customer removes the item from the monitored location, it can be marked by the visual analytics system 100 as sold.

In some embodiments, the visual analytics system 100 is configured to measure missed opportunities by identifying customers (of quantity $M_i$) who spend a certain amount of time looking at a food section (e.g., a roller grill) that is not stocked at the time, and who end up buying no food items from the food section.

Every store has different objectives when it comes to the balance among revenue, food waste, labor cost, food quality, customer satisfaction, etc. The relative importance of these key performance indicators (KPIs) are entered as weights in an optimization algorithm utilized by the visual analytics system 100 (e.g., the edge server 104 and/or the remote processing server 180). Based at least in part on, or otherwise as a function of, the entered weights, the optimization algorithm yields parameters $N_i$ and $T_j$ to guide food operations. $T_j$ can be determined ahead of time assuming a certain flow of customers and is simpler to implement. Those times are presented to employees as tasks at given times. Unfortunately, the predicted flow of customers and purchases can be inaccurate on certain days. This results in a suboptimal performance. The next step in improvement is a flexible schedule communicated to the employees through alerts. In some embodiments, the remote processing server 180 and/or the edge server 104 is configured to generate and provide such alerts to employees. Management sets deviations at which these alerts should go out. As disclosed herein, the visual analytics system 100 utilizes one or more AI models (e.g., machine learning models, etc.) to provide inferences and optimizations. Such models continually update predictions on when individual food items will run out. Additionally, the models can be used by the analytics system to predict or keep a current record of which food items have expired (or are about to expire). When any of these predictions are off by the deviation threshold, employees are requested to act out of schedule (real time and predictive) through alerts, which can be generated by the edge server 104 and/or the remote processing server 180. In some embodiments, the visual analytics system 100 is configured to determine and record whether those generated alerts lead to prompt action.

In some embodiments, the visual analytics system 100 also provides more effective dynamic pricing schemes. Dynamic pricing is used in food sales to reduce waste and improve profit margins by offering a discount on food that is about to expire (avoiding a complete write-off). There are several difficulties in a traditional implementation. For example, the manual revision of pricing is labor intensive and error prone. If implemented incorrectly, the erosion of price of food that would have nevertheless been sold at full price offsets any gains. As such, the visual analytics system 100 improves on the traditional flow in the following ways: (1) It has more refined and accurate data on the age of food items; (2) it has more accurate predictions of customer flow (taking into account all lot and store movement); (3) thanks to alerts, the time for a discount is not fixed, preventing from customers to bargain-hunt (and thus erode full-price sales); (4) the discount can be removed instantly if the current sales prediction points to regular price sales being sufficient; (5) thanks to SA, the customer is charged what they saw, preventing confusion, potential customer dissatisfaction (overcharging) and lost revenue (undercharging); and (6) if the store prefers to place older discounted items in a certain area in the planogram, the visual analytics system 100 is informed whether the customer's item is from that area or from the regular area. (Impossible to tell visually for a traditional POS operation). It should be appreciated that although the above examples relate to retail stores and food items, the visual analytics system 100 is configured to provide comparable workflow functionality to other areas.

Visual Analytics System Architecture

Figure 5:
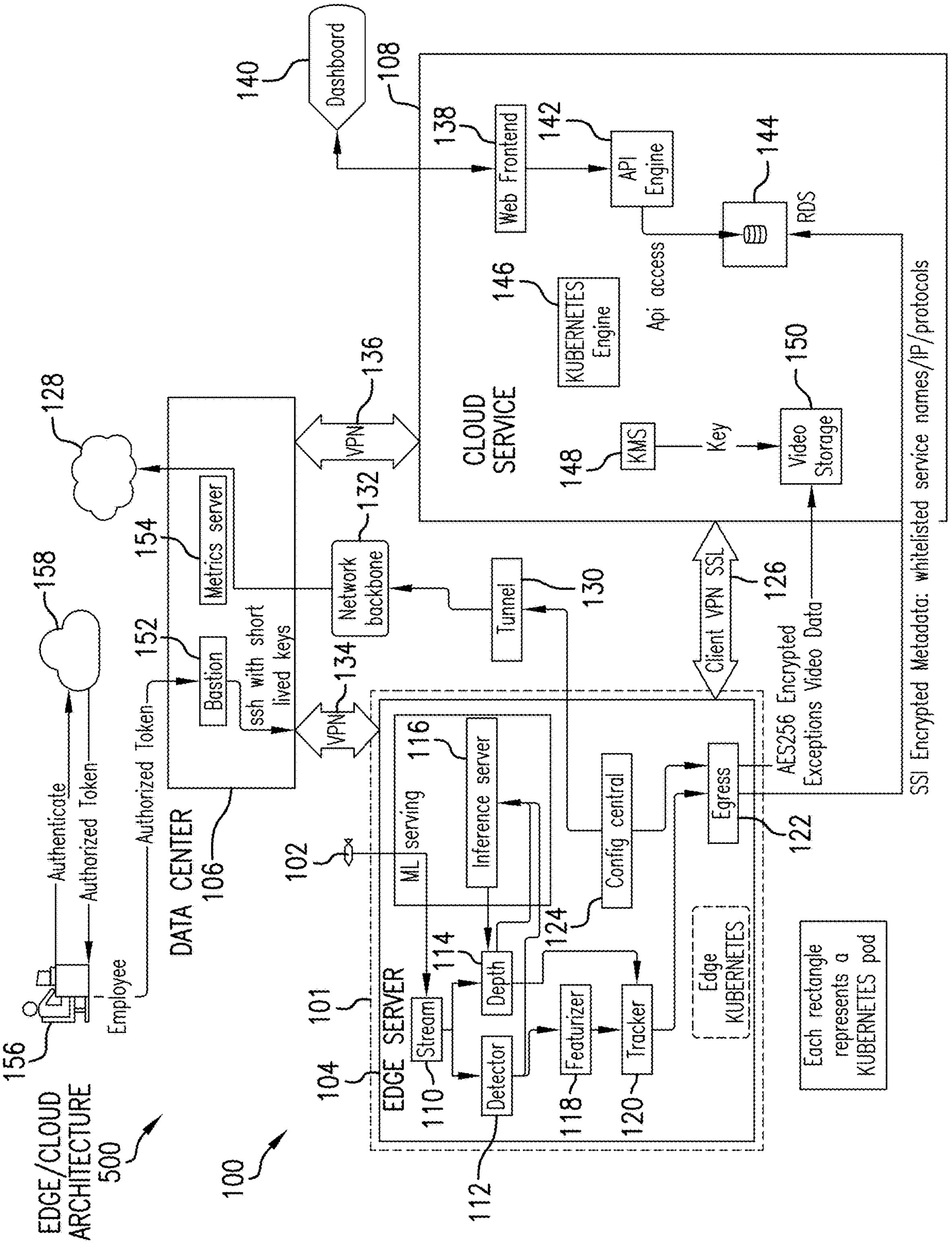
FIG. 5 is a block diagram of an example architecture of the visual analytics system of FIG. 1.

FIG. 5 is a block diagram illustrating an exemplary architecture 500 for the visual analytics system 100 shown in FIG. 1. A video camera 102 installed at a location 101 for which visual analytics are desired is communicatively coupled to an edge server 104 also installed at the location 101. The location 101 can be, for example, a store. Although only one camera 102 is illustrated in the diagram, there can be multiple cameras 101, as well as multiple other sensors 162 or devices 172, coupled to the edge server 104. The edge server 104 is communicatively coupled to a hosted data center 106 and a cloud-based system 108 (or other computing service). The hosted data center 106 can be accessed by an employee logging in using, for example, a remote computing device 156 and a cloud-based authentication service 158. The hosted data center 106 can include a bastion 152 and a metric server 154. The edge server 104 can, for example, run the Linux operating system and Kubernetes for job management. The edge server 104 can also run a plurality of containers, each of which can utilize resources such as CPU, memory, and an AI acceleration unit, such as a GPU or TPU. Thus, multiple containers can use the same resources of the edge server 104, and Kubernetes can manage the containers, together with other software.

Video streams from the camera 102 can be provided in real-time (or near real-time) to the edge server 104. An image frame capture software component 122 running on the edge server 104 can capture images from the video streams. ML or other AI models or software components 112, 114, 118, 120, 122, which can be arranged in stages as pipelines (e.g., one pipeline per camera), can be run on the captured images to generate interpretations of the video streams in the form of metadata. The metadata can then be sent over the Internet (or other external networks 105) to the cloud computing service 108, e.g., either directly or via a virtual private network (VPN) 126, which may run through one or more other network facilities not illustrated in FIGS. 1 and 5.

The cloud computing service 108 (e.g., the cloud-based system 108) can provide additional data processing and storage of the metadata and other data derived from the metadata. For example, the cloud computing service 108 can include a web frontend 138 that serves a web-based dashboard application 140 to control an application-programmer interface (API) engine 142 that in turn can control a relational database service (RDS) 144 that can store metadata from the edge server 104. The cloud computing service 108 can also include a Kubernetes engine 146, a key management service (KMS) 148, and video storage 150 that can store video data from the edge server 104.

Configuration Control Platform

A configuration control platform (e.g., the global configuration control server 182 and/or the remote processing server 180 of FIG. 1) can be used to provision software to the edge server 104 and/or to any extreme edge computing devices managed by the edge server 104; to train and update ML models or AI models used by the edge server 104; to control the edge server 104 and its associated extreme edge computing devices; to update software on the edge server 104 and its associated extreme edge computing devices, and to add or remove visual analytics features or other system features provided to a customer. The configuration control platform 182 can be presented, for example, as a web application served from the cloud computing service 108 (e.g., via the web server 390 shown in FIG. 3) or from the cloud 128. For example, as illustratively shown in FIG. 5, the edge configuration control platform 124 can be a thinner, lighter version of the configuration control platform that runs as a service on the edge server 104. Instances of the edge configuration control platform 124 running on the edge server 104 can frequently communicate with the configuration control platform 182 to provide connectivity between the edge server 104 and the cloud service 108 and/or cloud 128. The edge configuration control platform 124 can include multiple components, including a configuration component and an administrative API service component. These components collectively permit provisioning of software on the edge sever 104, maintenance of software on the edge sever 104, collection of metrics from the edge sever 104, and taking of actions upon finding issues with the edge sever 104.

Because the camera 102 is managed by the edge server 104 and communicates directly with the edge server 104 (as opposed to communicating with the cloud-based system 108 or the cloud 128, for instance), the configuration control platform can provide a single point of entry for configuration of the cameras 102 as well as what may be a large plurality of other cameras 102, sensors 162, and devices 172 at the location. This single point of entry for device configuration stands in contrast to conventional internet of things (IOT) device configuration, in which every device may communicate directly with the cloud 128. The architecture 500 of the visual analytics system 100 is therefore particularly advantageous in a low network bandwidth situation, as compared to architectures using IoT devices in which every device at the location (potentially hundreds of them) consume LAN and internet bandwidth on the way to the cloud 128. Likewise, use of a single configuration control platform for all such devices offers advantages as compared to IoT devices that are each managed through a different interface. For instance, the device infrastructure of a retail location can be impracticable to manage when the coffee machine has its own web-based interface, each one of the security cameras has its own separate web-based interface, etc. The configuration control platform (e.g., the global configuration control server 182 and/or the remote processing server 180 of FIG. 1) provides a central location that can have self-healing abilities, can manage the location, and can give administrative personnel a sense as to what hardware devices at the location are running and what software services are running on the edge server 104 and how they are each performing.

The web-based interface of the configuration control platform (e.g., the global configuration control server 182 and/or the remote processing server 180 of FIG. 1) can be used to perform initial setup of a location 101 for visual analytics once the cameras 102 and edge server 104 are installed. In the web-based interface of the configuration control platform, a new location 101 can be added, and information about the location 101 can be entered, such as the street address of the location.

Figure 10A:
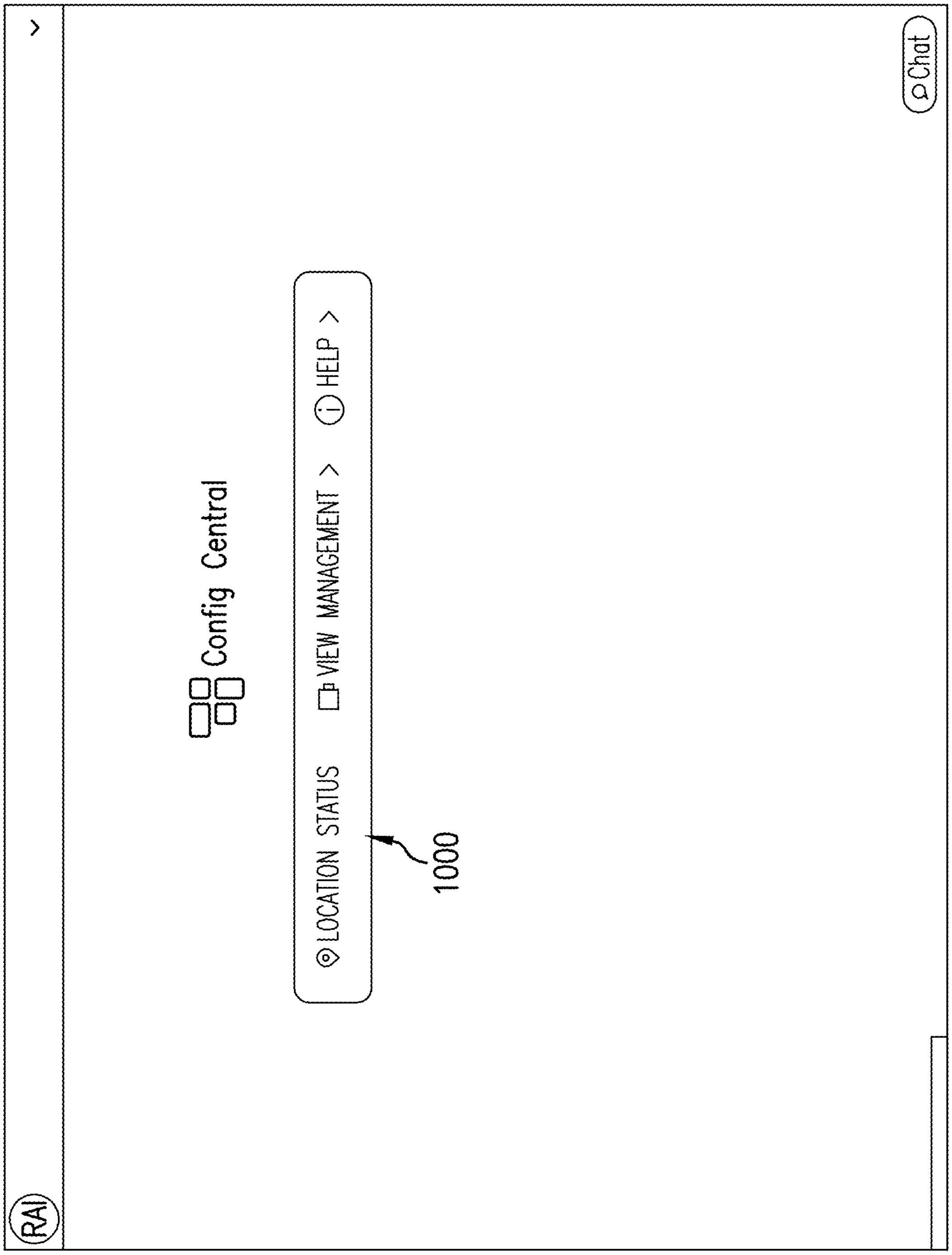
FIGS. 10A-10E are screenshots of an example interface of a cloud-based configuration control platform for managing a visual analytics system.
Figure 10B:
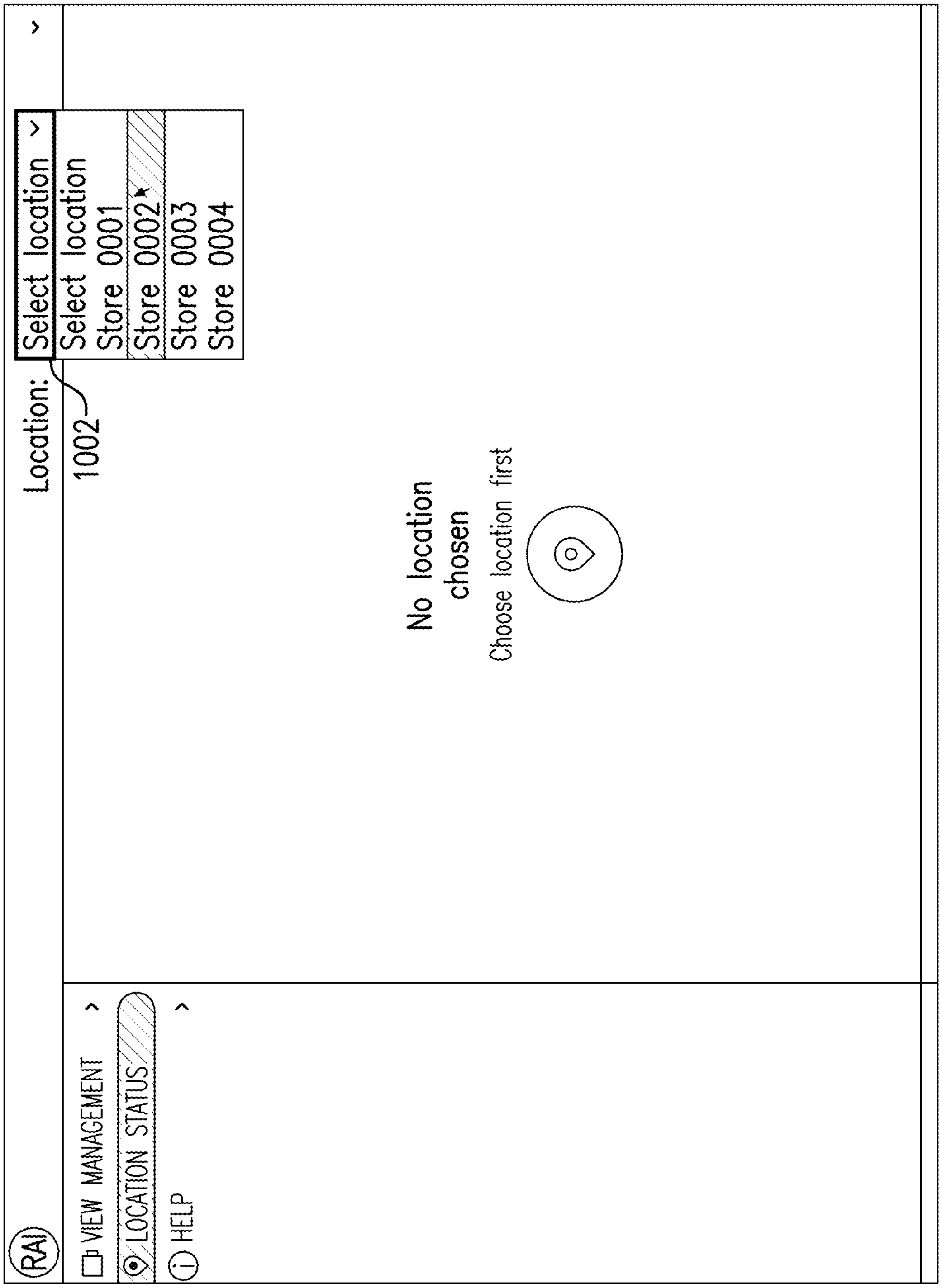
Figure 10C:
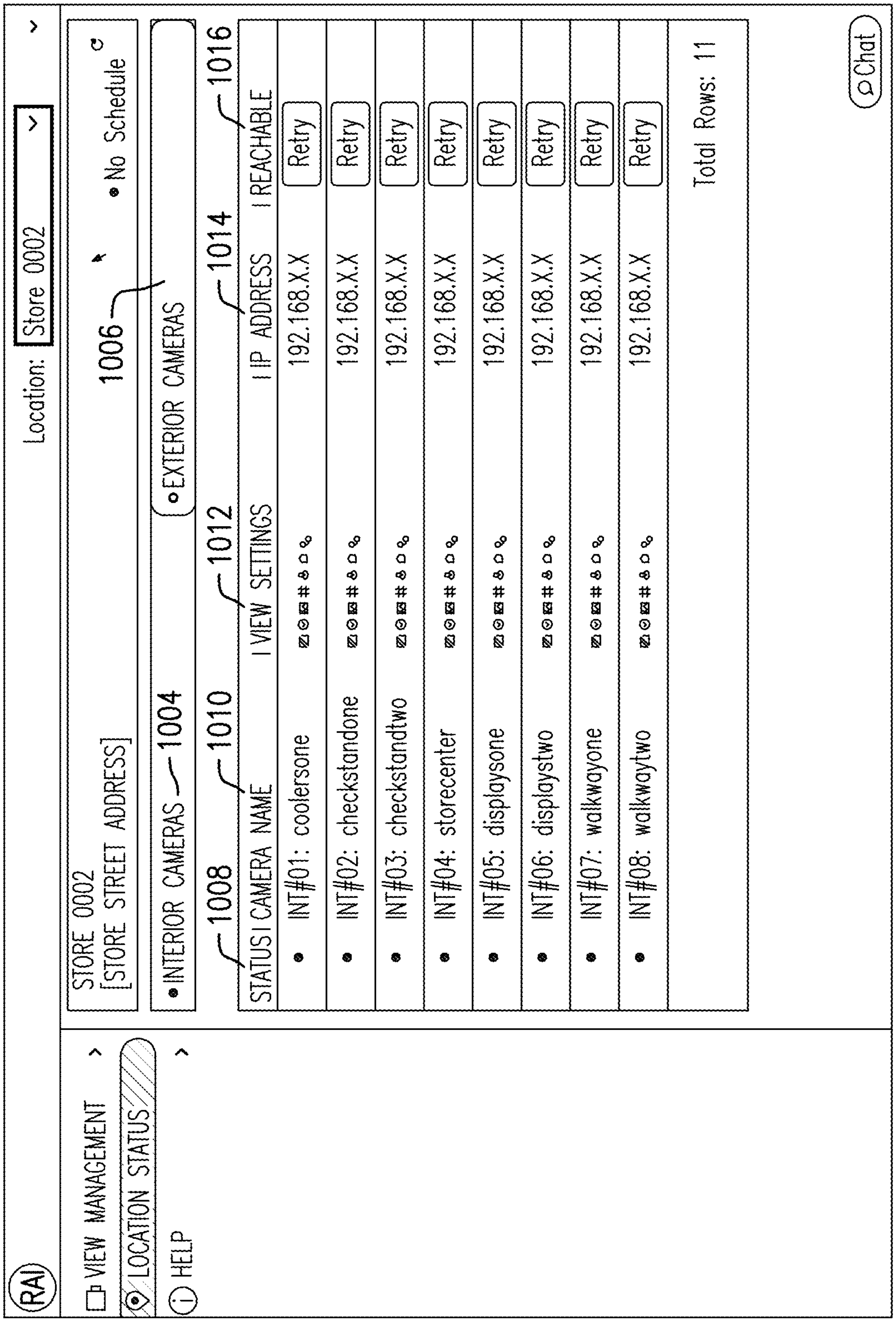
Figure 10D:
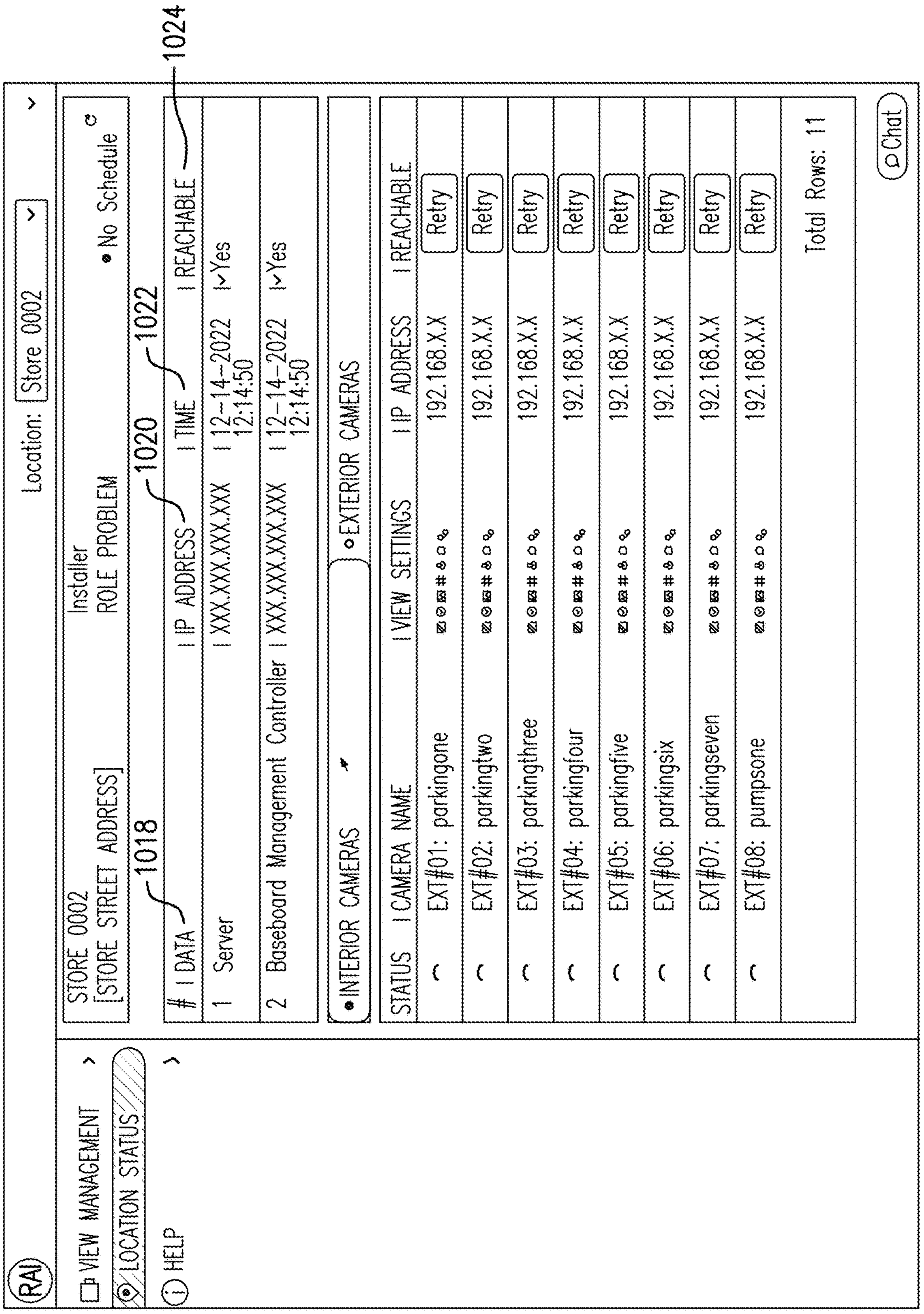
Figure 10E:
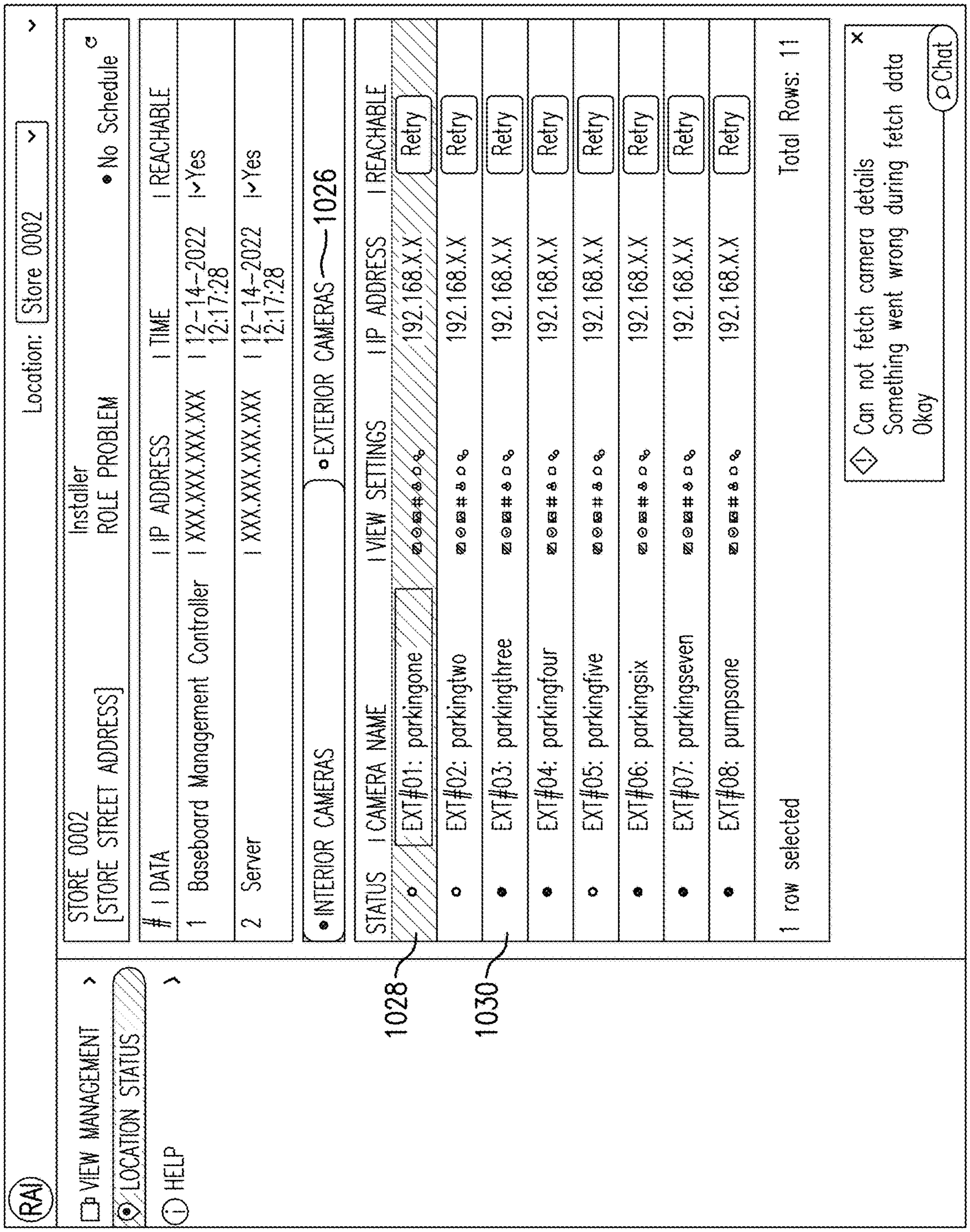

FIGS. 10A through 10E are screenshots of an interface of an example configuration control platform (e.g., the global configuration control server 182 and/or the remote processing server 180 of FIG. 1). The configuration control platform 182 can be accessed through a web browser. FIG. 10A shows an entrance screen visible after logging in. A user can select location status 1000. As shown in FIG. 10B, a user can select a location from among locations listed in a drop-down selection control 1002. In the illustrated example, a location 101 named "Store 0002" is selected. FIG. 10C shows a location status control panel for the selected location. The location status control panel in the illustrated example has two tabs at the top. Interior camera status tab 1004, which is the active tab in FIG. 10C, includes a health status signal that shows a green light, indicating that all interior cameras 102 are working. Interior camera status tab 1006, by contrast, shows a red health status indicator, indicating that not all exterior cameras are working. A table in FIG. 10C lists the devices of the active tab, in the instant case, the interior cameras 102. Each camera 102 has a health status 1008, a camera name 1010, different view settings indicators 1012, a listed IP address 1014, and a column to reachability retry buttons 1016. FIG. 10D shows a similar table for selected active tab, exterior camera status, in an interval while individual camera health status indicators are loading. A table at the top shows columns for data 1018, IP address 1020, time 1022, and whether a device was reachable 1024. FIG. 10E shows the same view after the camera statuses have finished loading. The health indicator signal 1026 is red, again indicating that not all exterior cameras 102 are working. As shown in FIG. 10E, the camera 102 named "EXT #01: parkingone" is not working (has a red signal 1028), whereas the camera 102 named "EXT #03: parkingthree" is working (has a green signal 1030).

Camera health status can be based on more than whether a camera 102 is reachable on a network. For example, camera health status can compare a last validated image from the camera 102 to a present view of the camera 102 and compute a correspondence score between the validated image and the present view image to determine whether the camera is operating as expected, including in terms of its viewpoint and lens clarity. That way, if the camera 102 has been vandalized, e.g., by having its lens spray-painted or cracked, or if the orientation of the camera has been intentionally or inadvertently redirected, the camera health status indicator lights can provide a quick way of determining that, for a large number of cameras 102 at once.

The example configuration control platform interface may allow an option to select and display a camera view assist page. Particularly, the interface may show live or recent views of the interior cameras of the location, allowing a quick check that all cameras are working and unobstructed. Clicking on a particular one of the camera displays in the view can lead to an interface depicting a larger view of the live image of the camera, and also a comparison of a live image with a reference image, which can be used to check that the camera is in its expected location, orientation, and field of view. In some embodiments, the example configuration control platform interface may also allow an option to display a plane calibration tool for a selected camera. The entire image may be analyzed to determine which areas of the image constitute the floor. In some embodiments, the floor determination is human-assisted by drawing polygons over the floor. Tile grout lines in the floor, or other floor features, can then be analyzed by the edge server 104 to automatically estimate the intrinsic parameters of the camera such that lens distortion can be removed.

Other screens in the configuration control platform, not shown, can display details about the location. The configuration control platform can use a templated layout to provide different presentations for different contexts, e.g., whether the platform is used for a retail store or healthcare setting.

The configuration control platform (e.g., provided by the global configuration control server 182 and/or the remote processing server 180 of FIG. 1) can also provide user management to set permissions about which users of the configuration control platform are permitted to view and/or adjust which settings and controls. A role-based access system can, for example, provide different configuration permissions for a system owner, a system installer, a system manager, and a system vendor.

In some embodiments, the configuration control platform advantageously aids in deployment of updated models to edge servers 104. After physically installing the edge server 104 at the edge location 101, AI inferencing can be run on the edge server 104, and data derived from such inferencing can be uploaded from the edge server 104 to the cloud-based system 108 (or computing devices of the cloud-based system 108, such as the remote processing server 180), as discussed herein.

The configuration control platform (e.g., provided by the global configuration control server 182 and/or the remote processing server 180 of FIG. 1) can manage installation, deployment, and maintenance (on a day-to-day basis) for the visual analytics system 100. The configuration control platform 182 enables provisioning of applications to edge servers 104, assisting with management of the hybrid cloud architecture that involves coupling location infrastructure with cloud infrastructure, and performing maintenance tasks, such as releasing updates on a day-to-day basis, in the hybrid environment. Because the visual analytics system 100 can involve potentially hundreds or thousands of edge servers 104 at different locations 101, each location 101 potentially with its own Internet connectivity issues and sometimes with no connectivity at all, the configuration control platform 182 assists with reliably deploying and maintaining software and hardware even under these limited connectivity conditions to maintain the operability of the visual analytics system 100. The configuration control platform 182 can also connect various vendors together in order to make visual analytics system installation, maintenance, and use accessible to, for example, camera installers, server installers, on-site maintenance personnel, managers, and owners, all of whom can use the configuration control platform 182 from different perspectives. For example, a visual analytics system manager might be given system permissions to see only a first view of the configuration control platform interface, a visual analytics system owner might have permissions to see a second view of the configuration control platform interface, and an installer might only see a third view based on the installer's access permissions. The views seen of the interface can depend on the needs of the different roles.

Installation of the visual analytics system 100 at a location 101 can be a complex human process that involves multiple companies and people, with different legal rights and obligations as defined by contracts. The configuration control platform 182 and its role-based access can be used to enforce these rights and obligations by defining roles in a software environment where the roles and their performance are tracked and validated. For example, when a portion of an installation process is complete, the configuration control platform can show a completion or provide an alert. The configuration control platform 182 can also integrate into a workflow management tool to manage installation processes and check their progress.

Self-Healing Features of Visual Analytics Architecture

In some embodiments, the visual analytics system 100 includes a monitoring system (not shown), portions of which may run on any or all of the edge server(s) 104, cloud-based system 108, data center 106, or cloud 128. The monitoring system can be configured to identify a functionality or performance issue with one of the pipelines in the edge server 104, and may attempt to automatically resolve the issue without any manual intervention on the part of a human technician. The monitoring system can use ML models (or other AI methodologies) to estimate or predict when such issues have arisen or may soon arise on the edge server 104. Such predictions can be made based on metrics that are established, through machine learning, to be indicative of an imminent pipeline issue. Such metrics can include a utilization spike at the central processing unit (CPU) of the edge server 104, a spike in usage of system memory of the edge server 104, or a spike in network bandwidth utilization at or around the edge server 104. Such predictive and self-healing features aid in the seamless operation of tens of thousands or maybe hundreds of thousands of edge servers 104 at scale, without requiring a proportional scale-up in human staffing, and in many instances in a challenging network environment, with very limited to no connectivity.

Processing Pipelines

Figure 11:
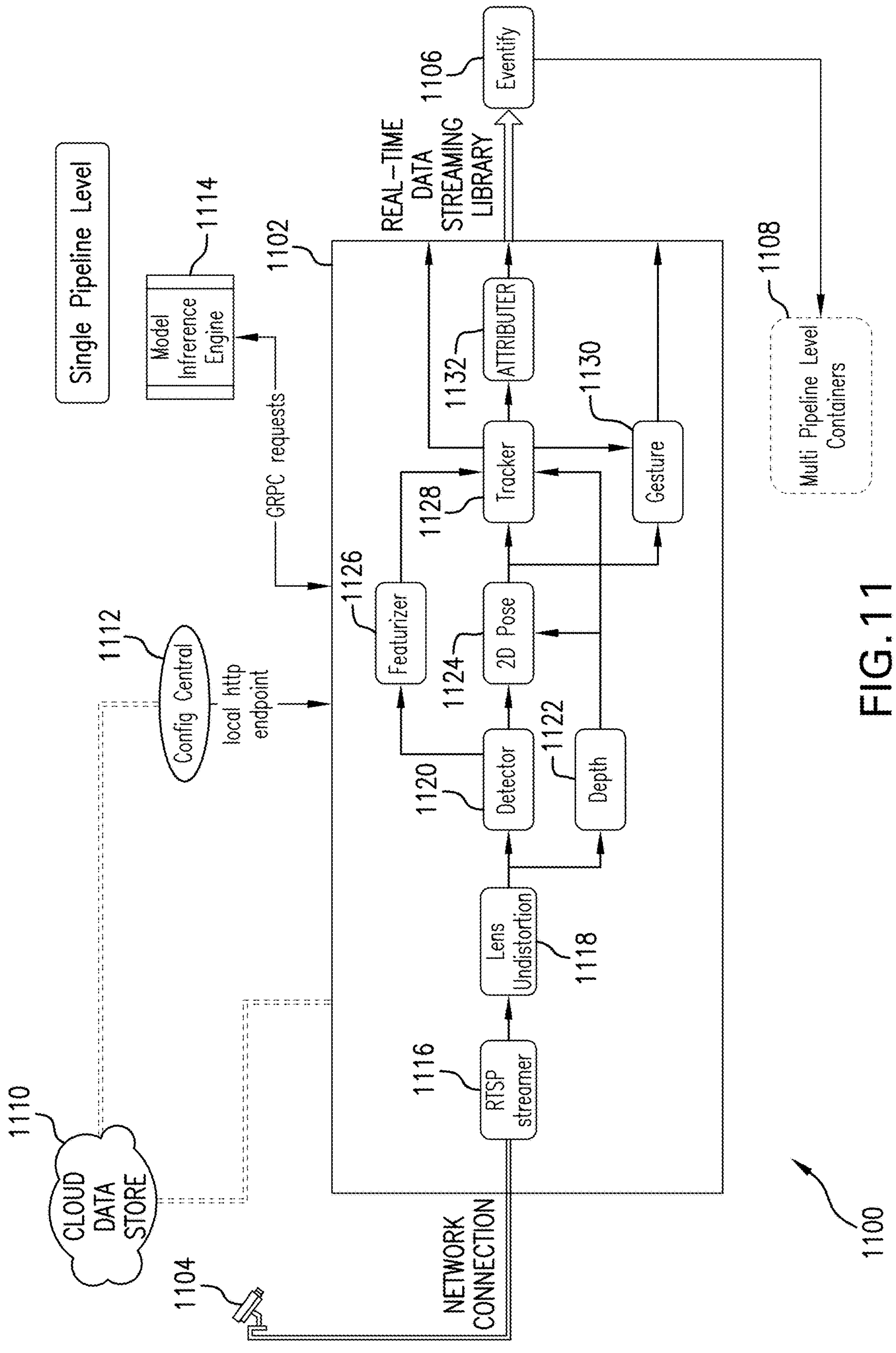
FIG. 11 is a flow diagram of an example single machine-learning-based video stream processing pipeline of a visual analytics system.

FIG. 5 illustrates an example pipeline for a single camera 102. The pipeline in that example includes, at its various stages, a stream component 110, a detector component 112, a depth component 114, a featurizer component 118, a tracker component 120, and an egress component 122. Another example pipeline 1102 is also illustrated in FIG. 11, which shows a single-pipeline-level architecture 1100. As shown in FIG. 11, the example pipeline 1102 includes stages such as an RTSP streamer component 1116, a lens undistortion component 1118, a detector component 1120, a depth component 1122, a featurizer component 1124, a 2D pose component 1126, a tracker component 1128, a gesture component 1130, and an attributer component 1132. Running on a given edge server 104, there may be as many pipelines as cameras 102, or in some examples, multiple cameras 102 may feed into a single pipeline. A single pipeline can be capable of managing streams from multiple cameras 102, for example, by treating captured image frames according to associated camera-identifying metadata and timestamps.

The RTSP streamer component 1116 can capture still image frames from video streams streamed from the camera 1104 (e.g., the camera 102 of FIG. 1). For a given one of the still image frames, the lens undistortion component 1118 (or lens distortion removal component) can remove curvature from the image. Real-world cameras having optical lenses can introduce distortion in captured RGB images. This distortion can cause problems for extracting quality image features for AI models to operate on, and can lead to less accurate predictions or estimations, which can reduce the overall analytics quality of the visual analytics system 100. The better the quality of a source image, the better is the quality of image features extracted from them. An undistortion technique (or distortion removal technique) can leverage the edges and straight lines in the scenes to extract undistortion parameters. The computation performance of the undistortion technique can be improved by leveraging GPU resources of the edge server 104 (or the remote processing server 180). A night vision capability can be added to the undistortion technique to process images to enhance the image features at night.

After lens distortion removal, the detector component 1120 can use ML inferencing to detect objects in the undistorted still image frame. For example, the detector component 1120 can use an ML model trained to detect people and vehicles. In other examples, such as in an assisted checkout, the detector component 1120 can be trained to detect individual items available for sale and presented for checkout. The detector component 1120 can, for example, draw anchor boxes around the objects in an image. Object detection can thus take place in the form of predicting rectangular coordinates for cars and people in an entire RGB image or portion of the image. In some examples, two binary object detection models can be used for their respective task of detecting people or cars. For detecting cars from outdoor video, a detector based on a YOLO architecture with a CSPDarknet53 feature extracting backbone can be used. Non-maximum suppression can be used in a post-processing stage to eliminate duplicate detections.

The depth component 1122 can add a third dimension to the 2D still image frame data by using an ML model trained to estimate a depth value for each pixel in the 2D still image frame. This depth data can be important for gauging how far away from a camera a detected person is, and thus for assigning the person a position in 3D space. While 2D rectangular detections provide useful insight into the location of objects in an image, they do not carry the same information that 3D data does. Working in three dimensions provides structure and important relative relationships that cannot be decoded from 2D information alone. Knowing the spatial locations of objects in a scene provides the basis for detecting and setting important landmarks in, for example, a retail environment for establishing metrics. To determine the 3D coordinate for every pixel in the image, an RGB image is used by the edge server 104 as input into a depth estimation ML model and the output is a two dimensional depth image with the same shape as the input image. Each spatial location in the input image corresponds to the same spatial location in the depth image. The depth image estimates the distance to the camera at every pixel location in the image. The 2D coordinates in the image domain combined with the depth estimates can be used by the edge server 104 to generate a point cloud with each point containing a geometric Cartesian coordinate (x, y, z) and a color coordinate (r, g, b). The 3D point cloud coordinates are calculated by the edge server 104 using the intrinsic parameters of the camera 102 and the estimated depth values. A transformer-based architecture can be used by the edge server 104 (or computing devices of the cloud-based system 108) to design a CNN that performs dense depth estimation. This ML model can use a hybrid vision transformer (ViT) combined with ResNet-50 as an encoder network. A convolutional decoder with resampling and fusion blocks can be utilized by the edge server 104 (or computing devices of the cloud-based system 108) to result in the final depth map. Multiple datasets can be used by the edge server 104 (or computing devices of the cloud-based system 108) to train this network using a scale-invariant loss and dataset sampling process.

The 2D pose component 1124 can estimate a 2D pose of a detected object (e.g., person, vehicle) based in part on the depth information provided by the depth component 1122 and based on the object detection performed by the detector component 1120. Detecting the location of human joints (e.g., shoulders, elbows, wrists) is referred to as human pose estimation. 2D pose estimation can be performed using a CNN architecture that can estimate 17 major joint locations in the 2D image space. Connected together, the estimated joint locations form a 2D skeletal structure representation of people in a scene. Pose can be used to estimate where a person is looking (gaze), whether the person is walking or standing still, whether the person sanitized hands, etc. When combined with the AOI localization, pose information improves analytics quality. 3D pose estimation can be performed by 3D pose models that transform a person in a two-dimensional image into a 3D object. This transformation aids in estimating three-dimensional skeletal structure and accurate relative positioning of joints for a person. This improves the quality of gesture/activity recognition. A three dimensional pose ML model can, for example, take a 2D pose of a person as input and use a neural network inspired by a canonical 3D pose network for non-rigid structure from motion to perform 3D pose estimation. Such a model can learn a factorization network that can project the input 2D pose into 3D pose. The 2D pose can then be reconstructed from the 3D pose. The factorization network improves at constructing the 3D pose by minimizing the difference between the original and the reconstructed 2D pose.

The featurizer component 1126 is used by the edge server 104 to crop the images of objects (e.g., people, vehicles) detected by the detector component 1120 (e.g., to their respective anchor boxes) and processes the cropped images to provide an output vector representative of the features of the detected object. Two objects (e.g., people, vehicles) in different camera views having similar feature vectors can be determined to be the same object on the basis of the similar feature vector, among other criteria. In some examples, the separate views can be merged using a global tracker (not shown in FIG. 11) that combines the different views by merging tracks from different views. In other examples, a multiview tracker can be provided to make such correspondences. Due to the COVID-19 pandemic, there were many strict requirements put in place by organizations and businesses to wear a face mask to help reduce the spread of the disease. Face mask classification can entail determining whether a person is wearing a face mask or not, and whether the mask is properly positioned on the face. A face mask classification ML model can take an RGB image of a person's face and can output whether the person is wearing a face mask or not. For example, a Mobilenet-v2 CNN based architecture can be used for the face mask image classification model. The model can be trained, for example, using the megamask face mask dataset.

The tracker component 1128 uses ML inferencing to tell whether an identified person is the same person from image frame to image frame, whether within the same camera view or across multiple camera views, based on the feature vector, the 2D pose information, and the depth information, without using facial recognition. The tracker component 1128 outputs a track for the person, containing data representative of the position of the person over time.

The gesture component 1130 uses ML inferencing to determine a gesture for a detected person, based on the 2D pose information and the track for the person. Gesture information can be used to interpret actions, that is, to help understand what a person is doing. For example, if a person is trying to use a credit card machine to pay, the gesture component 1130 may output data indicative of a credit card payment attempt gesture. As another example, if a cash customer is interacting with the cashier, e.g., handing cash to a cashier, the gesture component 1130 may output data indicative of a cash payment gesture. Gestures interpret a combination of multiple frames that, in a certain sequence or with certain patterns, permit assumptions, such as "the person is interacting with the cashier" or "the person is trying to use a credit card to do the payment."

The attributer component 1132 can use ML inferencing to determine other attributes of a person based on feature vectors and/or tracks. As examples, the attributer component 1132 can estimate demographics such as age or gender, or roles, such as whether the person is an employee, a non-employee, a security guard, a customer who is a security risk, etc. Attributes can be used as logged metrics of interest, and/or can be used in the person or vehicle re-identification process. As an example, cropped object (e.g., person or vehicle) detection images can be used as input to a ReID network to produce 512-D feature vectors that represent embedded visual features. These feature vectors can be used by the edge server 104 as inputs to a multi-layer perceptron (MLP) neural network ML model to perform attribute classification. The output of the ML model can be the class each person belongs to (e.g., customer, security, employee, risk, etc.). Each of the above components can make use of the model inference engine 1114 to perform model inferencing, via, for example, a remote procedure call request.

Information from the various pipeline components can be fed to the eventify component 1106, which is an event-driven alerting framework. When an defined event is identified as occurring by the eventify component 1106, the eventify component 1106 can initiate an action in real time, by merging tracks across time and space to create a journey and integrating aspects of the journey. For example, a person with a certain track ID is at check stand at a given time, and went to restroom at a second given time, and then came back and got a soda at a third given time, the eventify component 1106 can stich all of this information together. The information is ultimately transmitted to the cloud for storage and further processing.

Architecture 1100 thus provides an overview of how inference is performed at the edge server 104, in the one example illustrated. Other examples can use more or fewer stages, or different stages, to provide different visual analytics functionality, which may be important in different contexts. For example, the types of tracks, features, gestures, and attributes of interest in a healthcare facility may differ from those of interest in a retail store setting. In all instances, however, the visual analytics pipeline 1102 assists in understanding and interpret a scene, rather than merely detecting or identifying objects. As discussed herein, visual analytics has a goal of trying to understand the interaction between people or the interaction between a person and a machine or a person and the environment, interpret the observed interaction, and produce analytics based on the interpretation. The understanding of the scene can be accomplished in real-time or near real-time.

Figure 12:
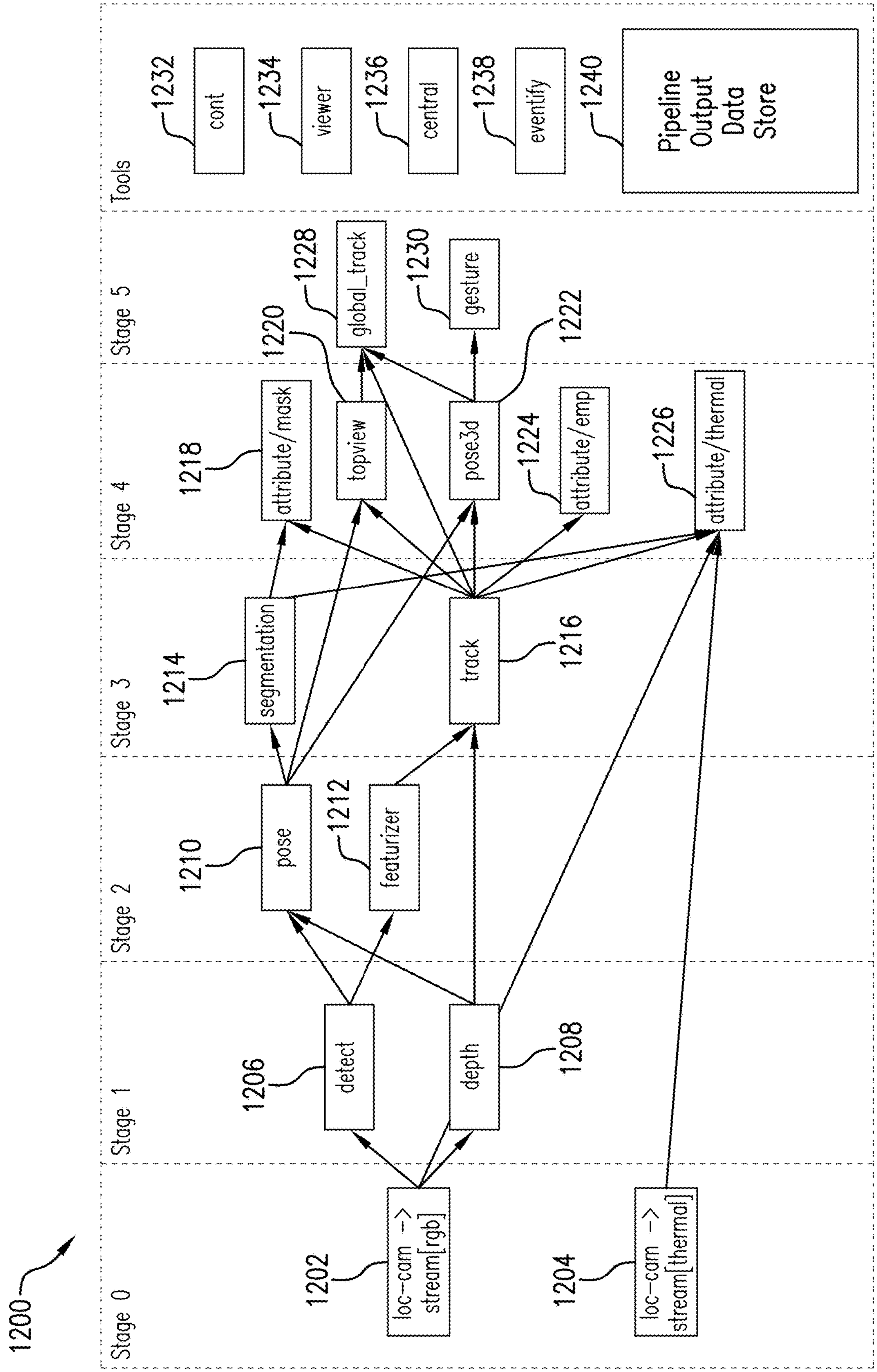
FIG. 12 is a flow diagram of a pipeline of an example visual analytics system.

FIG. 12 illustrates an example multi-stage pipeline architecture 1200. The stream component 1202, the detect component 1206, the depth component 1208, the pose component 1210, the featurizer component 1212, the track component 1216, the gesture component 1230, and the eventify component 1238 can all have functions similar to those of the corresponding components of similar names described above with regard to FIG. 11. Cameras 102 can be considered individually in stages 0 through 4 of the pipeline 1200. At stage 5 of the pipeline 1200, information for a plurality of cameras 102 (e.g., all of the cameras coupled to the edge server 104) is provided to the global_track component 1228. For example, when a person leaves the field of view of a first camera 102, and enters the field of view of a second camera 102, that person can be picked up on the second camera 102 and can generate similar metadata. An average retail store location 101 may have, for example, between about twelve and fourteen cameras 102. In order to build a journey, views from all those fourteen cameras 102 can be used, so that it can be understood where the tracked person is in the store at all times. The global_track component 1228 thus stitches individual tracks from individual camera views together into a single track by determining from the outputs of the earlier stages that two or more tracks from different cameras 102 are representative of the same person. With that information, an entire journey of the store can be analyzed.

The central tool 1236 in FIG. 12 is an instance of the edge configuration control platform, corresponding to the edge configuration control platform 124 in FIG. 5. The eventify component 1238, takes information provided by the other components and notifies or gives alerts when something is happening to the customer. For example, when there are more than three customers in the line, but there is only one cashier to attend to them all, an alert can be generated by the eventify component 1238 to call another cashier to a checkout station. As another example, if a customer is standing for more than two minutes in a queue, an alert can be generated by the eventify component 1238.

Classes of Analytics

The visual analytics systems 100 and methods as described herein can provide three classes of analytics. A first class of analytics is looking back and providing historic data and comparisons. A second class of analytics is real-time or near-real-time, giving alerts. A third class of analytics is predictive, based on analysis of historic patterns. As an example of the third, predictive class of analytics, eventify component 1238 may determine that a run on the checkout is imminent, prompting an alert to a cashier to staff a checkout station, because soon the queue is going to get longer. Some of these insights may be generated by processing on the cloud-based system 108, rather than at the edge server 104.

System Health Monitoring and Self-Healing

Figure 8:
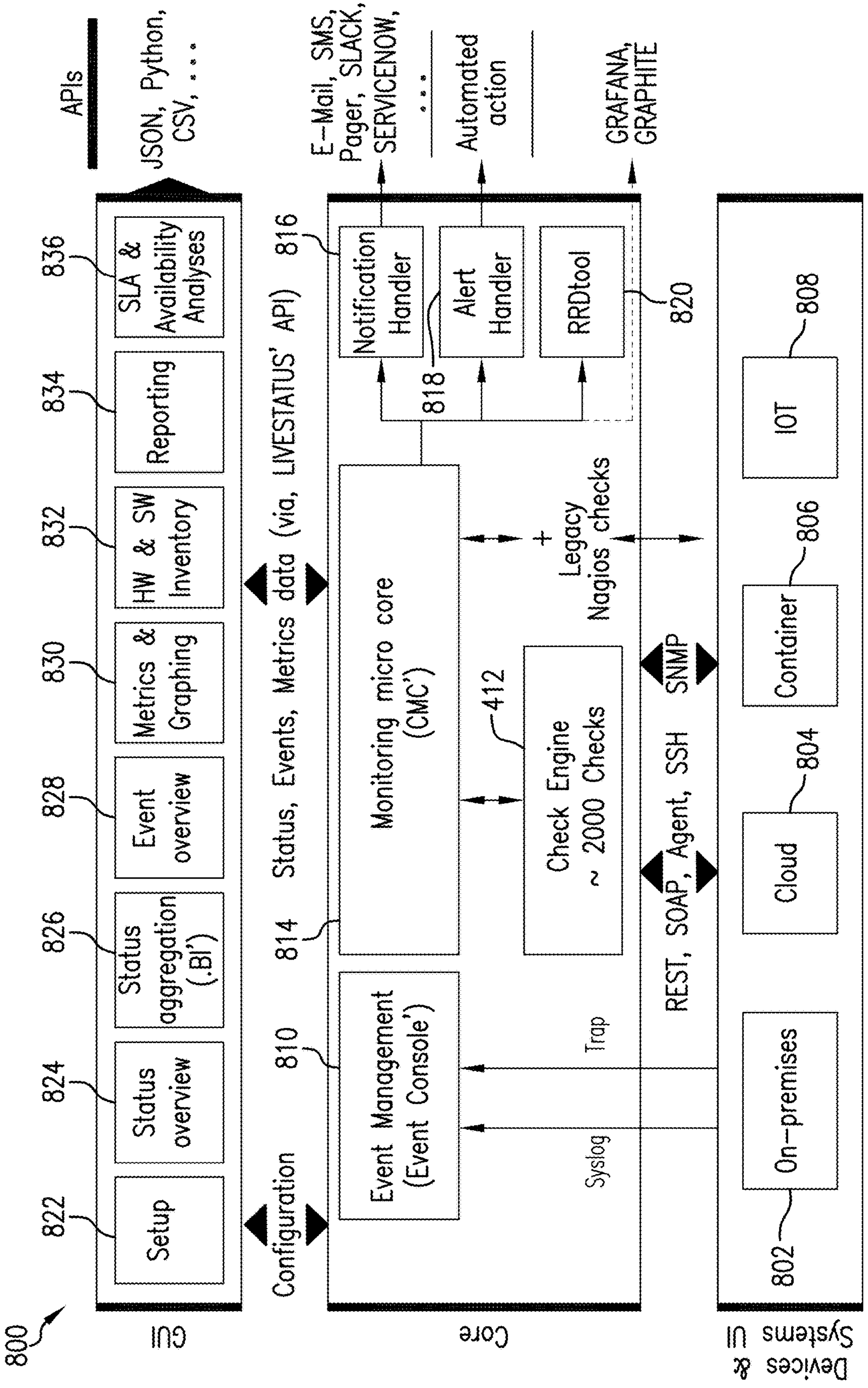
FIG. 8 is a block diagram of an example health monitoring portion of a visual analytics system.
Figure 9:
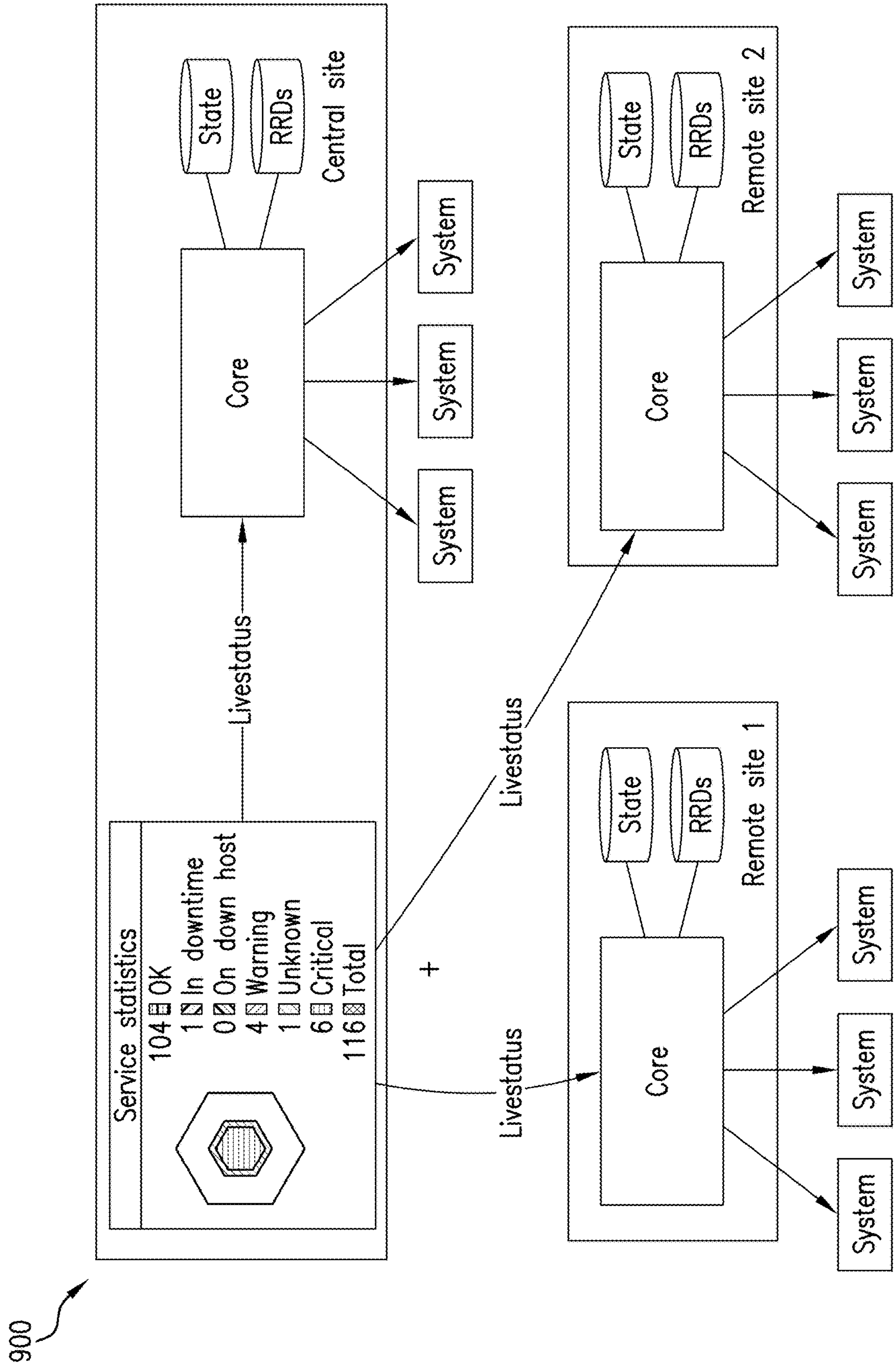
FIG. 9 is a block diagram of example health reporting on a visual analytics system.

In some embodiments, the visual analytics system 100 as described herein can include a health monitoring and self-healing features configured to determine or predict existing or future system failures, to automatically initiate remedial actions, and thus to reduce system downtimes. FIG. 8 illustrates an example self-healing health monitoring architecture 800. Devices monitored by the architecture 800 can include on-premises devices 802, cloud devices 804, container devices 806, and IOT devices 808. The on-premises devices 802 include the edge servers 104 installed at various locations 101. The devices 802, 804, 806, 808 can be queried by the monitoring framework core using the reporting GUI. The monitoring framework includes an event console 810, a check engine 812, a monitoring micro core 814, a notification handler 816, an alert handler 818, and an RRDtool 820. The on-premises devices 802 can be connected to and reporting metrics can be tapped into on a regular basis. FIG. 9 illustrates an example reporting metrics screen 900. Multiple pieces of information can be used to determine whether an edge server is down or not.

Redundant Methods of Remotely Accessing an Edge Server

With reference again to FIG. 5, in an example, an edge server 104 may be behind a double-NATed firewall and a private IP address. For example, there may be a first firewall in a location, and a second firewall in a corporate office. In order to access the edge server 104 via the internet, any remote connection to the edge server 104 must be able to penetrate through both firewalls. As a first method to remotely access the edge server 104, a site-to-site virtual private network (VPN) connection 134 or 126 may be provided to directly connect to the edge server 104 for management, maintenance, and administration. As a second method to remotely access the edge server 104, a Cloudflare tunnel can be used to grant a service called cloudflared on the edge server 104, which opens a port into the Cloudflare backbone 132. Even without a public IP address to access, the edge server 104 can be accessed through the Cloudflare backbone 132 using a reverse tunnel 130. As a third method to remotely access the edge server 104, an application called Tailscale can establish an outgoing tunnel from the machine. The Tailscale outgoing tunnel is initiated at the local machine and establishes its connectivity. The three remote access methods provide redundancy to access the edge server, even in the event that one or two of the methods fails, providing the flexibility to locally host on the edge server 104 the edge configuration control platform 124 without having to have public internet access to the edge server 104. For example, the locally hosted edge configuration control platform 124 can provide the ability to deploy and manage services locally on the edge server 104, giving the commands from the configuration control platform or the cloud service 108. The (global) configuration control platform 182 can communicate with the locally hosted edge configuration control platform 124 using, for example, the Cloudflare tunnel 132. An advantage of using this tunnel infrastructure is the ability to use standard cloud infrastructure to connect two parts of an application—the configuration control platform 182 running on the cloud-based system 108 and the locally hosted edge configuration control platform 124 running on in the edge server 104—seamlessly connected together using standard protocols, without requiring special virtual networking hardware and software. These tunnels make it seem like the two parts of the configuration application are on the same LAN even though they are not, obviating the need for expensive networking hardware and software that may otherwise need to be provided by an outside vendor.

Figure 6:
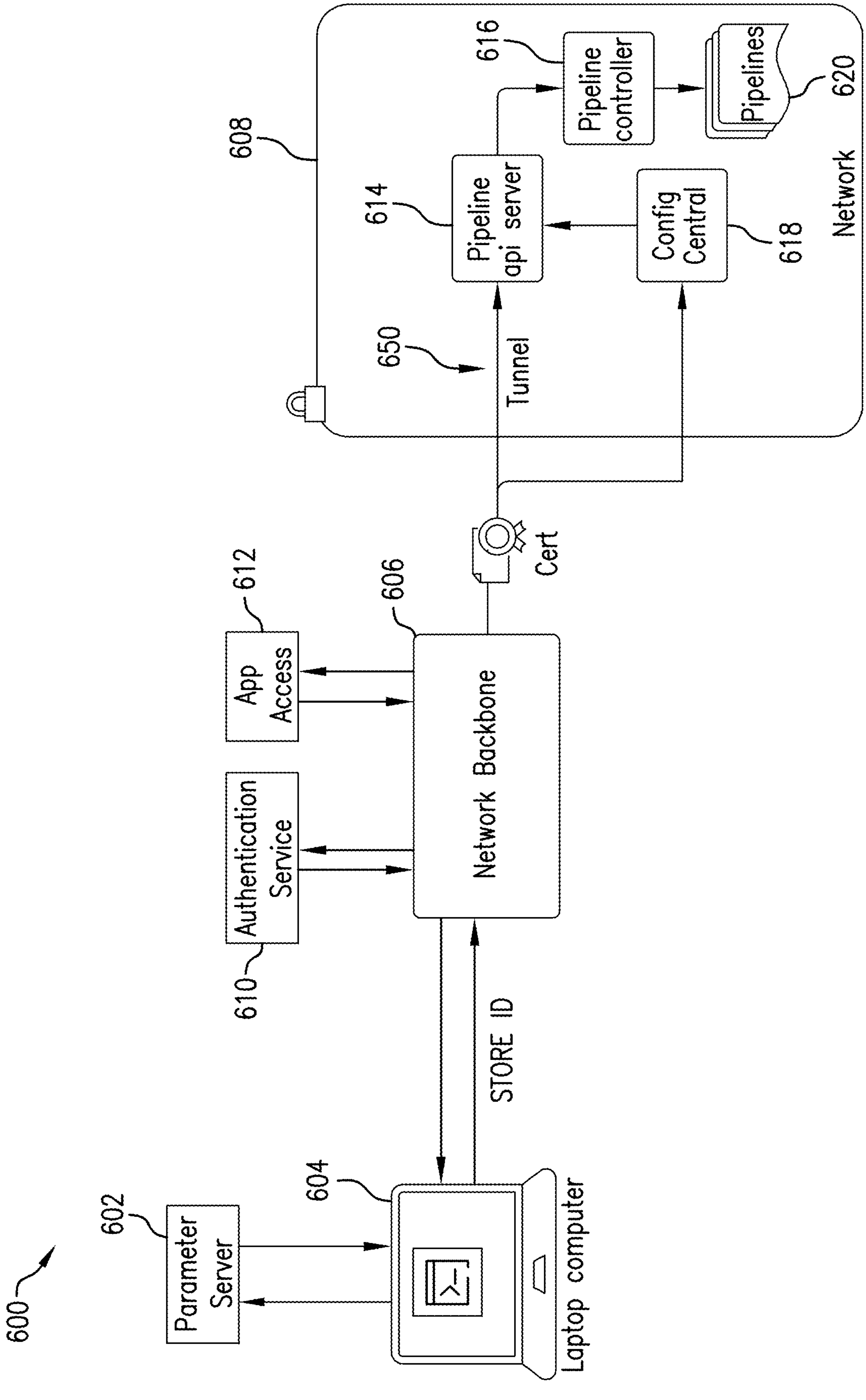
FIGS. 6 and 7 are block diagrams illustrating an example of remote network access to edge servers of a visual analytics system.

FIG. 6 is a block diagram of an example architecture 600 illustrating accessing of an edge server 608 using an Argo tunnel 650 and a Cloudflare backbone 606. The edge server 608 can correspond to the edge server 104 of FIGS. 1 and 5. The Argo tunnel 650 can correspond to the Argo tunnel 130 of FIG. 5. The Cloudflare backbone 606 can correspond to the Cloudflare backbone 632 of FIG. 5. A user device (e.g., laptop or desktop computer, or mobile device) 604 can correspond to the user device 156 of FIGS. 1 and 5. The authentication service (e.g., Google authentication service) 610 can correspond to the authentication service 158 of FIG. 5. The user device 604 can display a web-based GUI for accessing the edge server 608. For example, the web-based GUI can provide controls for the edge configuration control platform 618, which can correspond to the edge configuration control platform 124. The user device 604 can be connected to a cloud services parameter server 602. The Cloudflare backbone 606 can connect to the authentication service 610 and/or to Cloudflare app access 612. The Cloudflare backbone 606 provides the user device 604 with certificated access to the edge server 608 via the Argo tunnel 650, and particularly to the pipeline API server 614 running on the edge server 608, either directly or via the edge configuration control platform 618. The pipeline API server 614 can in turn control the pipeline controller 616, which in turn can control the pipelines 620, including to stop or start pipelines 620 run on the edge server 608 or individual stages or components of the pipelines 620. Accordingly, the Cloudflare architecture of FIG. 6 permits a way to access the edge server 608 and control the pipelines 620 without the edge server 608 being directly open to internet access and can remain functional even when site-to-site VPN access to the edge server 608 is not available.

Edge Server Health Check

With reference once again to FIG. 5, it will now be described how a decision can be made if an edge server 104 is down or not. A first health check service can run at the data center 106 and can use the site-to-site VPN 134 to ping the edge server 104. A second health check service can run on the cloud service 108 and can use the Cloudflare backbone 132, and then pings using the Argo tunnel infrastructure 130. A third health check service can ping using Tailscale (not shown in FIG. 1). Information from all three health check services can be used to make a determination that the edge server 104 is down. As an example, based on the edge server 104 not successfully being pinged using the Argo tunnel 130 or the Tailscale network, but successfully being pinged using the site-to-site VPN 134, it can be determined that the edge server 104 is running but does not have outgoing internet access. Based on the edge server 104 not successfully being pinged by any of the three methods, then it can be concluded that the edge server 104 is down. If the edge server 104 is determined to be down, a technician can be dispatched to physically attend to the edge server 104 in person. If the edge server 104 is running but its processing pipeline is down, further determinations can be made based on health data published by the pipeline components. For example, each pipeline component (e.g., detector 112, for depth 114, featurizer 118) may publish a timestamp indicating a time when the pipeline component last processed an image frame, and a time indicating how long it took to process the image frame. Based on this health data exceeding certain thresholds for a given pipeline component, the poorly behaving pipeline component can be restarted, instead of restarting the entire pipeline. The overall health of the pipeline can then be reevaluated once the restarted pipeline component comes back up.

In some embodiments, a local queue at the edge server 104 can store pipeline component health data locally for up to about 24 hours. When connectivity to the edge server 104 is available, the health data can be regularly pushed to the data center 106 and/or the cloud services 108 (e.g., the cloud-based server 108). When connectivity to the edge server 104 is interrupted, the locally stored health data can continue to be returned to the local queue. When the connectivity returns, a process can automatically push to the data center 106 and/or the cloud services 108 all the locally queued data that has not yet been transmitted to the data center 106 and/or the cloud services 108.

When publishing to a new location or starting a pipeline does not provide the expected results, a set of test suites can be run on the edge server 104 and can provide a report. The test suites can determine, for example, whether the Argo tunnel 130 is up, whether the Tailscale VPN is up, whether the edge configuration control platform 124 is responsive, whether the Cloudflare tunnel 132 is up and running, whether the pipeline components are running, etc. The resultant report allows pinpointing of exactly where an issue is for debugging. The report can also trigger self-healing capabilities. In many cases, a solution action to resolve a pinpointed problem is as simple as, for example, restarting a pipeline component to reestablishing the Cloudflare tunnel. Such fixes can be done automatically, without manual intervention. Accordingly, many fixes can be automated so that the edge server 104 can generally continue to run in an uninterrupted fashion.

Figure 7:
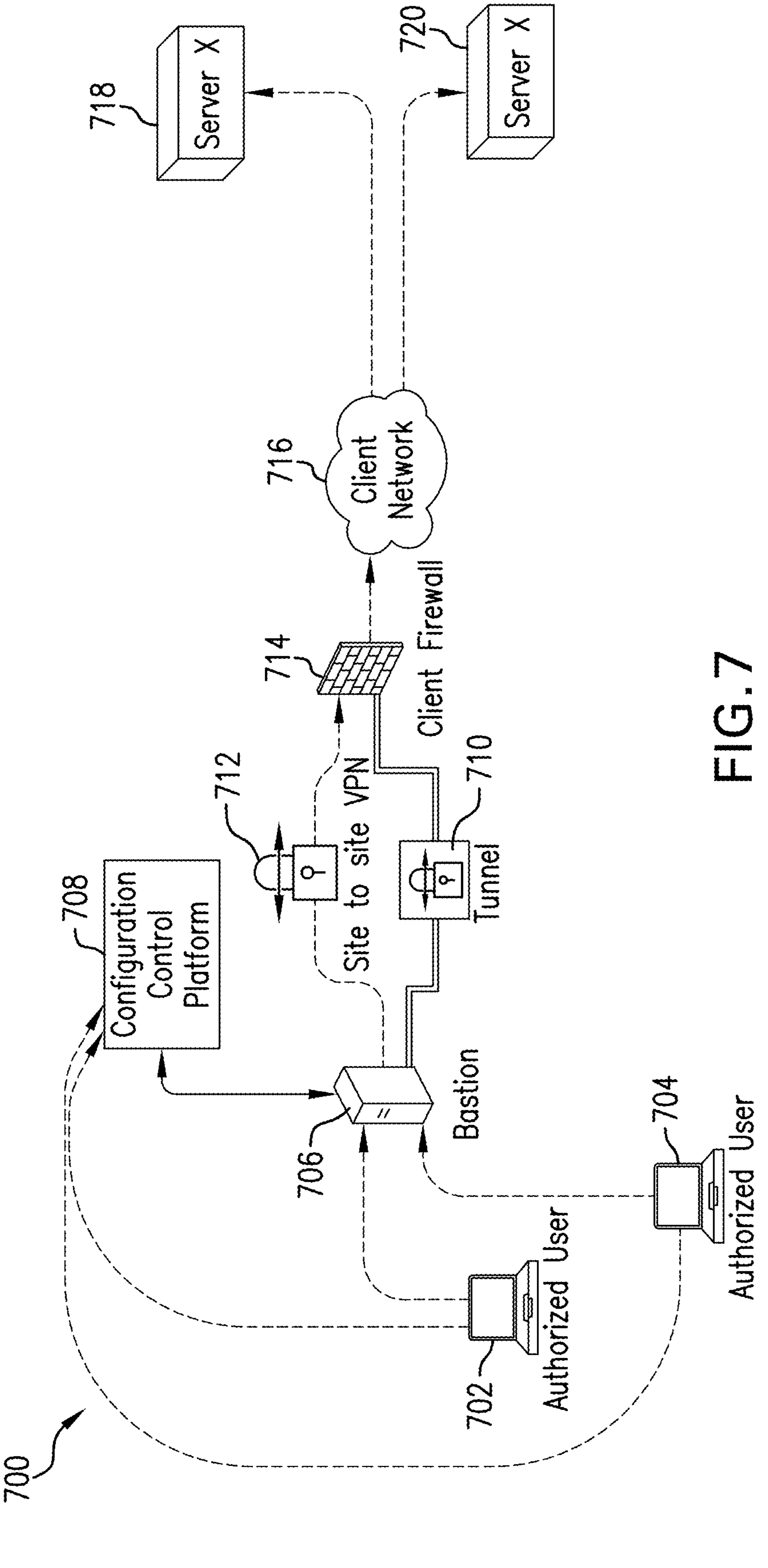

FIG. 7 is a block diagram of an example architecture 700 illustrating accessing of edge servers 718, 720 using alternative communication links including a site-to-site VPN 712 and an Argo tunnel/Cloudflare backbone 710. The edge servers 718, 720 can each correspond to the edge server 104 of FIGS. 1 and 5. The edge servers 718, 720 may be behind a client firewall 714 and client network 716, which may prevent conventional direct internet access to the edge servers 718, 720. The edge servers 718, 720 may be installed at different locations (e.g., geographically distant from each other) or at a single location 101 (e.g., both in the same store or hospital). The Cloudflare backbone and Argo tunnel 710 can correspond to the Cloudflare backbone 132 and the Argo tunnel 130 of FIG. 5. User devices (e.g., laptop or desktop computer, or mobile device) 702, 704 can each correspond to the user device 156 of FIGS. 1 and 5. The user devices 702, 704 can each display a web-based GUI for accessing the edge servers 718, 720. For example, the web-based GUI can be provided by configuration control platform 708 to which the user devices 702, 704 can connect. The user devices 702, 704 can also be connected to a bastion 706, which can correspond to bastion 152 of FIG. 5 running on data center 106. The Cloudflare backbone 710 can provide the user devices 702, 704 with certificated access to the edge servers 718, 720 via the bastion 706, Argo tunnel 710, client firewall 714, client network 716. The site-to-site VPN 712 can provide the user devices 702, 704 with access to the edge servers 718, 720 via the bastion 706, site-to-site VPN 712, client firewall 714, client network 716. Accordingly, the alternative site-to-site VPN and Cloudflare architecture of FIG. 7 permits a way for user devices 702, 704 to access the edge servers 718, 720 without the edge servers 718, 720 being directly open to internet access, and can remain functional even when one of the site-to-site VPN or the Cloudflare backbone/Argo tunnel 710 is not available. The architecture 700 can be used to initially setup the edge servers 718, 720 after their physical installation in their respective location(s). Initially, secure shell (SSH) access over the site-to-site VPN 712 is used to run scripts that install the Cloudflare daemon on the edge server 718 or 720 being set up, and the Cloudflare Argo tunnel is setup. Then, Docker and Kubernetes are installed on the edge server 718 or 720 being set up. The AI accelerator (e.g., GPU) drivers are installed on the edge server 718 or 720 being set up. The edge server 718 or 720 being set up can be commanded to pull visual analytics software that it will run from the data center (e.g., data center 106 in FIGS. 1 and 5). The edge server 718 or 720 being set up is then commanded to set up access to the cloud (e.g., 108 and/or 128 in FIGS. 1 and 5). The edge server 718 or 720 being set up can then be commanded to pull ML models from the cloud.

Inference Engine and Model Hosting on an Edge Server

Figure 13:
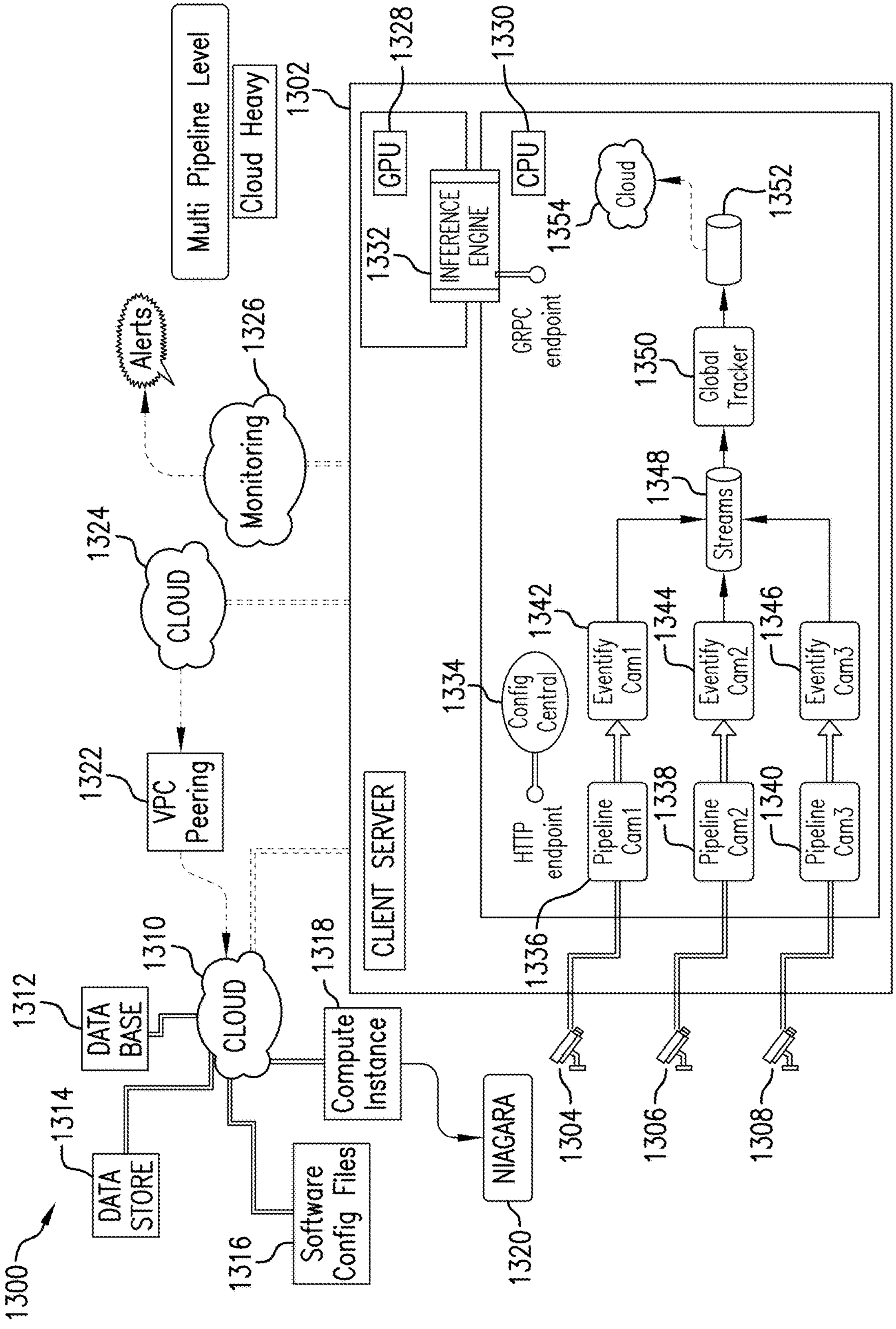
FIGS. 13 and 14 are block diagrams of example multi-pipeline visual analytics systems.

FIG. 13 shows an example cloud-heavy multi-pipeline architecture 1300 with multiple cameras 1304, 1306, 1308 each having its own respective pipeline 1336, 1338, 1340 and eventify components 1342, 1344, 1346 producing metadata streams 1348 that can be merged using the global tracker component 1350, as discussed above. ML and deep learning models are trained models that are each stored as a respective file. Image data from cameras 1304, 1306, 1308 and other data can be processed by the models to generate the metadata. When a model is trained, optimization tools can be used to export the models for the specific hardware of the edge server 1302, corresponding to the edge server 104 of FIGS. 1 and 5. The models run on the AI acceleration unit 1328 (e.g., GPU or TPU) using the inference engine 1332. A remote procedure call (e.g., gRPC) communication endpoint can provide access to the inference engine 1332. Each of the pipeline components wraps its inputs into a request and sends the request to the inference engine 1332 via the remote procedure call endpoint. The inference engine is a part of a container that Kubernetes manages, but it is the only container that has access to the AI acceleration unit 1328 resources. The inference engine 1332 sends back results to respective pipeline components. With multiple cameras 1304, 1306, 1308, there may be a large number of requests being sent to the inference engine 1332 contemporaneously. The requests can be efficiently scheduled. Additionally, decoding of camera stream packets can be done using GPU hardware accelerator resources rather than CPU resources to realize additional efficiency benefits. It should be appreciated that the cameras 1304, 1306, 1308 can correspond to the camera(s) 102 of FIG. 1.

Figure 14:
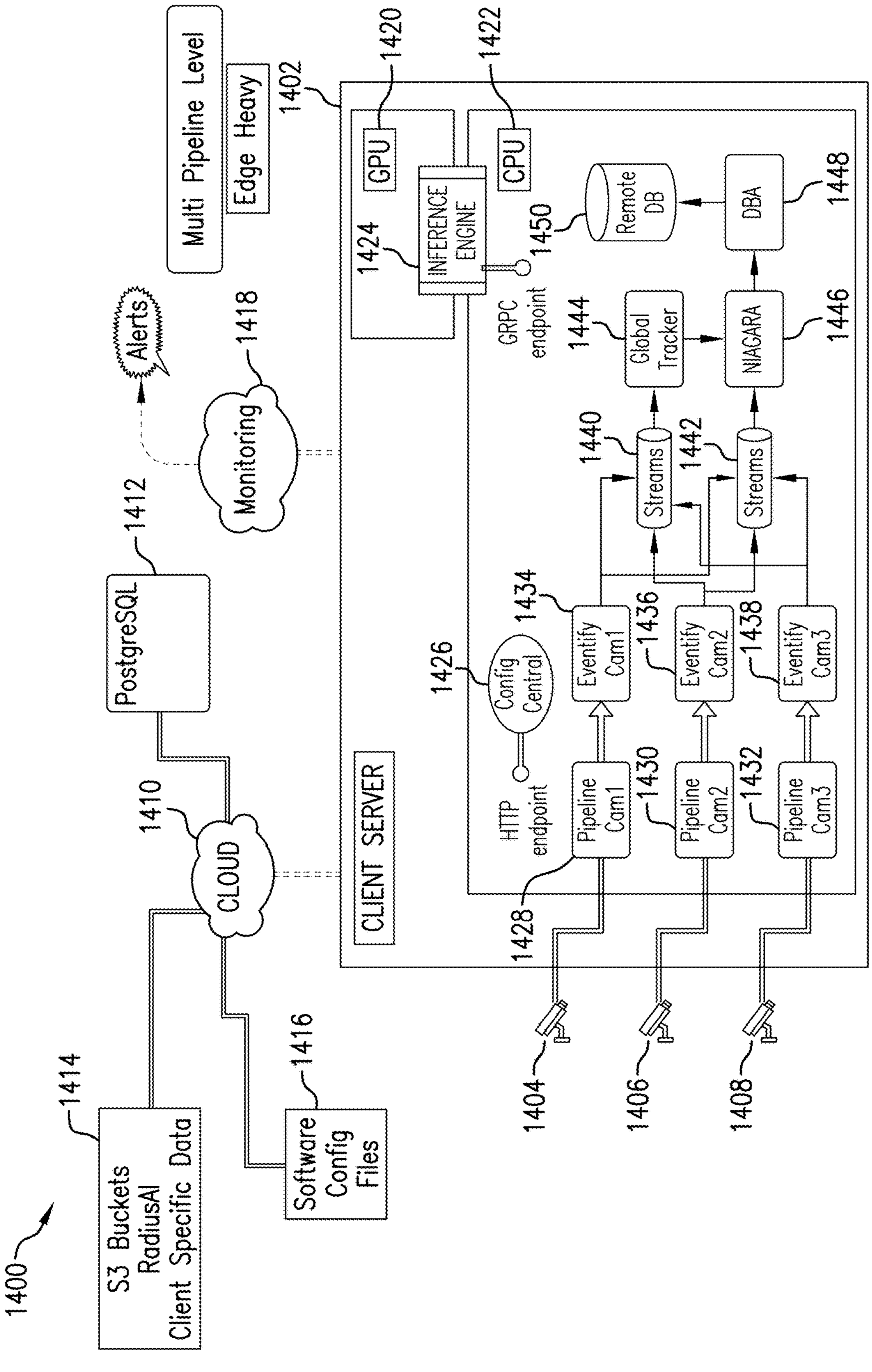

FIG. 14 shows an example edge-heavy multi-pipeline architecture 1400 with multiple cameras 1404, 1406, 1408 each having its own respective pipeline 1428, 1430, 1432 and eventify components 1434, 1436, 1438 producing metadata streams 1440, 1442 that can be merged using the global tracker component 1440 and/or Niagara component 1446. The edge-heavy pipeline architecture 1400 of FIG. 14 is similar to the cloud-heavy pipeline architecture 1300 of FIG. 13, except that the edge-heavy pipeline architecture 1400 runs Niagara 1446 on the edge server 1402 whereas the cloud-heavy pipeline architecture 1300 runs Niagara 1320 on the cloud. The edge-heavy pipeline architecture 1400 therefore puts more of the computational responsibility on the edge server 1402 than on the cloud 1410.

Operational Examples

Figure 16A:
FIGS. 16A-16C are screenshots of example monitoring screens of a visual analytics system detecting persons moving in a store.
Figure 16B:
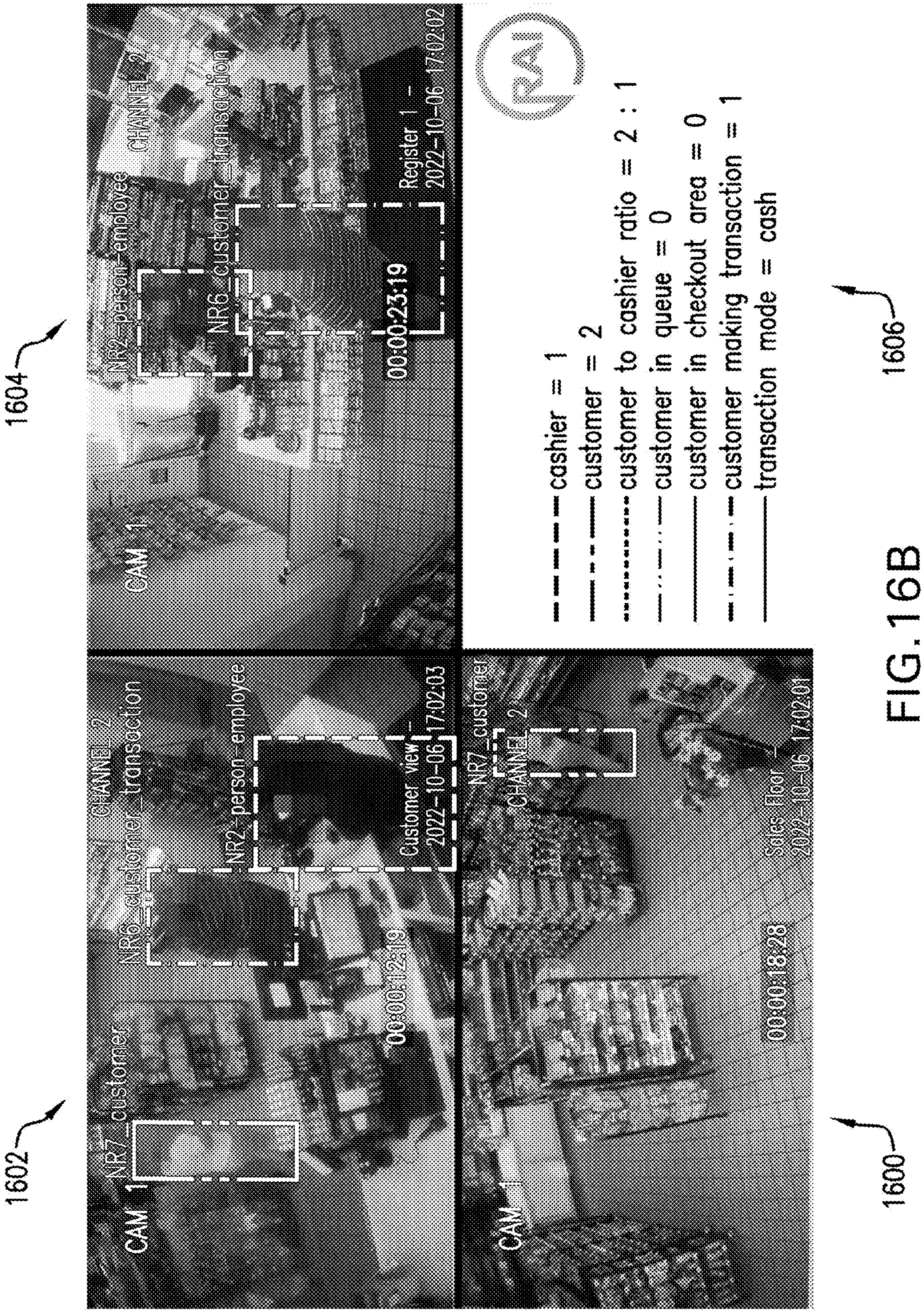
Figure 16C:
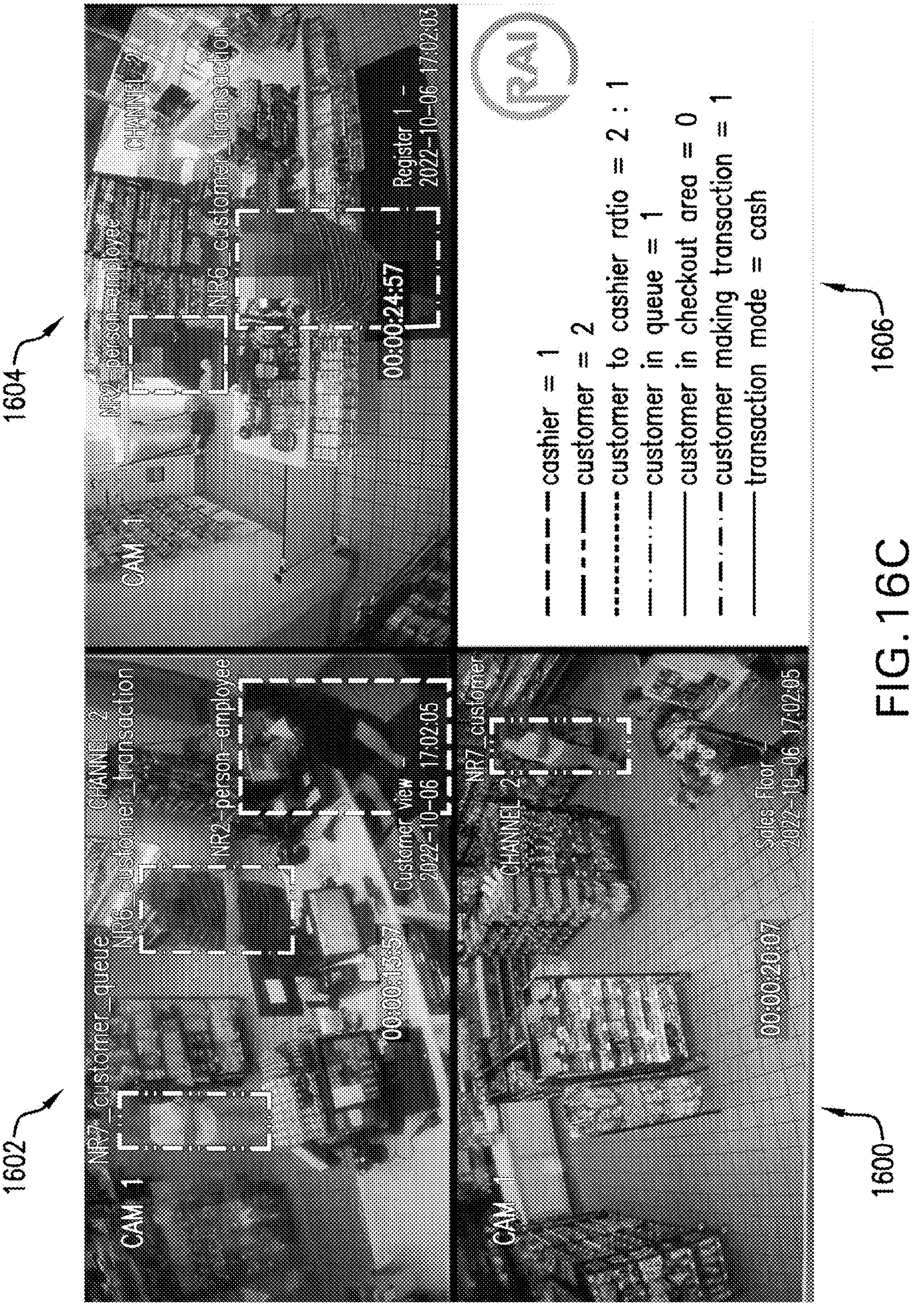
Figure 17:
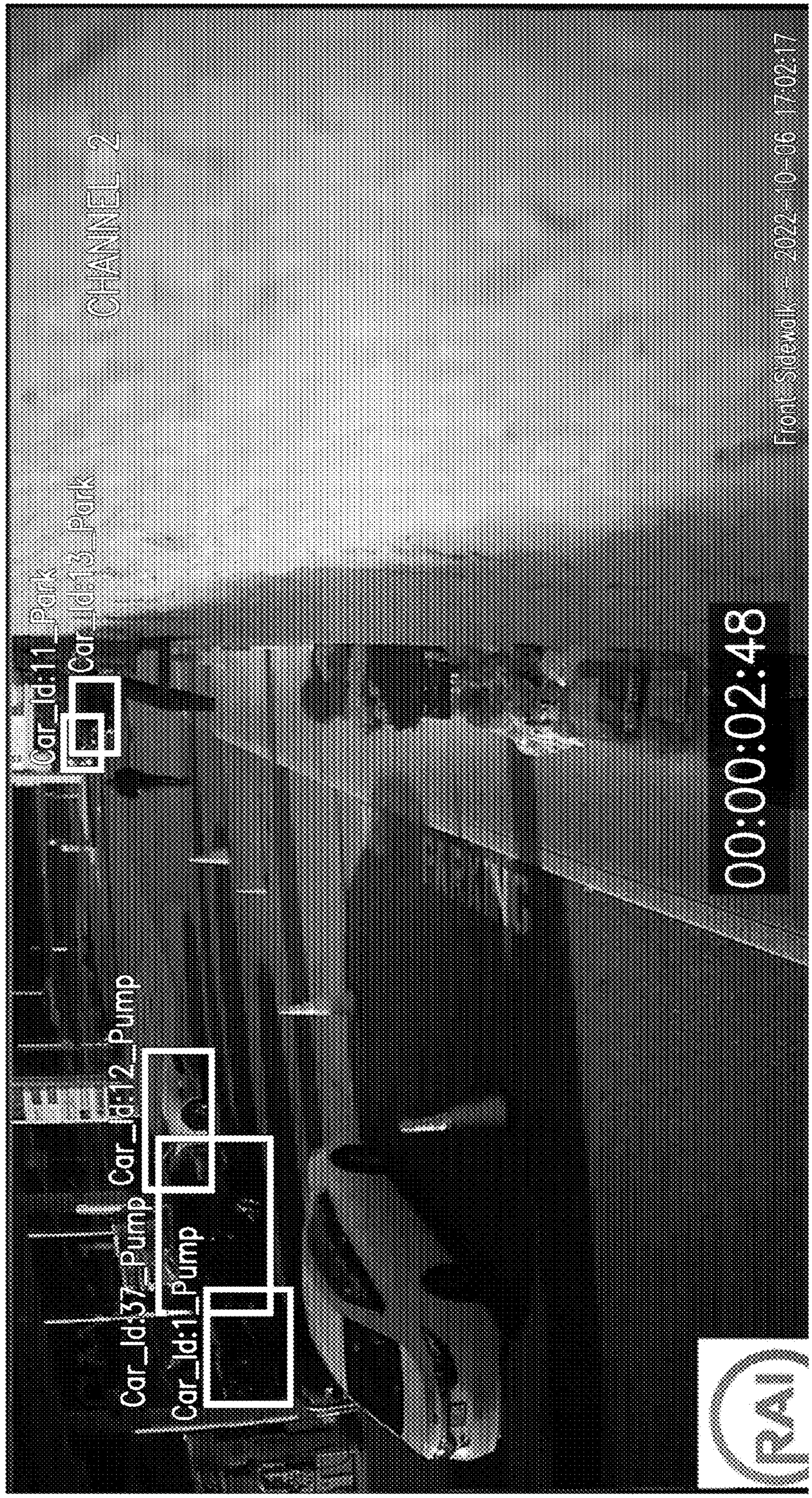
FIG. 17 is a screenshot of an example monitoring screen of a visual analytics system detecting vehicles moving outside a store.

FIGS. 16A through 16C and 17 illustrate operational examples showing the functioning of a visual analytics system 100 inside of a store (FIGS. 16A-16C) and outside of the store (FIG. 17). In the camera view 1600 of FIG. 16A, depicting an example first instant in time, the visual analytics system 100 has detected two people in the store. Anchor boxes have been drawn around the two detected people, and the two people have been designated as "NR6_customer" and "NR7_customer." The visual analytics system 100 determines, using its machine learning functionality (or other artificial intelligence methods) and based on the spatial positions and behaviors of the two people, that both of these customers are browsing the store and are not yet in at a checkout station or in a checkout queue. The visual analytics system 100 therefore color-codes the anchor boxes around both of these customers as blue outlines, which color-coding signifies that these customers are browsing the store and are not yet in at a checkout station or in a checkout queue.

FIG. 16B depicts three camera views 1600, 1602, 1604 at an example second instant in time shortly after the first instant in time. Camera view 1600 in FIG. 16B no longer shows NR6_customer, who has moved out of the view in the intervening time between the first instant and the second instant. Camera view 1600 in FIG. 16B still shows NR7_customer, now in a different spatial position in the store. Camera view 1602 in FIG. 16B detects both NR6_customer and NR7_customer, and has labeled both of these people with designations consistent with their designations in camera view 1600 of FIG. 16A, indicating that the person re-identification between views 1600 and 1602 has functioned correctly. Camera view 1602 in FIG. 16B also shows a third person, detected as an employee, and labeled "NR2 person employee." The visual analytics system 100 has color-coded the bounding box for this third person as teal to signify the employee status of the third person. Camera view 1604 in FIG. 16B provides a view of the checkout station and therefore shows NR6_customer and the cashier NR2 person employee.

The visual analytics system 100 has further detected that NR6_customer has approached the checkout station and is engaged in a checkout transaction, based on one or more of this customer's spatial position (possibly as being within a designated AOI of the checkout station) and/or one or more gestures of this person as being consistent with conducting a checkout transaction. The visual analytics system 100 has therefore color-coded the anchor box for NR6_customer as green, for checking out, and no longer as blue, for browsing the store. The visual analytics system 100 has also relabeled "NR6_customer" as "NR6_customer_transaction," signifying, again, the change in action from browsing to checking out of NR6_customer. By contrast, the visual analytics system 100 detects and displays NR7_customer as being still browsing. This is the case even though NR7_customer may have entered an AOI defined as a checkout queue area, possibly because the visual analytics system has detected the pose and gaze of the NR7_customer as directed away from the checkout station, which may indicate that customer NR_7 is still browser rather than intentionally entering the checkout queue.

Based on the above-described detections, the visual analytics system 100 is able to compute, provide, and display (e.g., on a GUI) operational metrics 1606 in FIG. 16B, including that there is one cashier, two customers, a customer-to-cashier ratio of two to one, zero customers in the checkout queue, zero customers in the checkout area who are not making a transaction (e.g., who are not being helped by a cashier), one customer making a transaction, and that the transaction mode is cash.

FIG. 16C depicts the three camera views 1600, 1602, 1604 at an example third instant in time shortly after the second instant in time. Camera view 1600 in FIG. 16C still shows NR7_customer, in approximately the same spatial position in the store as she was in the second instant in time shown in FIG. 16B, but now recognized as being in the checkout queue, possibly because the visual analytics system has detected the pose and/or gaze of NR7_customer as being consistent with waiting in the checkout queue and has therefore assigned a corresponding action to NR7_customer. The visual analytics system has, accordingly, color-coded the anchor box for NR7_customer as red, for queuing, and no longer as blue, for browsing the store. The visual analytics system has also relabeled "NR7_customer" as "NR7_customer_queue," signifying, again, the change in action from browsing to queuing of NR7_customer. Camera view 1602 in FIG. 16C likewise shows NR7_customer_queue with a red anchor box and NR6_customer_transaction with a green anchor box. Camera view 1604 in FIG. 16C provides the view of the checkout station and therefore continues to show NR6_customer_transaction and the cashier NR2 person employee in the third instant in time.

Based on the above-described detections, the visual analytics system is able to compute, provide, and display (e.g., on a GUI) revised operational metrics 1606 in FIG. 16C, including that there is still one cashier, still two customers, still a customer-to-cashier ratio of two to one, now one customer in the checkout queue, still zero customers in the checkout area who are not making a transaction (e.g., who are not being helped by a cashier), still one customer making a transaction, and that the transaction mode is still cash. In a subsequent instant in time (not shown), the NR6_customer may complete his transaction and leave the store, at which point NR7_customer may advance to the checkout station and become color-coded green and appropriately labeled by the visual analytics system as conducting a checkout transaction (e.g., being helped by the cashier NR2 person employee). The computed metrics 1606 for that subsequent instant in time will change accordingly.

The computed metrics 1606 can be used by the edge server 104 and/or the remote processing server 180 to generate alerts in real time or near real time. For example, if NR7_customer is determined to have waited in the queue for longer than a threshold amount of time (which may, in some examples, be an adaptive threshold), an alert can be delivered to another employee (not shown), e.g., an employee who is otherwise engaged with another task such as stocking shelves, to come staff a second checkout station. The computed metrics can be logged and later analyzed to highlight anomalies (e.g., relating to when customers were obligated to wait in the checkout queue for a super threshold amount of time), draw out patterns, and provide reports.

FIG. 17 shows a camera view 1700 of a parking lot and gas pumps outside of the store of FIGS. 16A-16C. As shown in FIG. 17, the visual analytics system 100 is able to identify cars parked at the gas pumps, which have been anchor-boxed and labeled "Car_Id:1_Pump," "Car_Id:37_Pump," and "Car_Id:12_Pump," respectively. Also as shown in FIG. 17, the visual analytics system 100 is able to identify cars parked in parking spots, which have been anchor-boxed and labeled "Car_Id:13_Park," and "Car_Id:11_Park," respectively. The visual analytics system 100 can compute and record metrics relating to arrival and departure times of these vehicles from their various parking spots, the amounts of time each of these vehicles loitered in their respective spots, and aggregate usage metrics relating to individual ones of the pumps and parking spots. The computed metrics can be logged and later analyzed to highlight anomalies (e.g., relating to when vehicles loitered at gas pumps too long, or whether certain parking spaces or sets of parking spaces are over- or under-utilized), draw out patterns, and provide reports.

Multi-Agent Simulator Using Collected Visual Analytics Data

A multi-agent simulator can simulate how people behave in a location (e.g., store or hospital). Agents are trained by the data collected from the visual analytics system 100, so they become predictive to anticipate what would happen based on a change in a location. Optimizations can be tested for, e.g., to reduce congestion in a store and improve flow in the store. As an example, a hypothesis may be developed that changing the location of movable shelves called gondolas in the store will improve flow. The simulator could be tested for different modified shelf spacings, e.g., three-foot spacing versus two-foot spacing. The simulated agents will react to the modified spacings as if they are real people, and measurements can be made based on the actions of the trained simulated agents. Such simulated experiments can be performed much less expensively than experiments done in the real world.

Computing Devices

Each edge server 104, 608, 718, 720, 1302, 1402 and other computing devices/servers of the analytics system 100 may be embodied as one or more computing devices similar to the computing device 1800 described below in reference to FIG. 18. For example, in the illustrative example, each edge server 104, 608, 718, 720, 1302, 1402 includes a processing device 1802 and a memory 1806 having stored thereon operating logic 1808 for execution by the processing device 1802 for operation of the corresponding device/system.

Figure 18:
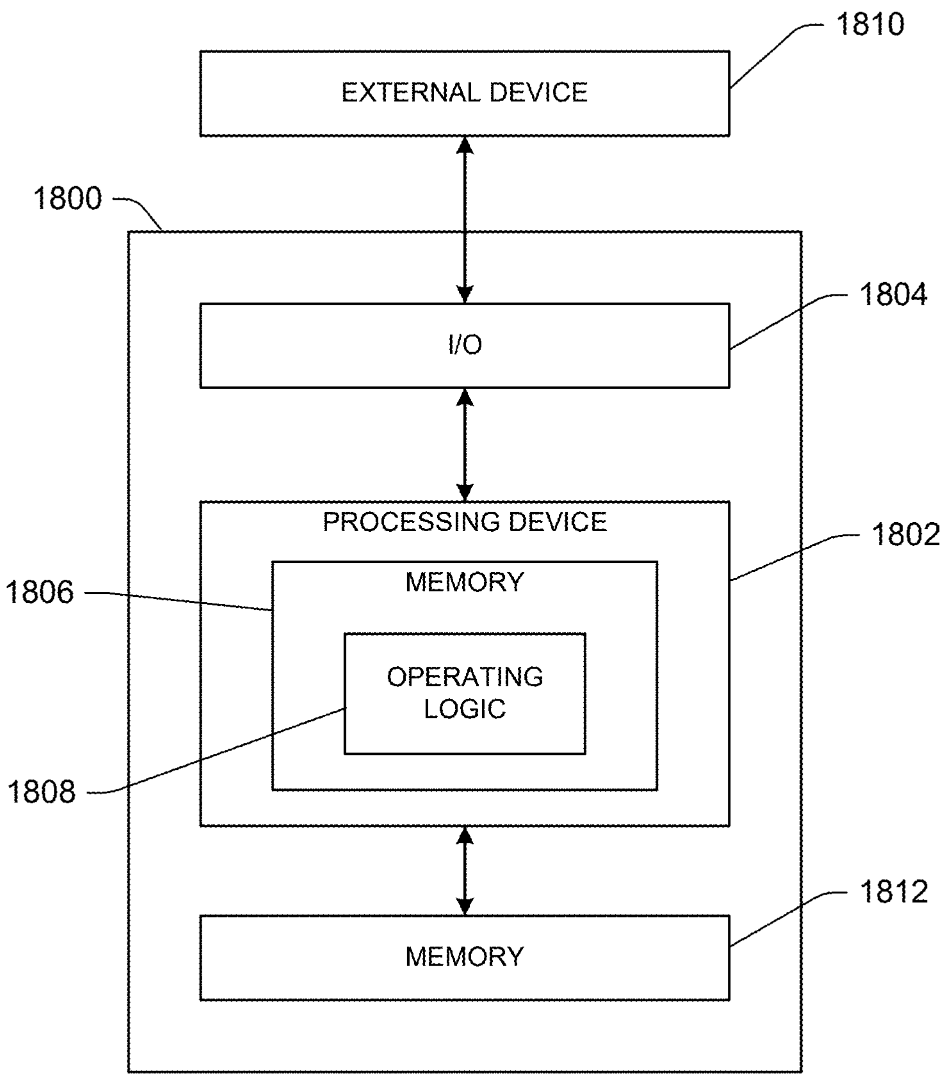
FIG. 18 is a block diagram of an example computing device.

FIG. 18 shows a simplified block diagram of an example computing device 1800. The computing device 1800 may be embodied as a desktop computer, laptop computer, tablet computer, notebook, netbook, ULTRABOOK, mobile computing device, cellular phone, smartphone, wearable computing device, server, personal digital assistant, Internet of Things (IOT) device, processing system, gateway, and/or any other computing, processing, and/or communication device capable of performing the functions described herein.

The computing device 1800 includes a processing device 1802 that executes algorithms and/or processes data in accordance with operating logic 1808, an input/output device 1804 that enables communication between the computing device 1800 and one or more external devices 1810, and memory 1806 which stores, for example, data received from the external device 1810 via the input/output device 1804.

The input/output device 1804 allows the computing device 1800 to communicate with the external device 1810. For example, the input/output device 1804 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 1800 may be configured to use any one or more communication technologies (e.g., wireless or wired communications) and associated protocols (e.g., Ethernet, Bluetooth®, Wi-Fi®, WiMAX, etc.) to implement such communication depending on the particular computing device 1800. The input/output device 1804 may include hardware, software, and/or firmware suitable for performing the techniques described herein.

The external device 1810 may be any type of device that allows data to be inputted or outputted from the computing device 1800. For example, in various examples, the external device 1810 may be embodied as a camera 102 as shown in FIG. 1. Further, in some embodiments, the external device 1810 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some examples, the external device 1810 may be integrated into the computing device 1800.

The processing device 1802 may be any type of processor(s) capable of performing the functions described herein. In particular, the processing device 1802 may be one or more single or multi-core processors, microcontrollers, or other processor or processing/controlling circuits. For example, in some embodiments, the processing device 1802 may include or be embodied as an arithmetic logic unit (ALU), central processing unit (CPU), digital signal processor (DSP), AI acceleration unit, graphics processing unit (GPU), tensor processing unit (TPU), and/or another suitable processor(s). The processing device 1802 may be a programmable type, a dedicated hardwired state machine, or a combination thereof. Processing devices 1802 with multiple processing units may utilize distributed, pipelined, and/or parallel processing in various embodiments. Further, the processing device 1802 may be dedicated to performance of just the operations described herein or may be utilized in one or more additional applications. In the illustrative embodiment, the processing device 1802 is programmable and executes algorithms and/or processes data in accordance with operating logic 1808 as defined by programming instructions (such as software or firmware) stored in memory 1806. Additionally, or alternatively, the operating logic 1808 for processing device 1802 may be at least partially defined by hardwired logic or other hardware. Further, the processing device 1802 may include one or more components of any type suitable to process the signals received from input/output device 1804 or from other components or devices and to provide desired output signals. Such components may include digital circuitry, analog circuitry, or a combination thereof.

The memory 1806 may be of one or more types of non-transitory computer-readable media, such as a solid-state memory, electromagnetic memory, optical memory, or a combination thereof. Furthermore, the memory 1806 may be volatile and/or nonvolatile and, in some embodiments, some or all of the memory 1806 may be of a portable type, such as a disk, tape, memory stick, cartridge, and/or other suitable portable memory. In operation, the memory 1806 may store various data and software used during operation of the computing device 1800 such as operating systems, applications, programs, libraries, and drivers. The memory 1806 may store data that is manipulated by the operating logic 1808 of processing device 1802, such as, for example, data representative of signals received from and/or sent to the input/output device 1804 in addition to or in lieu of storing programming instructions defining operating logic 1808. As shown in FIG. 18, the memory 1806 may be included with the processing device 1802 and/or coupled to the processing device 1802 depending on the particular embodiment. For example, in some embodiments, the processing device 1802, the memory 1806, and/or other components of the computing device 1800 may form a portion of a system-on-a-chip (SoC) and be incorporated on a single integrated circuit chip.

In some embodiments, various components of the computing device 1800 (e.g., the processing device 1802 and the memory 1806) may be communicatively coupled via an input/output subsystem, which may be embodied as circuitry and/or components to facilitate input/output operations with the processing device 1802, the memory 1806, and other components of the computing device 1800. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1800 may include other or additional components, such as those commonly found in a typical computing device (e.g., various input/output devices and/or other components), in other embodiments. One or more of the components of the computing device 1800 described herein may be distributed across multiple computing devices. In other words, the techniques described herein may be employed by a computing system that includes one or more computing devices. Additionally, although only a single processing device 1802, I/O device 1804, and memory 1806 are shown in FIG. 18, a particular computing device 1800 may include multiple processing devices 1802, I/O devices 1804, and/or memories 1806 in other examples. Further, in some examples, more than one external device 1810 may be in communication with the computing device 1800.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A visual analytics system for tracking and identifying people and objects within a monitored location based on metadata associated with each person and metadata associated with each object as provided by a plurality of images captured by a plurality of cameras positioned at the monitored location, the visual analytics system comprising:

an edge server positioned at the monitored location and communicatively coupled to the plurality of cameras over an internal communications network at the monitored location, the edge server comprising a processor executing a plurality of instructions stored in memory, wherein the plurality of instructions cause the processor of the edge server to:

extract metadata associated with a person and metadata associated with an object as positioned at each area of interest of the monitored location from the plurality of images captured of the person and the object by each corresponding camera to generate from individual image frames extracted from each video stream generated by each corresponding camera feature vectors of the person and feature vectors of the object as the person and the object are positioned in each area of interest as captured from the individual frames extracted from each video stream generated by each corresponding camera, wherein the feature vectors of the person is indicative as to an identification of the person as positioned in each area of interest and the feature vectors of the object is indicative as to an identification of the object as positioned in each area of interest;

analyze with a neural network whether the feature vectors of the person as captured of the person from the individual image frames extracted from each video stream generated by each corresponding camera matches each subsequent feature vector of the person as captured from subsequent individual image frames extracted from each video stream generated by each corresponding camera of the person within each area of interest as and whether the feature vectors of the object as captured of the object from the individual image frames extracted from each video stream generated by each corresponding camera matches each subsequent feature vector of the object as captured from subsequent individual image frames extracted from each video stream generated by each corresponding camera within each area of interest to detect a presence of the person and a presence of the object within each area of interest;

identify with the neural network the person and the object when the feature vector associated with the person and the feature vector associated with the object as positioned in each area of interest as captured of the person and the object by the individual image frames extracted from each video stream generated by each corresponding camera matches each subsequent feature vector of the person and each subsequent feature vector of the object as captured of the person and the object by the subsequent individual image frames extracted from each video stream generated by each corresponding camera as the person and the object are positioned in each area of interest, wherein the person and the object are re-identified in the subsequent individual image frames extracted from each video stream generated by each corresponding camera based on the corresponding subsequent feature vectors thereby tracking the person and the object as captured by individual image frames extracted from each video stream generated by each corresponding camera of each area of interest;

determine with the neural network a plurality of signatures of behavior as executed by the person based on a position of the person relative to the object in each planogram associated with area of interest that the person maneuvers and a plurality of gestures executed by the person in engaging the object in each planogram associated with each area of interest, wherein in the plurality of signatures of behavior as executed by the person is indicative as to the interacting of the person with the object in each planogram associated with the area of interest;

determine with the neural network that the person identified within each area of interest is interacting with the object identified within each area of interest as the person is identified by the subsequent image frames extracted from each video stream generated by each corresponding camera of each area of interest and the object is identified in the individual image frames extracted from each video stream generated by each corresponding camera of each area of interest based on re-identifying each feature vector of the person and each feature vector of the object with the neural network from the individual image frames extracted from each video stream generated by each corresponding camera of the person and the object in each area of interest and the plurality of signatures of behavior of the person engaging the object in each planogram associated with each area of interest; and transmit the metadata associated with the person and the metadata associated with the object as extracted from the individual image frames extracted from each video stream generated by each corresponding camera of the person and the object when the person is identified as interacting with the object in each area of interest to a remote processing server using an external communications network to train the neural network to re-identify the object.

2. The visual analytics system of claim 1, wherein to infer that the person moved from the first area of interest to the second area of interest as a function of first metadata generated in response to detection of the presence of the person within the first area of interest and second metadata generated in response to detection of the presence of the person within the second area of interest comprises to analyze the first metadata and the second metadata with the one or more artificial intelligence models.

3. The visual analytics system of claim 1, wherein the one or more artificial intelligence models comprise a machine learning model.

4. The visual analytics system of claim 3, wherein the machine learning model is a neural network.

5. The visual analytics system of claim 1, wherein the remote processing server comprises a processor executing a plurality of instructions stored in memory, wherein the plurality of instructions cause the processor of the remote processing server to:

receive the first metadata, the second metadata, and third metadata generated in response to detection of the presence within the second area of interest from the edge server;

analyze the first metadata, the second metadata, and the third metadata with the one or more artificial intelligence models to predict a future event at the monitored location; and generate an alert indicative of the predicted future the event at the monitored location.

6. The visual analytics system of claim 1, wherein the plurality of instructions further cause the processor of the edge server to adaptively increase or decrease a number of the first plurality of images extracted from the first video stream as a function of the analysis of the each image of the first plurality of images with the one or more artificial intelligence models.

7. The visual analytics system of claim 1, wherein the first plurality of images extracted from the first video stream is less than a total number of images making up the first video stream.

8. The visual analytics system of claim 7, wherein the plurality of instructions further cause the processor of the edge server to:

store the first video stream in a data storage device of the edge server;

determine, based on the analysis of each image of the first plurality of images, that additional images are required to detect the presence of the person within the first area of interest;

retrieve a portion of the first video stream from the data storage device, the portion of the first video stream is associated with the first plurality of images;

extract a third plurality of images from the retrieved portion of the first video stream, wherein the third plurality of images extracted from the portion of the first video stream comprises more extracted images than the first plurality of images; and analyze each image of the third plurality of images with the one or more artificial intelligence models to detect the presence of the person within the first area of interest.

9. The visual analytics system of claim 1, further comprising a global configuration server communicatively coupled to the edge server with the external network and remotely positioned from the monitored location, wherein the global configuration server comprises a processor executing a plurality of instructions stored in memory, wherein the plurality of instructions cause the processor of the global configuration server to transmit the one or more artificial intelligence models to the edge server.

10. A method for tracking and identifying people and objects within a monitored location based on metadata associated with each person and metadata associated with each object as provided by a plurality of images captured by a plurality of cameras positioned at the monitored location, the method comprising:

receiving, by an edge server positioned at the monitored location and communicatively coupled to the plurality of cameras over an internal communications network, a plurality of images captured by the plurality of cameras;

extracting, by the edge server, metadata associated with a person and metadata associated with an object as positioned at each area of interest of the monitored location from the plurality of images captured of the person and the object by each corresponding camera to generate from individual frames extracted from each video stream generated by each corresponding camera feature vector of the person and feature vectors of the object the person and the object are positioned in each area of interest as captured from the individual frames extracted from each video stream generated by each corresponding camera, wherein feature vectors of the person is indicative as to an identification of the person as positioned in each area of interest and the feature vectors of the object is indicative as to an identification of the object as positioned in each area of interest;

analyzing, by the edge server with a neural network, whether the feature vectors of the person as captured of the person from the individual image frames extracted from each video stream generated by each corresponding camera matches each subsequent feature vector of the person as captured from subsequent individual image frames extracted from each video stream generated by each corresponding camera of the person within each area of interest and whether the feature vectors of the object as captured of the object from the individual image frames extracted from each video stream generated by each corresponding camera matches each subsequent feature vector of the object as captured from subsequent individual image frames extracted from each video stream generated by each corresponding camera within each area of interest to detect a presence of the person and a presence of the object within each area of interest;

identifying, by the edge server with the neural network, the person and the object when the feature vector associated with the person and the feature vector associated with the object as positioned in each area of interest as captured of the person and the object by the individual image frames extracted from each video stream generated by each corresponding camera matches each subsequent feature vector of the person and each subsequent feature vector of the object as captured of the person and the object by the subsequent individual image frames extracted from each video stream generated by each corresponding camera as the person and the object are positioned in each area of interest, wherein the person and the object are re-identified in the subsequent individual image frames extracted from each video stream generated by each corresponding camera based on the corresponding subsequent feature vectors thereby tracking the person and the object as captured by individual image frames extracted from each video steam generated by each corresponding camera of each area of interest;

determining by the neural network a plurality of signatures of behavior as executed by the person based on a position of the person relative to the object in each planogram associated with each area of interest that the person maneuvers and a plurality of gestures executed by the person in engaging the object in each planogram associated with the area of interest, wherein the plurality of signatures of behavior as executed by the person is indicative as to the interacting of the person with the object in each planogram associated with the area of interest;

determining, by the edge server with the neural network, that the person identified within each area of interest is interacting with the object identified within each area of interest as the person is identified by the subsequent image frames extracted from each video stream generated by each corresponding camera of each area of interest and the object is identified in the individual image frames extracted from each video stream generated by each corresponding camera of each area of interest based on re-identifying each feature vector of the person and each feature vector of the object by the neural network from the individual frames extracted from each video stream generated by each corresponding camera of the person and the object in each area of interest and the plurality of signatures of behavior of the person engaging the object in each planogram associated with each area of interest; and transmitting, by the edge server, metadata associated with the person and the metadata associated with the object as extracted from the individual image frames extracted from each video stream generated by each corresponding camera of the person and the object the person is identified as interacting with the object in the area of interest to a remote processing server using an external communications network to train the neural network to re-identify the object.

11. The method of claim 10, wherein inferring that the person moved from the first area of interest to the second area of interest as a function of first metadata generated in response to detection of the presence of the person within the first area of interest and second metadata generated in response to detection of the presence of the person within the second area of interest comprises analyzing the first metadata and the second metadata with the one or more artificial intelligence models.

12. The method of claim 10, wherein the one or more artificial intelligence models comprise a machine learning model.

13. The method of claim 12, wherein the machine learning model is a neural network.

14. The method of claim 10, further comprising:

receiving, by the remote processing server, the first metadata, the second metadata, and the third metadata generated in response to detection of the presence within the second area of interest from the edge server;

analyzing, by the remote processing server, first metadata, the second metadata, and the third metadata with the one or more artificial intelligence models to predict a future event at the monitored location; and generating, by the remote processing server, an alert indicative of the predicted future the event at the monitored location.

15. The method of claim 10, further comprising adaptively increasing or decreasing, by the edge server, a number of the first plurality of images extracted from the first video stream as a function of analyzing each image of the first plurality of images with the one or more artificial intelligence models.

16. The method of claim 10, wherein the first plurality of images extracted from the first video stream is less than a total number of images making up the first video stream.

17. The method of claim 16, further comprising:

storing, by the edge server, the first video stream in a data storage device of the edge server;

determining, by the edge server and based on the analysis of each image of the first plurality of images, that additional images are required to detect the presence of the person within the first area of interest;

retrieving, by the edge server, a portion of the first video stream from the data storage device, the portion of the first video stream is associated with the first plurality of images;

extracting, by the edge server, a third plurality of images from the retrieved portion of the first video stream, wherein the third plurality of images extracted from the portion of the first video stream comprises more extracted images than the first plurality of images; and analyzing, by the edge server, each image of the third plurality of images with the one or more artificial intelligence models to detect the presence of the person within the first area of interest.

18. The method of claim 10, further comprising transmitting, by a global configuration server, the one or more artificial intelligence models to the edge server, wherein the global configuration server is communicatively coupled to the edge server with the external network and remotely positioned from the monitored location.

* * * * *